(12) United States Patent
Lee et al.

(10) Patent No.: US 10,802,708 B2
(45) Date of Patent: Oct. 13, 2020

(54) METHOD AND APPARATUS FOR SUPPORTING COMMUNICATION IN ELECTRONIC DEVICE

(71) Applicant: Samsung Electronics Co., Ltd., Suwon-si, Gyeonggi-do (KR)

(72) Inventors: Sung Yeon Lee, Yongin-si (KR); Yonghak Kim, Seoul (KR); Yunju Bae, Daegu (KR); Kanghyun Suh, Seoul (KR); Jin-Gil Yang, Suwon-si (KR); Youngseok Lim, Suwon-si (KR); Lai Kun Jung, Hwaseong-si (KR); Hyeoncheon Jo, Busan (KR); Inji Jin, Bucheon-si (KR); Dahey Yoo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 340 days.

(21) Appl. No.: 15/054,796

(22) Filed: Feb. 26, 2016

(65) Prior Publication Data
US 2016/0253083 A1    Sep. 1, 2016

(30) Foreign Application Priority Data

Feb. 27, 2015  (KR) ........................ 10-2015-0028160

(51) Int. Cl.
*G06F 3/0488* (2013.01)
*H04M 1/27475* (2020.01)
(Continued)

(52) U.S. Cl.
CPC ........ *G06F 3/04886* (2013.01); *H04L 51/043* (2013.01); *H04M 1/27475* (2020.01);
(Continued)

(58) Field of Classification Search
CPC ............... G06F 3/04886; G06F 3/0488; G06F 3/04847; H04L 51/00; H04L 51/04;
(Continued)

(56) References Cited

U.S. PATENT DOCUMENTS 8,204,547 B2    6/2012  Jang
8,301,174 B2   10/2012  An
(Continued)

FOREIGN PATENT DOCUMENTS

CN       1806275 A    7/2006
CN     101478578 A    7/2009
(Continued)

OTHER PUBLICATIONS

Digital Touch by Apple, Use Digital Touch—Apple Support, https://support.apple.com/en-us/HT204833.
(Continued)

*Primary Examiner* — Daniel Samwel
(74) *Attorney, Agent, or Firm* — Jefferson IP Law, LLP

(57) ABSTRACT

An electronic device and a method are provided. The electronic device includes a communication module, a touch screen display, a processor electrically connected with the communication module and the touch screen display, and a memory electrically connected with the processor. The memory is configured to stores an application program configured to transmit and receive data to/from an external electronic device using the communication module, and instructions to enable the processor to display a user interface of the application program in the touch screen display when the application program is executed. The user interface includes a first area that displays at least one of an image and text that is associated with a user who is related to the external electronic device, and a second area that displays data that is shared with the external electronic device, and the first area overlaps at least a part of the second area.

20 Claims, 54 Drawing Sheets

(51) Int. Cl.
*H04N 21/4788* (2011.01)
*H04M 1/725* (2006.01)
*H04L 12/58* (2006.01)

(52) U.S. Cl.
CPC ......... *H04M 1/72552* (2013.01); *H04L 51/00* (2013.01); *H04L 51/04* (2013.01); *H04L 51/08* (2013.01); *H04L 51/10* (2013.01); *H04L 51/16* (2013.01); *H04L 51/22* (2013.01); *H04L 51/24* (2013.01); *H04L 51/32* (2013.01); *H04M 1/72547* (2013.01); *H04N 21/4788* (2013.01)

(58) Field of Classification Search
CPC ....... H04L 51/046; H04L 51/08; H04L 51/10; H04L 51/16; H04L 51/24; H04L 51/32; H04L 51/36; H04L 51/043; H04L 51/22; H04M 1/27475; H04M 1/72552; H04M 1/72547; H04N 21/4788
See application file for complete search history.

(56) References Cited

U.S. PATENT DOCUMENTS

| | | | |
|---|---|---|---|
| 8,493,354 B1 | 7/2013 | Birnbaum et al. | |
| 2010/0251177 A1* | 9/2010 | Geppert | G06F 3/04817 715/821 |
| 2011/0221694 A1 | 9/2011 | Karaoguz et al. | |
| 2012/0311493 A1* | 12/2012 | Sohn | H04M 1/72547 715/808 |
| 2013/0132904 A1 | 5/2013 | Primiani et al. | |
| 2014/0018053 A1 | 1/2014 | Cho et al. | |
| 2014/0075332 A1* | 3/2014 | Jeon | H04M 1/72552 715/752 |
| 2014/0108568 A1 | 4/2014 | Lee | |
| 2014/0215356 A1 | 7/2014 | Brander et al. | |
| 2014/0237126 A1 | 8/2014 | Bridge et al. | |
| 2015/0004945 A1* | 1/2015 | Steeves | H04W 4/12 455/412.2 |
| 2015/0040029 A1* | 2/2015 | Koum | H04L 51/10 715/748 |
| 2015/0089389 A1* | 3/2015 | Cohen-Zur | H04W 4/12 715/752 |
| 2015/0106731 A1* | 4/2015 | Matas | G06Q 10/107 715/744 |
| 2015/0156436 A1* | 6/2015 | Senta | G06T 11/60 348/302 |
| 2015/0271120 A1* | 9/2015 | Langholz | G06F 3/04817 709/206 |
| 2015/0309720 A1* | 10/2015 | Fisher | G06F 3/04847 715/752 |
| 2015/0312182 A1* | 10/2015 | Langholz | H04L 51/04 715/753 |
| 2016/0100050 A1* | 4/2016 | VanBlon | H04M 3/436 455/415 |
| 2016/0103608 A1* | 4/2016 | Nukala | G06F 17/211 345/419 |
| 2016/0253083 A1 | 9/2016 | Lee et al. | |

FOREIGN PATENT DOCUMENTS

| | | |
|---|---|---|
| CN | 101867635 A | 10/2010 |
| CN | 104246678 A | 12/2014 |
| EP | 2 770 417 A2 | 8/2014 |

OTHER PUBLICATIONS

Yo by Life Before Us, LLC, Yo (app) from Wikipedia, https://en.wikipedia.org/wiki/Yo_(app).
Vu Talk by LG, http://www.lgmobile.co.kr/data/manual/jb/f200/lg-f200L/116_01.html.
Indonesian Office Action dated Feb. 6, 2020, issued in Indonesian Patent Application No. P-00201702071.
European Office Action dated Jun. 18, 2020, issued in European Patent Application No. 16157673.1.
Chinese Office Action dated Jun. 18, 2020, issued in Chinese Patent Application No. 201610113232.7.
Australian Office Action dated Jun. 22, 2020, issued in Australian Patent Application No. 2016224180.

* cited by examiner

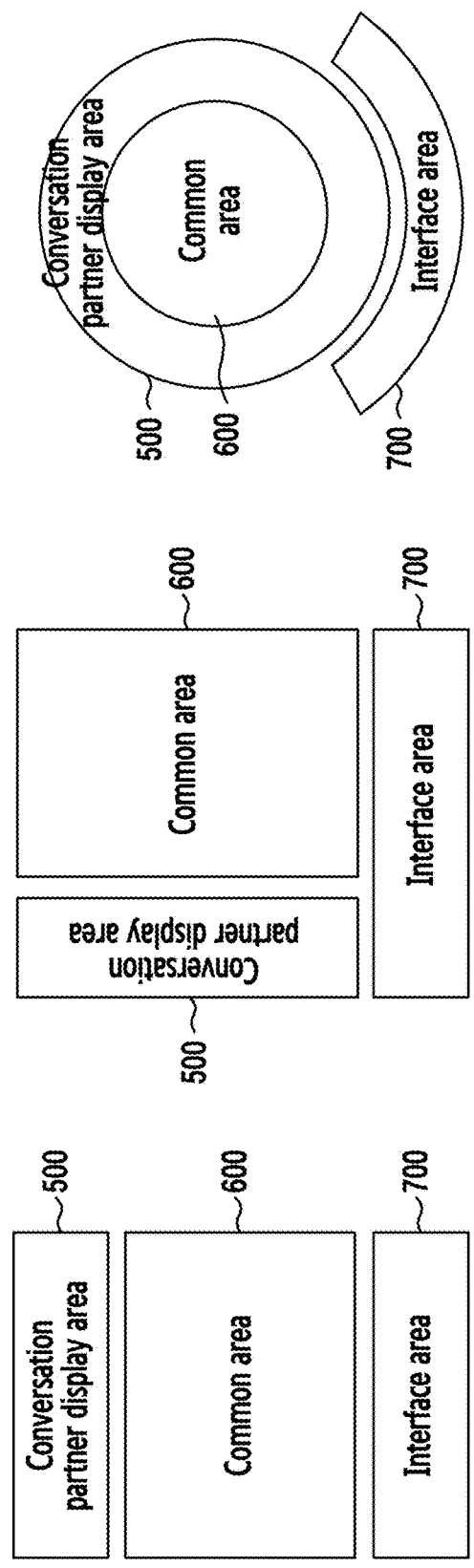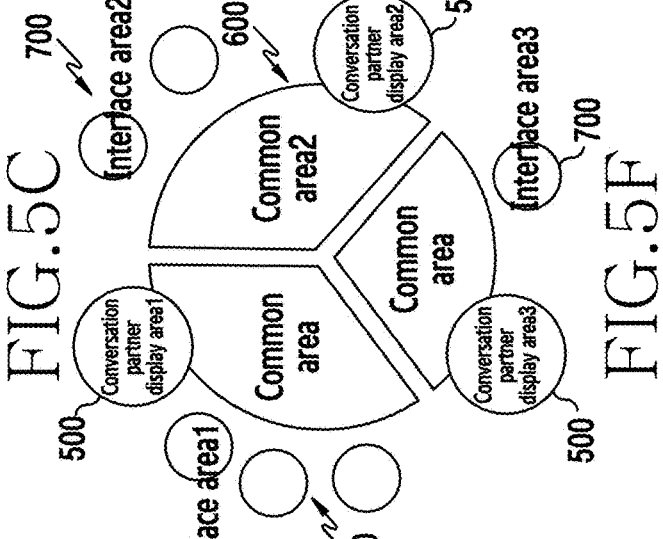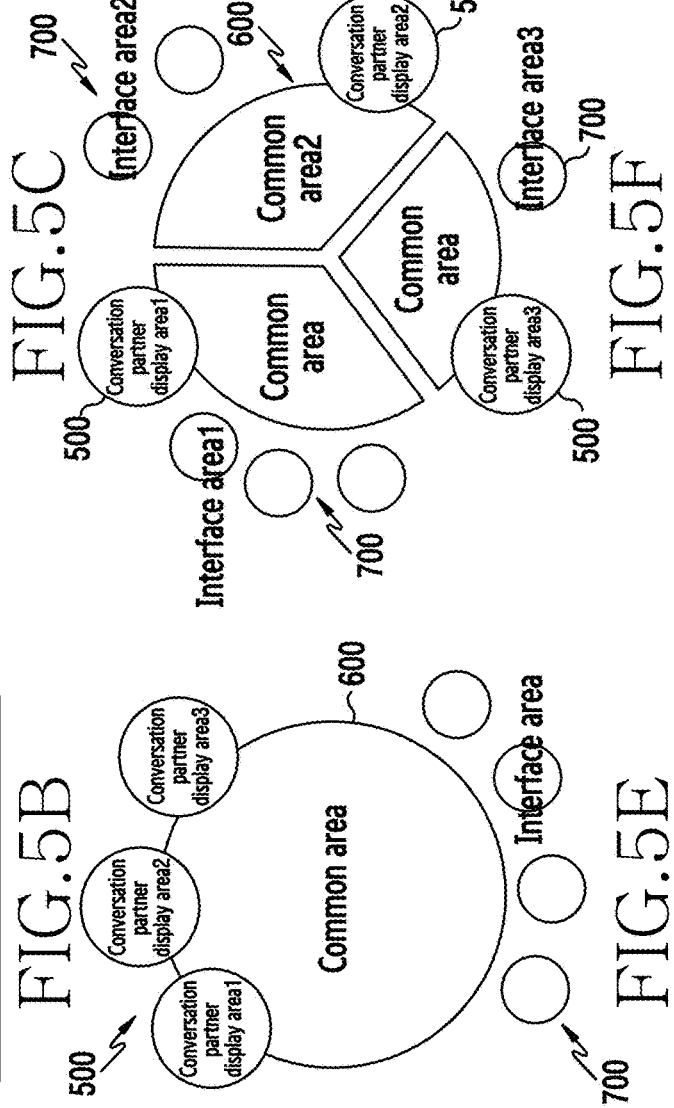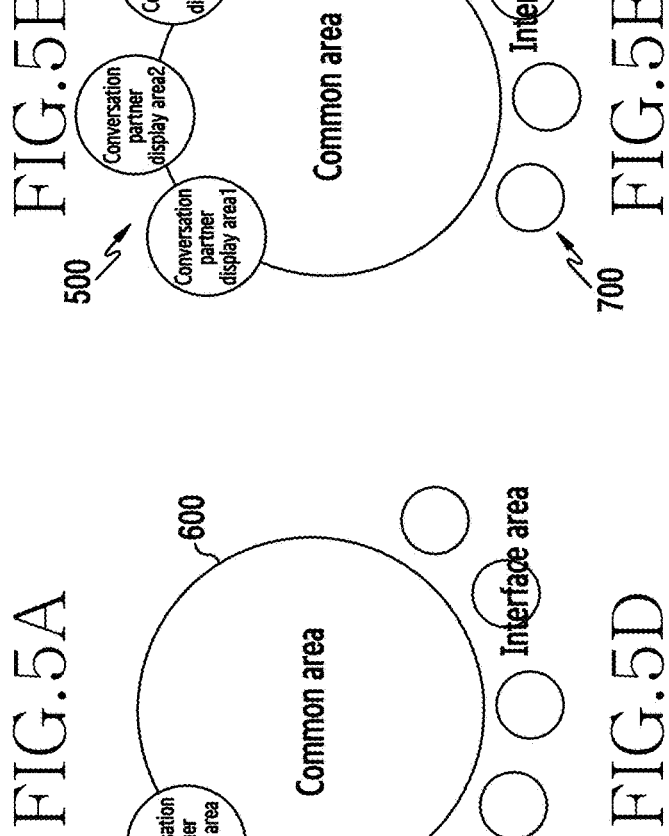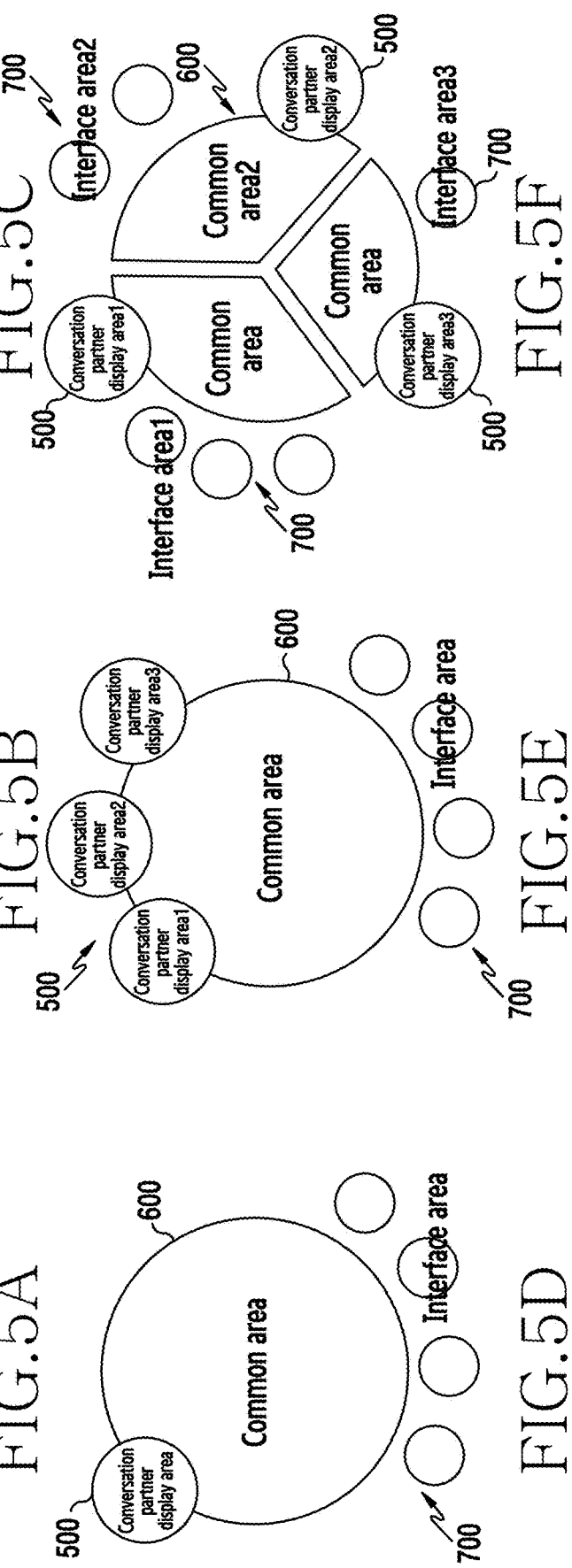

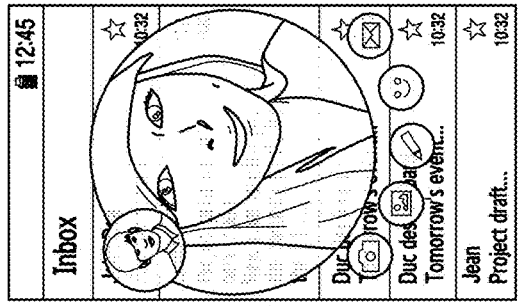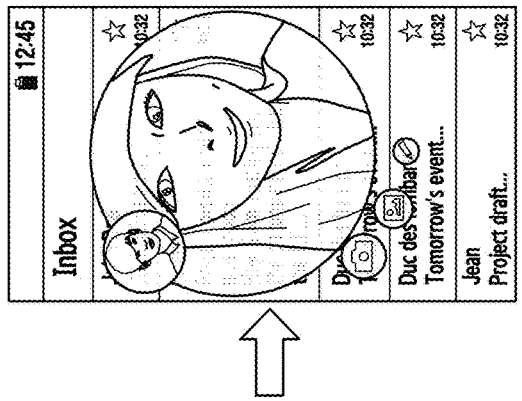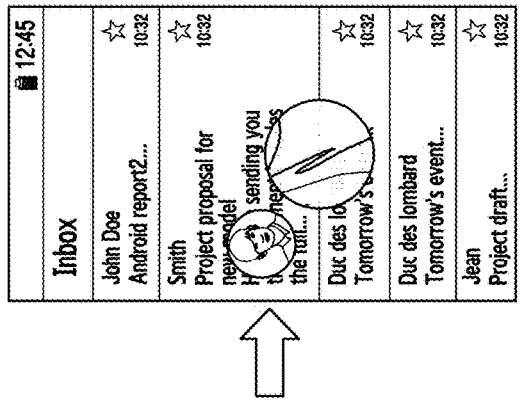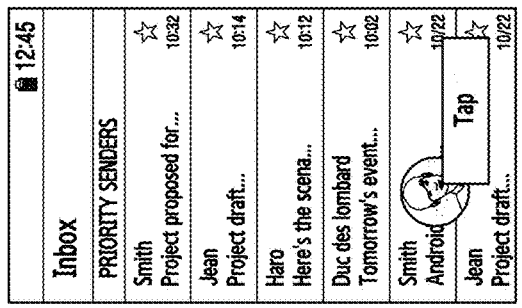
FIG.12A
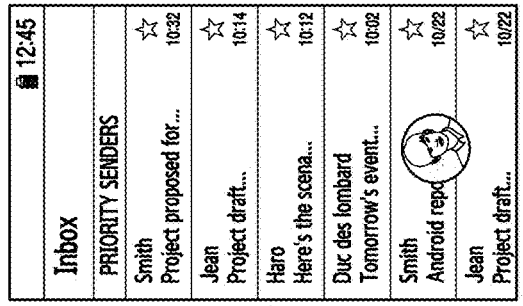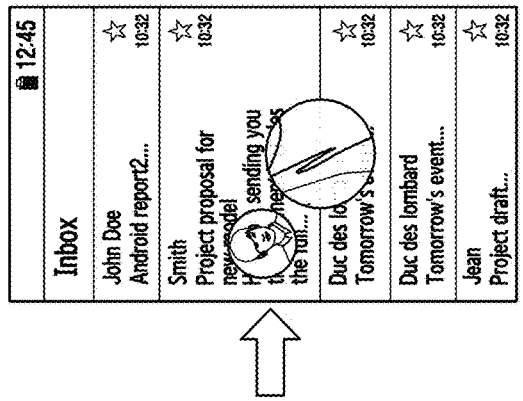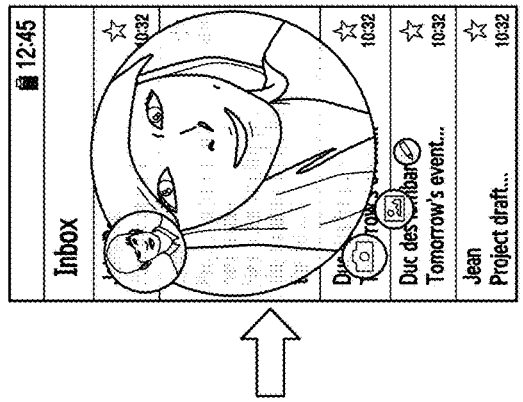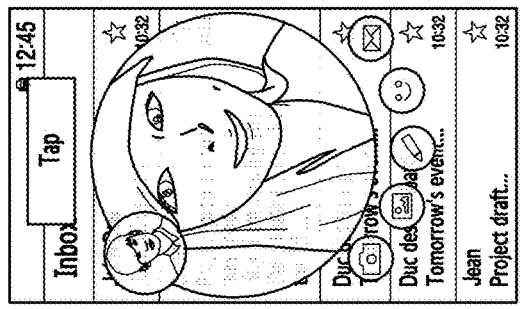
FIG.12B

| Event type | Transmission side information | Reception side information | Message transmission time | Number of events (n) | Event#1 | | | Event#... | | | Event#n | | |
|---|---|---|---|---|---|---|---|---|---|---|---|---|---|
| | | | | | Start signal | Occurrence time | Additional information | Start signal | Occurrence time | Additional information | Start signal | Occurrence time | Additional information |

FIG.20

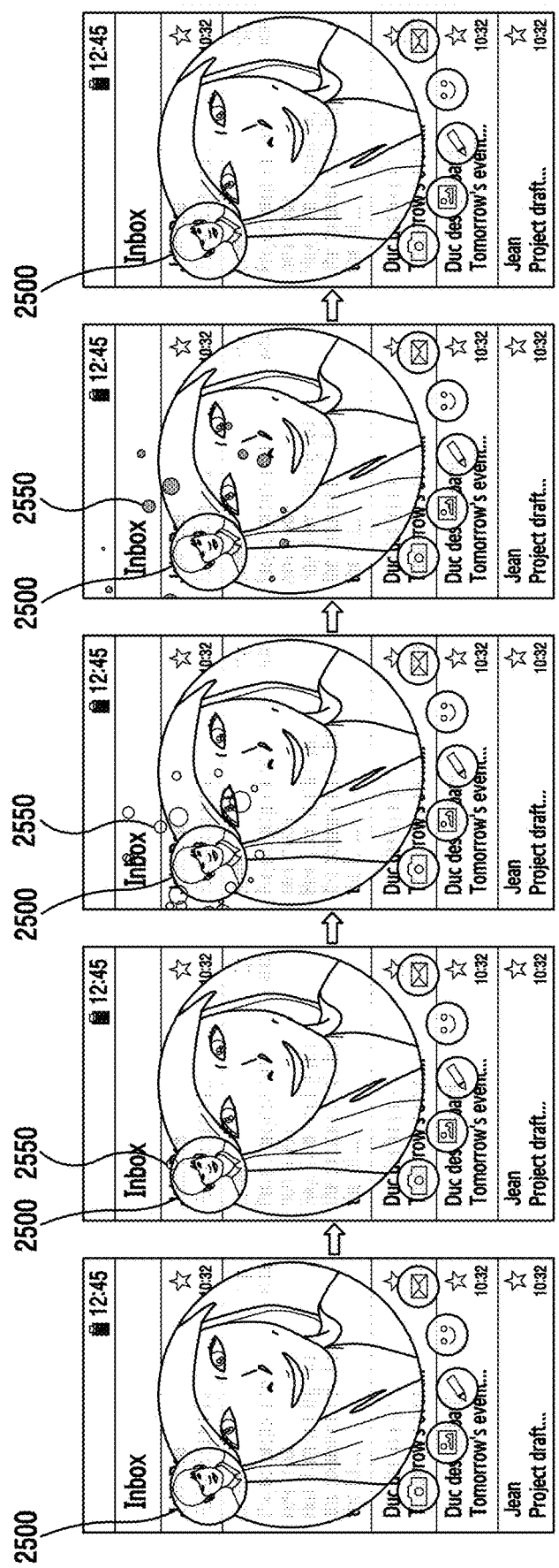

FIG.27

| Event type | Transmission side information | Reception side information | Message transmission time | Emoticon information ||
|---|---|---|---|---|---|
| | | | | Group name | Unique name |

FIG.30

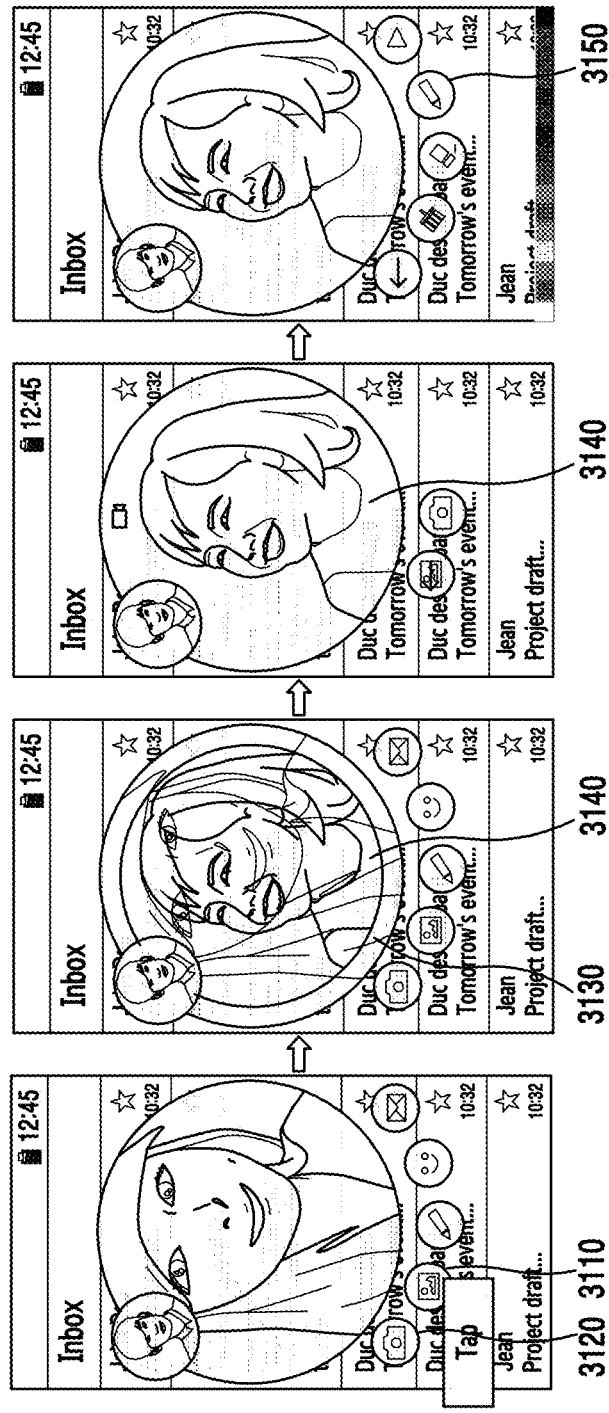

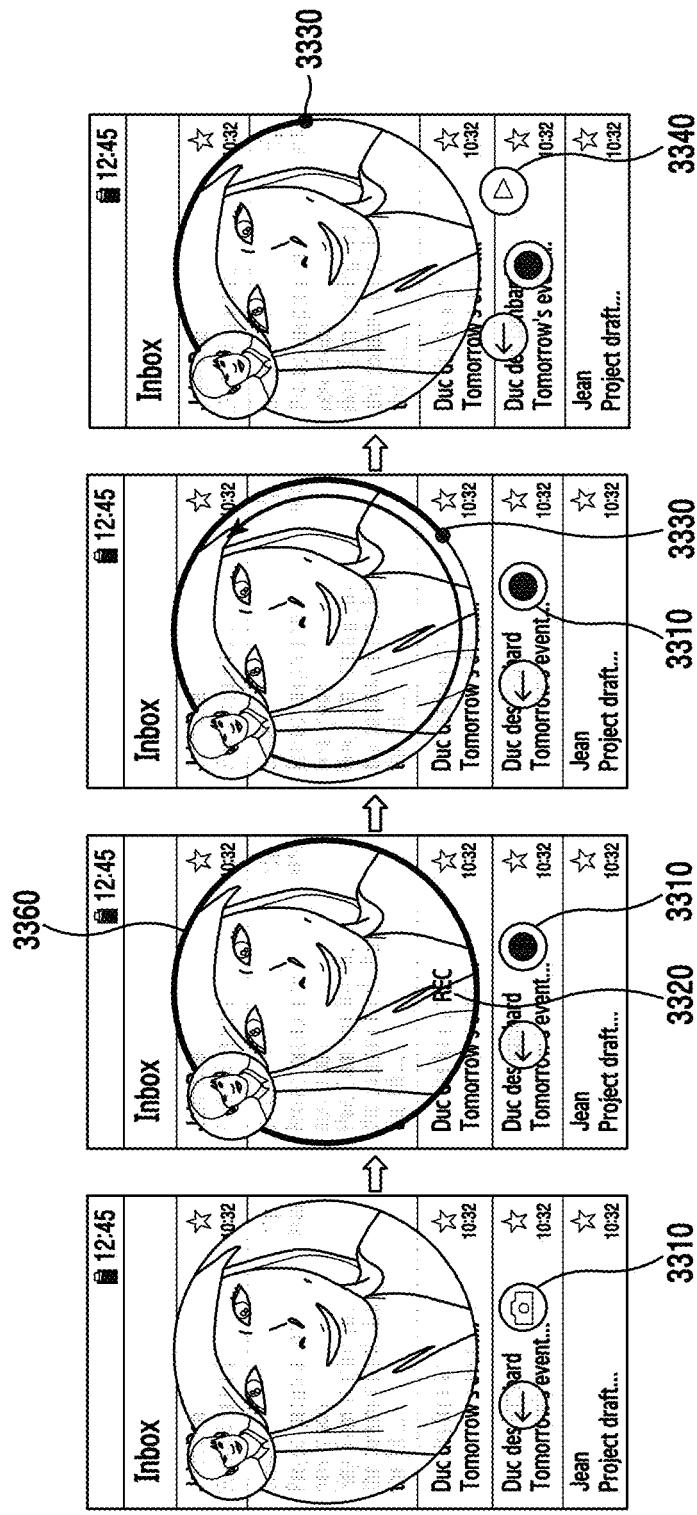

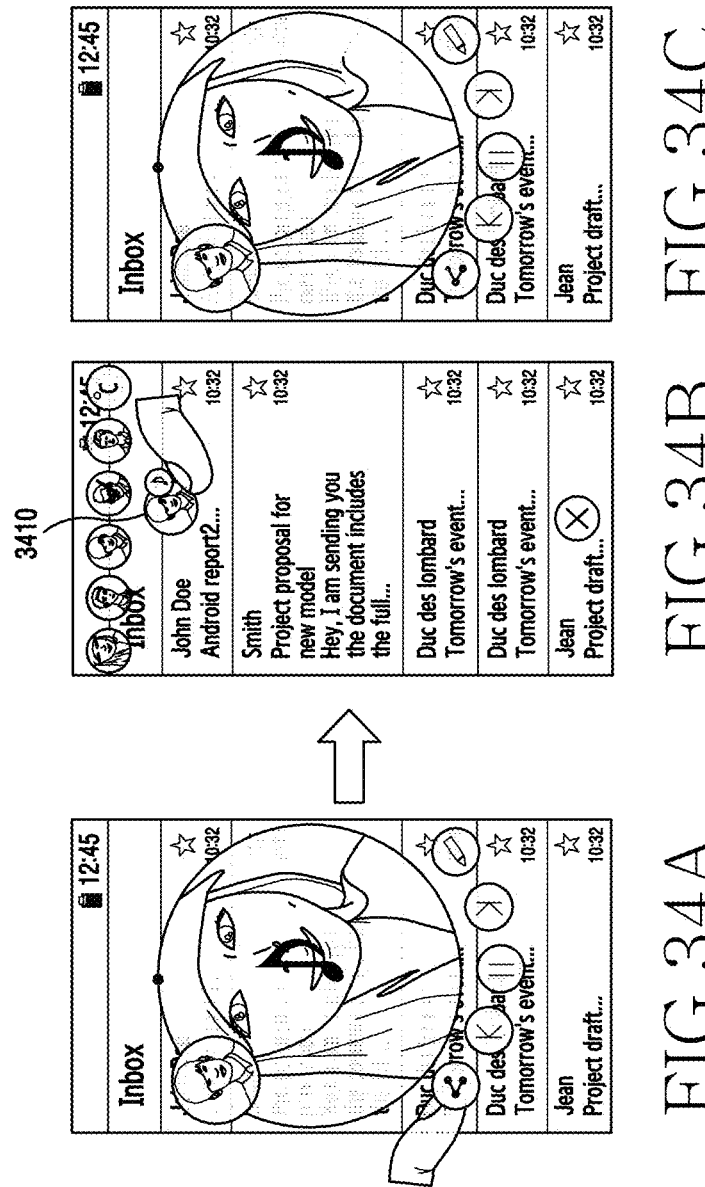

| Event type | Transmission side information | Reception side information | Message transmission time | Content URL |
|---|---|---|---|---|

FIG.41

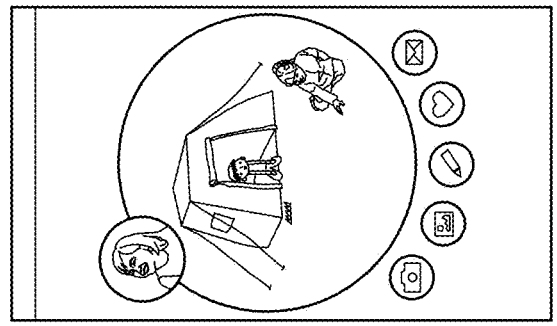
FIG.42C
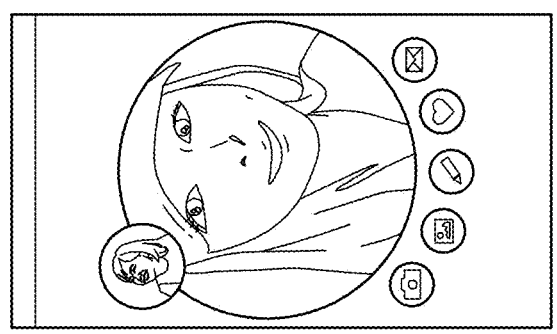
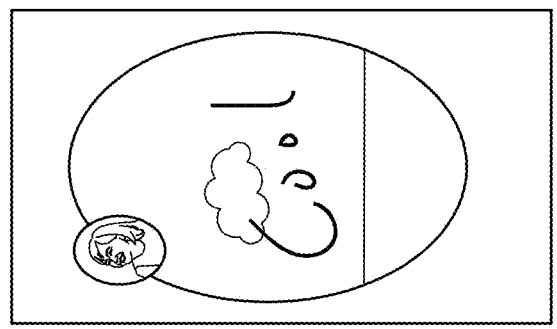
FIG.42B
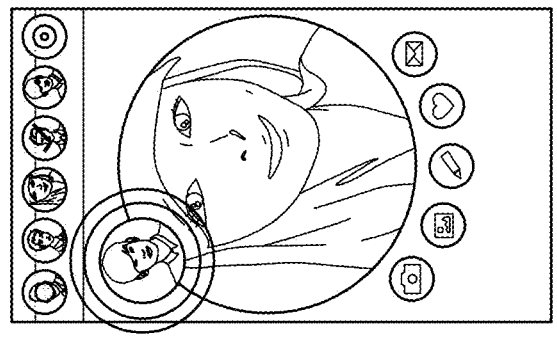
FIG.42A

| Event type | Transmission side information | Reception side information | Message transmission time | Transmission time of received message | Additional information |

FIG.43

METHOD AND APPARATUS FOR SUPPORTING COMMUNICATION IN ELECTRONIC DEVICE

CROSS-REFERENCE TO RELATED APPLICATION(S)

This application claims the benefit under 35 U.S.C. § 119(a) of a Korean patent application filed on Feb. 27, 2015 in the Korean Intellectual Property Office and assigned Serial number 10-2015-0028160, the entire disclosure of which is hereby incorporated by reference.

TECHNICAL FIELD

The present disclosure relates to an electronic device and an operation method thereof. More particularly, the present disclosure relates to communication between users who use electronic devices.

BACKGROUND

As digital technologies have developed, various types of electronic devices have become widely utilized, such as a mobile communication terminal, a smart phone, a tablet personal computer (PC), a personal digital assistant (PDA), a notebook, a wearable device, or the like. The electronic devices have reached a level of mobile convergence that includes the functions of other devices. For example, the electronic devices may provide a call function, such as a voice call, a video call, and the like; a message transmission/reception function, such as a short message service (SMS)/multimedia message service (MMS), an e-mail, and the like; an electronic organizer function; a photographing function; a broadcasting program playback function; a video playback function; a music playback function; an Internet function; a messenger function; a game function; a social networking service (SNS) function; or the like.

A user may execute communication with another user by using an electronic device in various schemes. For example, users may execute communication using electronic devices through verbal elements by using oral language or written language.

The above information is presented as background information only to assist with an understanding of the present disclosure. No determination has been made, and no assertion is made, as to whether any of the above might be applicable as prior art with regard to the present disclosure.

SUMMARY

In the case of the communication using an electronic device, communication is generally executed through verbal elements based on sentences according to the related art. An electronic device, however, needs to perform a process for generating a call for the oral language-based communication between users, and needs to perform a process of writing a message for the written language-based communication according to the related art. Therefore, a user may have difficulty in executing quick communication due to the above described processes.

Aspects of the present disclosure are to address at least the above-mentioned problems and/or disadvantages and to provide at least the advantages described below. Accordingly, an aspect of the present disclosure is to provide an electronic device and an operation method, which may support prompt communication between users, based on non-verbal elements.

According to various embodiments of the present disclosure, there are provided an electronic device and an operation method thereof, which support an intuitive and prompt interface for communication between users using an electronic device.

In accordance with an aspect of the present disclosure, an electronic device is provided. The electronic device includes a communication module, a touch screen display, a processor electrically connected with the communication module and the touch screen display, and a memory electrically connected with the processor, wherein the memory is configured to store an application program configured to transmit and receive data to/from an external electronic device using the communication module, as well as instructions to enable the processor to display a user interface of the application program in the touch screen display when the application program is executed. The user interface includes a first area that displays at least one of an image and text that is associated with a user who is related to the external electronic device, and a second area that displays data that is shared with the external electronic device, and the first area overlaps with at least a part of the second area.

In accordance with another aspect of the present disclosure, an electronic device is provided. The electronic device includes a communication module, a touch screen display, a processor electrically connected with the communication module and the touch screen display, and a memory electrically connected with the processor, wherein the memory stores an application program configured to transmit and receive data to/from an external electronic device using the communication module, and instructions to enable the processor to execute operations when the application program is executed. The operations include displaying, in the touch screen display, a user interface of the application program that includes a first area that displays at least one of an image and text that is associated with a user who is related to the external electronic device and a second area that displays data shared with the external electronic device, receiving an input through at least a portion of the first area and the second area, and transmitting data through the communication module, based on at least a portion of the received input.

In accordance with another aspect of the present disclosure, an operation method of an electronic device is provided. The method includes displaying a user interface that includes a first area and a second area, the first area displaying at least one of an image and text that is associated with a user who is related to an external electronic device and the second area displaying data that is shared with the external electronic device, receiving an input through at least a portion of the first area and the second area, displaying an effect corresponding to the received input, and transmitting data to the external electronic device based on at least a portion of the received input.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5A to 5F and 6 are diagrams illustrating examples of various screen configurations of a user interface according to various embodiments of the present disclosure;

FIGS. 11A to 11C and 12A and 12B are diagrams illustrating an operation of changing a user interface according to various embodiments of the present disclosure;

FIG. 20 is a diagram illustrating an example of a knock event message format according to an embodiment of the present disclosure;

FIGS. 24 and 25A to 25E are diagrams illustrating other examples of a screen that processes a received event in an electronic device according to an embodiment of the present disclosure;

FIG. 27 is a diagram illustrating an example of a handwriting event message format according to an embodiment of the present disclosure;

FIG. 30 is a diagram illustrating an example of an emoticon event message format according to an embodiment of the present disclosure;

FIGS. 31A to 31D are diagrams illustrating an operation of executing communication using an electronic device according to various embodiments of the present disclosure;

FIGS. 33A to 33D are diagrams illustrating an operation of executing communication using an electronic device according to various embodiments of the present disclosure;

FIGS. 34A to 34C are diagrams illustrating an operation of executing communication using an electronic device according to various embodiments of the present disclosure;

FIG. 41 is a diagram illustrating an example of a content event message format according to an embodiment of the present disclosure;

FIGS. 42A to 42C are diagrams illustrating an example of a screen for each type of a message that is received as communication is executed in an electronic device according to various embodiments of the present disclosure;

FIG. 43 is a diagram illustrating an example of a confirm message format according to an embodiment of the present disclosure;

Throughout the drawings, like reference numerals will be understood to refer to like parts, components, and structures.

DETAILED DESCRIPTION

Figure 1:
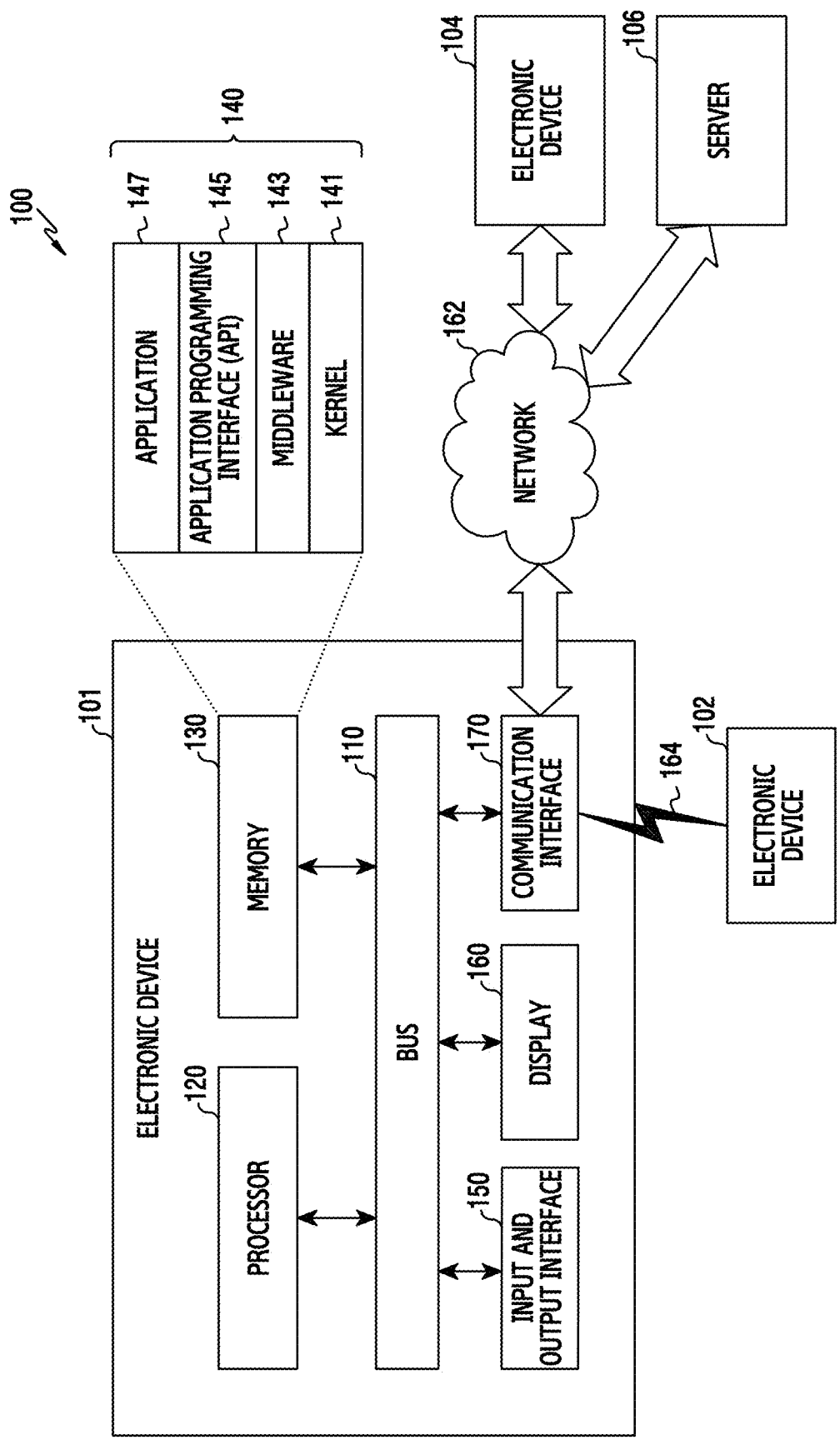
FIG. 1 illustrates a network environment including an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used herein, the expression "have", "may have", "include", or "may include" refers to the existence of a corresponding feature (e.g., numeral, function, operation, or constituent element such as component), and does not exclude one or more additional features.

In the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. A first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

The terms used in the present disclosure are only used to describe specific embodiments, and are not intended to limit the present disclosure. As used herein, singular forms may include plural forms as well unless the context clearly indicates otherwise. Unless defined otherwise, all terms used herein, including technical and scientific terms, have the same meaning as those commonly understood by a person skilled in the art to which the present disclosure pertains. Such terms as those defined in a generally used dictionary may be interpreted to have the meanings equal to the contextual meanings in the relevant field of art, and are not to be interpreted to have ideal or excessively formal meanings unless clearly defined in the present disclosure. In some cases, even the term defined in the present disclosure should not be interpreted to exclude embodiments of the present disclosure.

An electronic device according to various embodiments of the present disclosure may include at least one of, for example, a smart phone, a tablet personal computer (PC), a mobile phone, a video phone, an electronic book reader (e-book reader), a desktop PC, a laptop PC, a netbook computer, a workstation, a server, a personal digital assistant (PDA), a portable multimedia player (PMP), a Moving Picture Experts Group phase 1 or phase 2 (MPEG-1 or MPEG-2) audio layer 3 (MP3) player, a mobile medical device, a camera, and a wearable device. According to various embodiments of the present disclosure, the wearable device may include at least one of an accessory type (e.g., a watch, a ring, a bracelet, an anklet, a necklace, a glasses, a contact lens, or a head-mounted device (HMD)), a fabric or clothing integrated type (e.g., an electronic clothing), a body-mounted type (e.g., a skin pad, or tattoo), and a bio-implantable type (e.g., an implantable circuit).

According to various embodiments of the present disclosure, the electronic device may be a home appliance. The home appliance may include at least one of, for example, a television, a digital versatile disc (DVD) player, an audio, a refrigerator, an air conditioner, a vacuum cleaner, an oven, a microwave oven, a washing machine, an air cleaner, a set-top box, a home automation control panel, a security control panel, a television (TV) box (e.g., Samsung HomeSync™, Apple TV™, or Google TV™), a game console (e.g., Xbox™ and PlayStation™), an electronic dictionary, an electronic key, a camcorder, and an electronic photo frame.

According to various embodiments of the present disclosure, the electronic device may include at least one of various medical devices (e.g., various portable medical measuring devices (a blood glucose monitoring device, a heart rate monitoring device, a blood pressure measuring device, a body temperature measuring device, etc.), a magnetic resonance angiography (MRA), a magnetic resonance imaging (MRI), a computed tomography (CT) machine, and an ultrasonic machine), a navigation device, a global positioning system (GPS) receiver, an event data recorder (EDR), a flight data recorder (FDR), a vehicle infotainment devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.).

According to various embodiments of the present disclosure, the electronic device may include at least one of a part of furniture or a building/structure, an electronic board, an electronic signature receiving device, a projector, and various kinds of measuring instruments (e.g., a water meter, an electric meter, a gas meter, and a radio wave meter). The electronic device may be a combination of one or more of the aforementioned various devices. The electronic device may be a flexible device. However, the electronic device according to an embodiment of the present disclosure is not limited to the aforementioned devices, and may include a new electronic device according to the development of technology.

Hereinafter, an electronic device according to various embodiments of the present disclosure will be described with reference to the accompanying drawings. As used herein, the term "user" may indicate a person who uses an electronic device or a device (e.g., an artificial intelligence electronic device) that uses an electronic device.

FIG. 1 illustrates a network environment including an electronic device according to an embodiment of the present disclosure.

Referring to FIG. 1, an electronic device 101 within a network environment 100 may include a bus 110, a processor 120, a memory 130, an input/output interface 150, a display 160, and a communication interface 170. At least one of the above components may be omitted or additional components may be included.

The bus 110 may include, for example, a circuit which interconnects the components 110 to 170 and delivers a communication (e.g., a control message and/or data) between the components 110 to 170.

The processor 120 may include one or more of a central processing unit (CPU), an application processor (AP), and a communication processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. The memory 130 may store software and/or a program 140. The program 140 may include, for example, a kernel 141, middleware 143, an application programming interface (API) 145, and/or application programs (or "applications") 147. At least one of the kernel 141, the middleware 143, and the API 145 may be referred to as an operating system (OS).

The kernel 141 may control or manage system resources (e.g., the bus 110, the processor 120, or the memory 130) used for performing an operation or function implemented in the other programs (e.g., the middleware 143, the API 145, or the application programs 147). The kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data. The middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147. The middleware 143 may perform scheduling or loading balancing on the one or more task requests by processing the one or more task requests according to the priorities assigned thereto.

The API 145 is an interface through which the applications 147 control functions provided from the kernel 141 or the middleware 143, and may include, for example, at least one interface or function (e.g., instruction) for file control, window control, image processing, character control, and the like.

The input/output interface 150 may function as an interface that may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a liquid crystal display (LCD), a light-emitting diode (LED) display, an organic light-emitting diode (OLED) display, a MicroElectroMechanical Systems (MEMS) display, and an electronic paper display. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part.

The communication interface 170 may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). The wireless communication may use at least one of, for example, long term evolution (LTE), LTE-advance (LTE-A), code division multiple access (CDMA), wideband CDMA (WCDMA), universal mobile telecommunications system (UMTS), wireless broadband (WiBro), and global system for mobile communications (GSM), as a cellular communication protocol. In addition, the wireless communication may include, for example, short range communication 164. The short-range communication 164 may include at least one of, for example, Wi-Fi, Bluetooth, near field communication (NFC), and global navigation satellite system (GNSS). GNSS may include, for example, at least one of global positioning system (GPS), global navigation satellite system (Glonass), Beidou Navigation satellite system (Beidou) or Galileo (the European global satellite-based navigation system), based on a location, a bandwidth, or the like. Hereinafter, in the present disclosure, the "GPS" may be interchangeably used with the "GNSS". The wired communication may include, for example, at least one of a universal serial bus (USB), a high definition multimedia interface (HDMI), recommended standard 232 (RS-232), and a plain old telephone service (POTS). The network 162 may include at least one of a telecommunication network such as a computer network (e.g., a local area network (LAN) or a wide-area network (WAN)), the Internet, and a telephone network.

Each of the first and second external electronic devices 102 and 104 may be of a type identical to or different from that of the electronic device 101. According to an embodiment of the present disclosure, the server 106 may include a group of one or more servers.

According to various embodiments of the present disclosure, all or some of the operations performed in the electronic device 101 may be executed in another electronic device or a plurality of electronic devices (e.g., the electronic devices 102 and 104 or the server 106). When the electronic device 101 has to perform one or more functions or services automatically or in response to a request, the electronic device 101 may request another device (e.g., the electronic device 102 or 104 or the server 106) to execute at least one function relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

Figure 2:
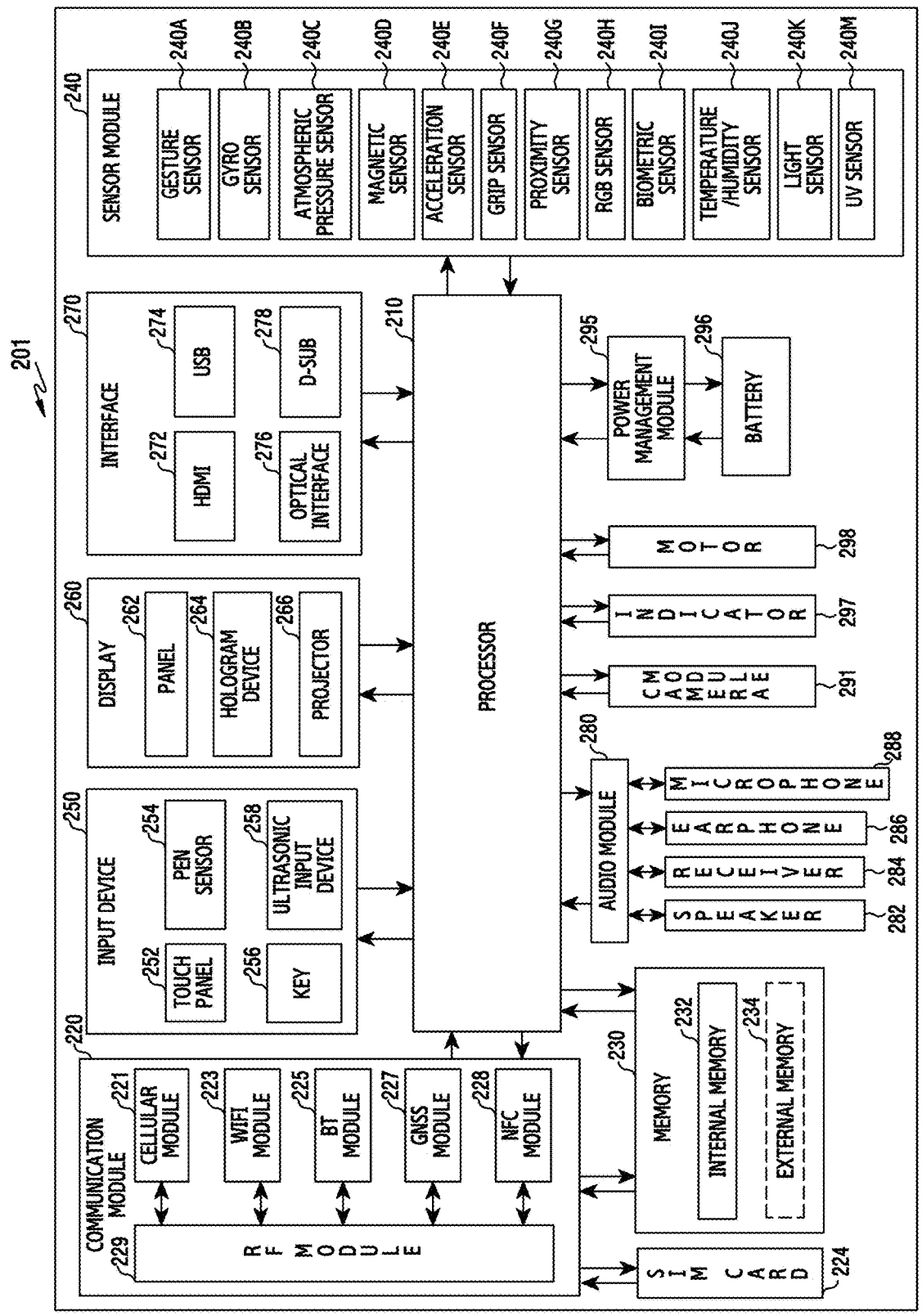
FIG. 2 is a block diagram of an electronic device according to an embodiment of the present disclosure.

FIG. 2 is a block diagram of an electronic device according to an embodiment of the present disclosure.

Referring to FIG. 2, an electronic device 201 may include, for example, all or a part of the electronic device 101 shown in FIG. 1. The electronic device 201 may include one or more processors 210 (e.g., AP), a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may control a plurality of hardware or software components connected to the processor 210 by driving an operating system or an application program, and perform processing of various pieces of data and calculations. The processor 210 may be embodied as, for example, a system on chip (SoC). The processor 210 may further include a graphic processing unit (GPU) and/or an image signal processor. The processor 210 may include at least one of the other components illustrated in FIG. 2 (e.g., a cellular module 221). The processor 210 may load, into a volatile memory, commands or data received from at least one of the other components and may process the loaded commands or data, and may store various data in a non-volatile memory.

The communication module 220 may have a configuration equal or similar to that of the communication interface 170 of FIG. 1. The communication module 220 may include, for example, a cellular module 221, a Wi-Fi module 223, a BT module 225, a GNSS module 227 (e.g., a GPS module 227, a Glonass module, a Beidou module, or a Galileo module), an NFC module 228, and a radio frequency (RF) module 229.

The cellular module 221 may provide a voice call, a video call, a text message service, or an Internet service through a communication network. The cellular module 221 may distinguish and authenticate the electronic device 201 in a communication network using the subscriber identification module (SIM) 224 (e.g., the SIM card). The cellular module 221 may perform at least one of the functions that the AP 210 may provide. The cellular module 221 may include a CP.

Each of the Wi-Fi module 223, the BT module 225, the GNSS module 227, and the NFC module 228 may include a processor for processing data transmitted/received through a corresponding module. At least two of the cellular module 221, the Wi-Fi module 223, the BT module 225, the GNSS module 227, and the NFC module 228 may be included in one integrated chip (IC) or IC package.

The RF module 229 may transmit/receive a communication signal (e.g., an RF signal). The RF module 229 may include a transceiver, a power amplifier module (PAM), a frequency filter, a low noise amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module.

The subscriber identification module 224 may include a card including a subscriber identity module and/or an embedded SIM, and may contain unique identification information (e.g., an integrated circuit card identifier (ICCID)) or subscriber information (e.g., an international mobile subscriber identity (IMSI)).

The memory 230 (e.g., the memory 130) may include an embedded memory 232 or an external memory 234. The embedded memory 232 may include at least one of a volatile memory (e.g., a dynamic random access memory (DRAM), a static RAM (SRAM), a synchronous dynamic RAM (SDRAM), and the like) and a non-volatile memory (e.g., a one time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory or a NOR flash memory), a hard disc drive, a solid state drive (SSD), and the like).

The external memory 234 may further include a flash drive, such as a compact flash (CF), a secure digital (SD), a micro secure digital (Micro-SD), a mini secure digital (Mini-SD), an eXtreme digital (xD), a Multi-Media-Card (MMC), a memory stick, or the like. The external memory 234 may be functionally and/or physically connected to the electronic device 201 through various interfaces.

The sensor module 240 may measure a physical quantity or detect an operation state of the electronic device 201, and may convert the measured or detected information into an electrical signal. The sensor module 240 may include at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance sensor 240K, and a ultra violet (UV) sensor 240M. Additionally or alternatively, the sensor module 240 may include an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. The electronic device 201 may further include a processor configured to control the sensor module 240, as a part of the processor 210 or separately from the processor 210, and may control the sensor module 240 while the processor 210 is in a sleep state.

The input device 250 may include a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user.

The (digital) pen sensor 254 may include, for example, a recognition sheet which is a part of the touch panel or is separated from the touch panel. The key 256 may include, for example, a physical button, an optical key, or a keypad. The ultrasonic input device 258 may detect, through a microphone (e.g., a microphone 288), ultrasonic waves generated by an input tool, and identify data corresponding to the detected ultrasonic waves.

The display 260 (e.g., the display 160) may include a panel 262, a hologram device 264, or a projector 266. The panel 262 may include a configuration identical or similar to the display 160 illustrated in FIG. 1. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located in the interior of or on the exterior of the electronic device 201. The display 260 may further include a control circuit for controlling the panel 262, the hologram device 264, or the projector 266.

The interface 270 may include a high-definition multimedia interface (HDMI) 272, a universal serial bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a mobile high-definition link (MHL) interface, a SD card/MMC interface, or an infrared data association (IrDA) standard interface.

The audio module 280 may bilaterally convert a sound and an electrical signal. At least one component of the audio module 280 may be included in the input/output interface 150 illustrated in FIG. 1. The audio module 280 may process voice information input or output through, for example, a speaker 282, a receiver 284, earphones 286, or the microphone 288.

The camera module 291 is a device which may photograph a still image and a video. The camera module 291 may include one or more image sensors (e.g., a front sensor or a back sensor), a lens, an image signal processor (ISP) or a flash (e.g., LED or xenon lamp).

The power management module 295 may manage power of the electronic device 201. The power management module 295 may include a power management integrated circuit (PMIC), a charger integrated circuit (IC), or a battery or fuel gauge. The PMIC may use a wired and/or wireless charging method. Examples of the wireless charging method include a magnetic resonance method, a magnetic induction method, an electromagnetic wave method, and the like. Additional circuits (e.g., a coil loop, a resonance circuit, a rectifier, etc.) for wireless charging may be further included. The battery gauge may measure a residual quantity of the battery 296, and a voltage, a current, or a temperature while charging. The battery 296 may include a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. Although not illustrated, the electronic device 201 may include a processing device (e.g., a GPU) for supporting a mobile TV. The processing device for supporting a mobile TV may process media data according to a certain standard such as digital multimedia broadcasting (DMB), digital versatile broadcasting (DVB), or mediaFLO™.

Each of the above-described component elements of hardware according to the present disclosure may be configured with one or more components, and the names of the corresponding component elements may vary based on the type of electronic device. According to various embodiments of the present disclosure, the electronic device may include at least one of the above-described elements. Some of the above-described elements may be omitted from the electronic device, or the electronic device may further include additional elements. Also, some of the hardware components according to various embodiments may be combined into one entity, which may perform functions identical to those of the relevant components before the combination.

Figure 3:
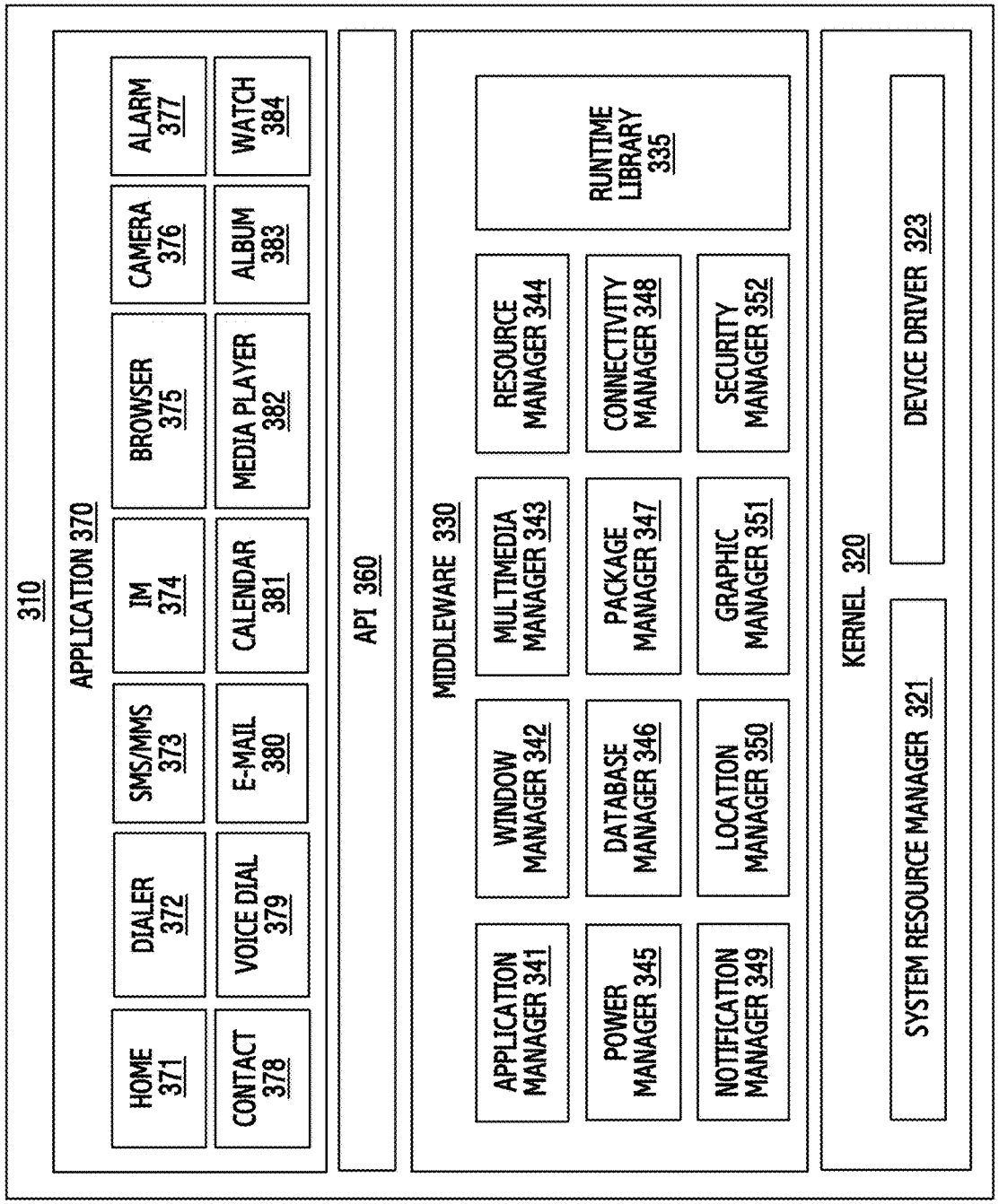
FIG. 3 is a block diagram of a program module according to an embodiment of the present disclosure.

FIG. 3 is a block diagram of a program module according to an embodiment of the present disclosure.

Referring to FIG. 3, a program module 310 (e.g., the program 140) may include an OS for controlling resources related to the electronic device (e.g., the electronic device 101) and/or various applications (e.g., the application programs 147) executed in the operating system. The operating system may be, for example, Android, iOS, Windows, Symbian, Tizen, Bada, or the like.

The program module 310 may include a kernel 320, middleware 330, an API 360, and/or applications 370. A portion of the program module 310 may be preloaded on an electronic device, or may be downloaded from an external electronic device (e.g., the electronic device 102 or 104, or the server 106).

The kernel 320 (e.g., the kernel 141) may include, for example, a system resource manager 321 and/or a device driver 323. The system resource manager 321 may control, allocate, or collect system resources. The system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an inter-process communication (IPC) driver.

The middleware 330 may provide a function required in common by the applications 370, or may provide various functions to the applications 370 through the API 360 so as to enable the applications 370 to efficiently use the limited system resources in the electronic device. The middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like.

The application manager 341 may manage, for example, a life cycle of at least one of the applications 370. The window manager 342 may manage graphical user interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code, a memory, and a storage space of at least one of the applications 370.

The power manager 345 may operate together with, for example, a Basic Input/Output System (BIOS) or the like to manage a battery or power source and may provide power information or the like required for the operations of the electronic device. The database manager 346 may generate, search for, and/or change a database to be used by at least one of the applications 370. The package manager 347 may manage installation or an update of an application distributed in a form of a package file.

The connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide all security functions required for system security, user authentication, or the like. When the electronic device (e.g., the electronic device 101) has a telephone call function, the middleware 330 may further include a telephony manager for managing a voice call function or a video call function of the electronic device.

The middleware 330 may include a middleware module that forms a combination of various functions of the above-described components. The middleware 330 may provide a module specialized for each type of OS in order to provide a differentiated function. Further, the middleware 330 may dynamically remove one or more of the existing components or add new components.

The API 360 (e.g., the API 145) is a set of API programming functions, and may be provided with a different configuration according to an OS. For example, in the case of Android or iOS, one API set may be provided for each platform. In the case of Tizen, two or more API sets may be provided for each platform.

The applications 370 (e.g., the application programs 147) may include, for example, one or more applications which may provide functions such as a home 371, a dialer 372, an SMS/MMS 373, an Instant Message (IM) 374, a browser 375, a camera 376, an alarm 377, contacts 378, a voice dial 379, an email 380, a calendar 381, a media player 382, an album 383, a clock 384, health care (e.g., measuring exercise quantity or blood sugar), or environment information (e.g., providing atmospheric pressure, humidity, or temperature information).

The applications 370 may include an application ("information exchange application") that supports exchanging information between the electronic device (e.g., the electronic device 101) and an external electronic device (e.g., the electronic device 102 or 104). The information exchange application may include a notification relay application for transferring specific information to an external electronic device or a device management application for managing an external electronic device.

The notification relay application may include a function of transferring, to the external electronic device (e.g., the electronic device 102 or 104), notification information generated from other applications of the electronic device 101 (e.g., an SMS/MMS application, an e-mail application, a health management application, or an environmental information application). The notification relay application may receive notification information from, for example, an external electronic device and provide the received notification information to a user.

The device management application may manage (e.g., install, delete, or update at least one function of an external electronic device (e.g., the electronic device 102 or 104) communicating with the electronic device (e.g., a function of turning on/off the external electronic device itself (or one or more components) or a function of adjusting the brightness (or a resolution) of the display), applications operating in the external electronic device, and services provided by the external electronic device (e.g., a call service or a message service).

The applications 370 may include applications (e.g., a health care application of a mobile medical appliance or the like) designated according to an external electronic device (e.g., attributes of the electronic device 102 or 104). The applications 370 may include an application received from an external electronic device (e.g., the server 106, or the electronic device 102 or 104). The applications 370 may include a preloaded application or a third party application that may be downloaded from a server. The names of the components of the program module 310 of the illustrated embodiment of the present disclosure may change according to the type of operating system.

At least a part of the programming module 310 may be implemented in software, firmware, hardware, or a combination of two or more thereof. A portion of the program module 310 may be implemented (e.g., executed) by, for example, the processor (e.g., the processor 210). At least a portion of the program module 310 may include, for example, a module, a program, a routine, a set of instructions, and/or a process for performing one or more functions.

The term "module" as used herein may refer to a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

At least one of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable recoding media may be, for example, the memory 130.

The computer readable recording medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added. Various embodiments disclosed herein are provided merely to easily describe technical details of the present disclosure and to help the understanding of the present disclosure, and are not intended to limit the scope of the present disclosure. Therefore, it should be construed that all modifications and changes or modified and changed forms based on the technical idea of the present disclosure fall within the scope of the present disclosure.

Various embodiments of the present disclosure relate to a user interface for communication between users and an electronic device and an operation method thereof, which provide the user interface. According to various embodiments of the present disclosure, an intuitive user interface may support communication between users based on a touch event, and may share contents intuitively and promptly.

Hereinafter, the communication described below may be used as a terminology that includes an operation of delivering or receiving intention information based on a touch event among a plurality of users (e.g., one-to-one, one-to-multiple, multiple-to-multiple) using a user interface. The intention information may be used as a terminology indicating various intentions that are input through a user interface and a user desires to deliver. For example, the intention information may include text that a user directly inputs (e.g., handwriting, a message, or the like), and various contents (e.g., emoticons, pictures, images, videos, or the like) that a user shares (attaches).

In various embodiments of the present disclosure described hereinafter, for ease of description, an operation of executing a communication function based on a user's touch event that is input based on a user interface, in a state in which electronic devices are connected directly or based on a predetermined server (or network), will be described. According to various embodiments of the present disclosure, an electronic device may include all devices that use one or more of various processors (e.g., the processor 120 and 210), such as an AP, a communication processor (CP), a GPU, a CPU, and the like, for example, all information communication devices, multimedia devices, wearable devices, and application device thereof.

According to various embodiments of the present disclosure, electronic devices may be connected through a set communication interface, and an electronic device may control another electronic device that is connected through a set communication interface, or may be controlled by another electronic device. Although a wireless connection, which is connected through a wireless communication interface that uses wireless network technology, is representatively described as a connection between electronic devices in various embodiments of the present disclosure, the connection between electronic devices may include a wired connection through a wired communication interface that uses a Universal Serial Bus (USB), a data connector, FireWire, i.Link, or the like. According to various embodiments of the present disclosure, a wireless network technology may include various wireless communication technologies for communication among various electronic devices, based on a short-range communication technology or a mobile communication technology. The wireless communication may use at least one of LTE, LTE-A, CDMA, WCDMA, UMTS, WiBro, global system for mobile communications (GSM), Wi-Fi, Bluetooth, NFC, IrDA, ultra-wideband (UWB), ZigBee, radio frequency identification (RFID), and the like.

Hereinafter, in various embodiments of the present disclosure, touch event-based communication, intuitive content sharing and a user interface related thereto, and an electronic device and an operation method of the electronic device that provides the user interface, will be described. However, various embodiments of the present disclosure may not be limited to the descriptions provided below, and thus, it should be construed that the present disclosure may be applied to various embodiments based on the embodiment provided below. Hereinafter, various embodiments of the present disclosure will be described from the perspective of hardware. However, various embodiments of the present disclosure include a technology that uses both hardware and software, and thus, the various embodiments of the present disclosure may not exclude the perspective of software.

Figure 4:
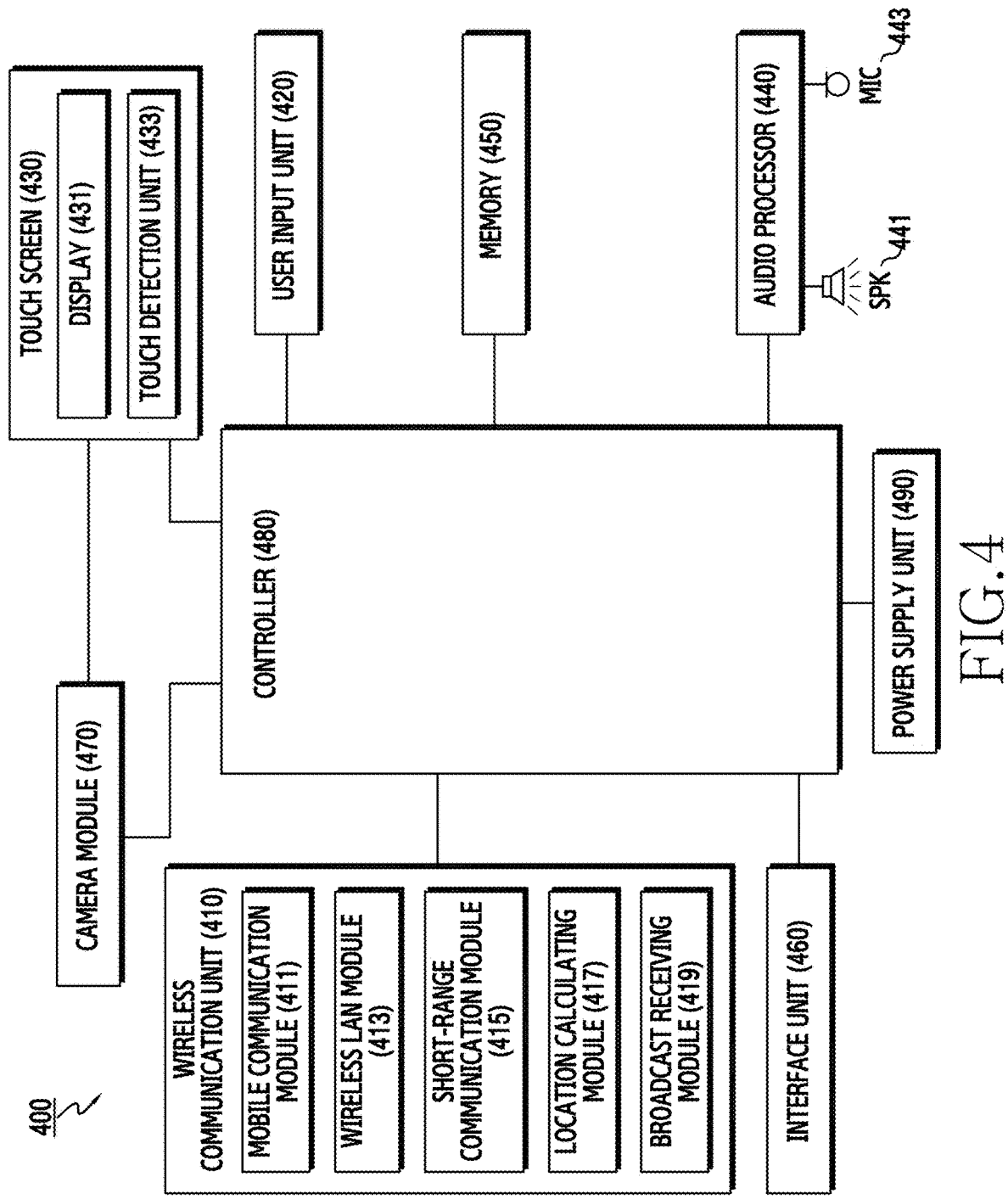
FIG. 4 is a diagram schematically illustrating a configuration of an electronic device according to an embodiment of the present disclosure.

FIG. 4 is a diagram schematically illustrating a configuration of an electronic device according to various embodiments of the present disclosure.

Referring to FIG. 4, an electronic device 400 may include a wireless communication unit 410, a user input unit 420, a touch screen 430 (e.g., a touch screen display), an audio processor 440, a memory 450, an interface unit 460, a camera module 470, a controller 480, and a power supply unit 490. The electronic device 400 may include fewer or more components.

The wireless communication unit 410 may include a configuration identical or similar to the communication module 220 of FIG. 2. The wireless communication unit 410 may include one or more modules that enable wireless communication between the electronic device 400 and a wireless communication system or between the electronic device 400 and another external device (e.g., the electronic device 102 or 104, or the server 160). For example, the wireless communication unit 410 may be configured to include a mobile communication module 411, a wireless local area network (WLAN) module 413, a short-range communication module 415, a location calculating module 417, a broadcast receiving module 419, and the like. The wireless communication unit 410 may execute wireless communication with another electronic device, based on a set communication scheme.

The mobile communication module 411 may transmit/receive a wireless signal to/from at least one of a base station, an external electronic device (e.g., the electronic device 104), and various servers (e.g., an integration server, a provider server, a content server, an Internet server, a cloud server, or the like) on a mobile communication network. The wireless signal may include a voice call signal, a video call signal, and data in various forms according to the transmission and reception of a text/multimedia messages.

The mobile communication module 411 may receive data (e.g., content, a message, mail, an image, a video, weather information, location information, time information, and the like). The mobile communication module 411 may obtain (receive) various data by being connected with at least one of other devices (e.g., the electronic device 104 or the server 106) that are connected with the electronic device 400 over a network (e.g., the mobile communication network). The mobile communication module 411 may transmit various data required for the operations of the electronic device 400 to the outside (e.g., the server 104, another electronic device 104, or the like), in response to a user's request.

The mobile communication module 411 may execute a communication function. For example, the mobile communication module 411 may convert a radio frequency (RF) signal into a baseband signal and transmit the same to the controller 480 under the control of the controller 480, or may convert the base band signal from the controller 480 into an RF signal and transmit the same. The controller 480 may process a baseband signal based on various communication schemes. For example, the communication scheme may include an Long-Term Evolution (LTE) communication scheme, an LTE advance (LTE-A) communication scheme, Global System for Mobile Communication (GSM) communication scheme, Enhanced Data GSM Environment (EDGE) communication scheme, Code Division Multiple Access (CDMA) communication scheme, W-Code Division Multiple Access (W-CDMA) communication scheme, or Orthogonal Frequency Division Multiple Access (OFDMA) communication scheme, but the communication scheme is not limited thereto.

The wireless LAN module 413 may indicate a module for establishing a wireless Internet access and a wireless LAN link with another device (e.g., the electronic device 102 or the server 106). The wireless LAN module 413 may be embedded in the electronic device 400 or may separately exist outside the electronic device 400. Wireless Internet technology may include Wi-Fi, wireless broadband (Wibro), world interoperability for microwave access (WiMax), high speed downlink packet access (HSDPA), millimeter wave (mmWave), or the like.

The wireless LAN module 413 may transmit or receive data selected by a user to/from the outside. The wireless LAN module 413 may work together with at least one of another electronic device and a server that are connected with the electronic device 400 over a network (e.g., a wireless Internet network), and may transmit or receive various data of the electronic device 400 to/from the outside (e.g., another electronic device or a server). The wireless LAN module 413 may always maintain the ON-state, or may be turned on based on settings of the electronic device 400 or a user input.

The short-range communication module 415 may be a module for performing short-range communication. The short-range communication technology may include Bluetooth, Bluetooth low energy (BLE), RFID, IrDA, UWB, ZigBee, NFC, and the like.

The short-range communication module 415 may receive data via short-range communication. The short-range communication module 415 works together with another electronic device that is connected with the electronic device 400 over a network (e.g., a short-range communication network), and transmits or receives various data of the electronic device 400 to/from the other electronic device. The short-range communication module 415 may always maintain the ON-state, or may be turned on based on the settings of the electronic device 400 or a user input.

The location calculating module 417 may be a module for obtaining the location of the electronic device 400, and may include a global position system (GPS) module as a representative example. The location calculating module 415 may measure the location of the electronic device 400, based on the principal of triangulation. For example, the position calculation module 417 may calculate three dimensional information associated with a current position according to a latitude, a longitude, and an altitude by calculating information associated with a distance away from three or more base stations and time information, and then applying triangulation to the calculated information. Furthermore, the position calculating module 417 may calculate location information by continuously receiving location information of the electronic device 400 from three or more satellites in real time. The location information of the electronic device 400 may be obtained by various methods.

The broadcast receiving module 419 may receive a broadcast signal (e.g., a TV broadcast signal, a radio broadcast signal, a data broadcast signal, and the like) and/or broadcast related information (e.g., information associated with a broadcast channel, a broadcast program, or a broadcast service provider) from an external broadcast management server through a broadcast channel (e.g., a satellite broadcast channel, a terrestrial broadcast channel, or the like).

The user input unit 420 may generate input data for controlling the operations of the electronic device 400 in response to a user input. The user input unit 420 may include at least one input device for detecting various inputs of a user. For example, the user input unit 420 may include a key pad, a dome switch, a physical button, a touch pad (resistive/capacitive type), jog and shuttle, a sensor (e.g., the sensor module 240), or the like.

A part of the user input unit 420 may be embodied outside the electronic device 400 in the form of a button, or a part or the whole of the user input unit 420 may be embodied as a touch panel. The user input unit 420 may receive a user input for initiating the operations of the electronic device 400 according to various embodiments of the present disclosure, or may generate an input signal based on a user input. For example, the user input unit 420 may receive various user inputs for executing a user interface for communication, selecting a target user for communication, delivering intention information, photographing an image, executing an application, inputting (writing or inserting) data, changing the position of the electronic device 400, displaying a content, transmitting or receiving data, or the like, and may generate an input signal based on the user input.

The touch screen 430 (e.g., a touch screen display) may indicate an input/output device that simultaneously executes an input function and a display function, and may include a display 431 (e.g., the display 160 or 260) and a touch detecting unit 433. The touch screen 430 may provide an input/output interface between the electronic device 400 and a user, may transfer a touch input of a user to the electronic device 400, and may serve as a medium that shows an output from the electronic device 400 to a user. The touch screen 430 may show a visual output to a user. The visual output may be shown in the form of text, graphics, videos, or a combination thereof. For example, the touch screen 430 may display various screens associated with operations of the electronic device 400, through the display 431. The various screens may include various UI-based screens which may be displayed to correspond to an executed application; for example, a screen in association with an operation of executing communication, a messenger screen, a call screen, a game screen, a video reproduction screen, a gallery screen, a webpage screen, a home screen, a network connection screen, or the like.

The touch screen 430 may detect an event based on at least one of a touch, a hovering, and an air gesture (e.g., a touch event, a hovering event, an air gesture event), which are provided from a user, through the touch detecting unit 433, while displaying a predetermined screen through the display 431, and may transfer an input signal associated with the event to the controller 480. The controller 480 may distinguish a transferred event and control the execution of an operation based on the distinguished event.

The display 431 may display (output) various information processed in the electronic device 400. For example, the display 431 may display a user interface UI or GUI associated with an operation in which the electronic device 400 executes a communication function. The display 431 may display a UI or a GUI associated with calling when the electronic device 400 operates in a calling mode. When the electronic device 400 is in a video call mode or a photographing mode, the display 431 may display a photographed or/and received image and a UI or GUI associated with operating the corresponding mode. The display 431 may display data associated with the use of the electronic device 400, content, or information associated with other electronic devices that are connected to a network. The display 431 may display various application execution screens corresponding to an executed application.

The display 431 may support displaying a screen based on a landscape mode, displaying a screen based on a portrait mode, or displaying a screen based on a change between the landscape mode and the portrait mode, according to a rotation direction (or an orientation) of the electronic device 400. The display 431 may use various displays (e.g., the display 160). Displays may be embodied as a transparent display formed in a transparent type or optical transparent type.

The touch detecting unit 433 may be mounted on the display 431, and may detect a user input that is in contact with, or in proximity to, the surface of the touch screen 430. The user input may include a touch event or a proximity event that is input based on at least one of a single-touch, a multi-touch, hovering, and an air gesture. For example, the user input may be input by a tap, a drag, a sweep, a flick, a drag & drop, or a drawing gesture (e.g., writing) or the like. The touch detecting unit 433 may detect a user input (e.g., a touch event or a proximity event) on the surface of the touch screen 430, generate a signal corresponding to the detected user input, and transfer the same to the controller 480. The controller 480 may control the execution of a function corresponding to an area where the user input (e.g., a touch event or a proximity event) is generated by a signal transferred from the touch detecting unit 433.

The touch detecting unit 433 may receive a user input for initiating the operations related to the use of the electronic device 400, or may generate an input signal based on the user input. The touch detecting unit 433 may be configured to convert a pressure applied to a predetermined part of the display 431 or a change in a capacitance generated from a predetermined part of the display 431 into an electrical input signal. The touch detecting unit 433 may detect a location and an area where an input means (e.g., a user's finger, an electronic pen, or the like) touches or approaches the surface of the display 431. The touch detecting unit 433 may also be configured to detect a pressure when a touch is given, based on an applied touching scheme. When a touch or proximity input with respect to the touch detecting unit 433 exists, a signal(s) corresponding thereto may be transferred to a touch screen controller (not illustrated). The touch screen controller (not illustrated) may process the signal(s), and transfer the corresponding data to the controller 480. Accordingly, the controller 480 may determine an area of the touch screen 430 where a touch or proximity input is given, and may process the execution of a function corresponding thereto.

The audio processor 440 may include a configuration identical or similar to the audio module 280 of FIG. 2. The audio processor 440 may transmit an audio signal received from the controller 480 to a speaker (SPK) 441, and may transfer, to the controller 480, an audio signal, such as a voice or the like, which is input from a microphone 443. The audio processor 440 may convert voice/sound data into audible sound through the speaker 441 based on the control of the controller 480, and may output the audible sound, and may convert an audio signal, such as a voice or the like, which is received from the microphone 443 into a digital signal and may transfer the digital signal to the controller 480. The audio processor 440 may output an audio signal that responds to a user input, based on audio processing information (e.g., sound effect, music file, or the like) included in data.

The speaker 441 may output audio data that is received from the wireless communication unit 410 or stored in the memory 450. The speaker 441 may output a sound signal associated with various operations (functions) executed by the electronic device 400. The speaker 441 may be in charge of outputting an audio stream, such as a voice recognition function, a voice replication function, a digital recording function, and a phone call function. Although not illustrated, the speaker 441 may include an attachable and detachable ear phone, a head phone, or a head set, and they may be connected to the electronic device 400 through an external port.

The microphone 443 may receive an external sound signal and process the same as electrical voice data. The voice data processed through the microphone 443 may be converted into a form that is transmittable to the outside through the mobile communication module 411 when the electronic device 400 is in a call mode. Various noise reduction algorithms may be implemented in the microphone 443 to remove noise generated in the process of receiving an external sound signal. The microphone 443 may be in charge of inputting an audio stream such as a voice command (e.g., a voice command for initiating a communication operation), a voice recognition function, a digital recording function, and a phone call function. For example, the microphone 443 may convert a voice signal into an electrical signal. The microphone 443 may include an embedded microphone that is contained in the electronic device 400 and an external microphone that is connected to the electronic device 100.

The memory 450 (e.g., the memory 130 and 230) may store one or more programs that are executed by the controller 480, and may execute a function for temporarily storing input/output data. The input/output data may include, for example, content, messenger data (e.g., conversation data), contact information (e.g., wired or wireless phone number or the like), a message, a media file (e.g., an audio file, a video file, an image file, or the like), or the like.

The memory 450 may store one or more programs and data, which are associated with transmitting and receiving related information in response to various events that a user inputs for communication when electronic devices are connected. For example, the memory 450 may store one or more programs that process an operation of displaying a user interface for communication, an operation of displaying a conversation partner, an operation of displaying content shared with a conversation partner, an operation of delivering or receiving information corresponding to a touch event, an operation of sharing a content, or the like, and data processed accordingly.

The memory 450 may store a frequency of use (e.g., a frequency of the connection of another electronic device, a frequency of the use of an application, a frequency of the use of a content, and the like) in association with the operations of the electronic device 400, importance, and priority, together. The memory 450 may store data associated with vibrations and sounds of various patterns that are output in response to a touch input or a proximity input made on the touch screen 430. The memory 450 may continuously or temporarily store an Operating System (OS) of the electronic device 400, a program associated with controlling inputting and displaying through the touch screen 430, a program associated with controlling various operations (functions) of the electronic device 400, and various data generated by operations of each program, and the like.

The memory 450 (e.g., the memories 130 and 230) may include an external memory (e.g., the external memory 234) or an embedded memory (e.g., the embedded memory 232). The electronic device 400 may also operate in relation to a web storage performing a storage function of the memory 450 on the Internet.

The memory 450 may store various software. For example, the components of software may include, an operating system, a software module, a communication software module, a graphic software module, a user interface software module, a Moving Picture Experts Group (MPEG) module, a camera software mode, and one or more application software modules, and the like. Further, since a module, which is a component of software, may be expressed as a set of instructions, the module is also expressed as an instruction set. The module is also expressed as a program. The memory 450 may include an additional module (instructions) in addition to the above described modules. Alternatively, some modules (instructions) may not be used when necessary.

The operating system software module may include various software components that control a general system operation. The control of such general system operations refers to, for example, memory management and control, storage hardware (device) management and control, power management and control, and the like. The operating system software module may also execute a function that supports smooth communication between various hardware (devices) and software components (modules).

The communication software module may enable communication with another electronic device, such as a wearable device, a device, a computer, a server, a portable terminal, or the like, through the wireless communication unit 410 or the interface unit 460. The communication software module may be formed in a protocol structure corresponding to a corresponding communication scheme.

The graphic software module may include various software components for providing and displaying graphics on the touch screen 430 (e.g., a touch screen display). The term "graphics" may include text, a webpage, an icon, a digital image, a video, animation, and the like.

The user interface software module may include various software components associated with a UI. For example, the user interface software module may include the content associated with how the state of the UI changes, a condition where the state of the UI is changed, or the like.

The Moving Picture Experts Group phase 1 or phase 2 (MPEG) module may include a software component that enables processes and functions (e.g., generating, playing back, distributing, and transmitting a content, or the like) associated with a digital content (e.g., video or audio).

The camera software module may include a camera-related software component that enables camera related processes and functions.

The application module may include a web browser that includes a rendering engine, an email, an instant message, word processing, keyboard emulation, an address book, a touch list, a widget, digital right management (DRM), voice recognition, a position determining function, a location based service, and the like. The application module may include instructions for executing communication using an electronic device. For example, the application module may provide a user interface that is set for communication, may execute a process to deliver intention information of a user to another electronic device in response to a touch event input through the user interface, or execute a process to receive intention information from another electronic device, and to output (display, vibration, or the like) the same.

The interface unit 460 may include a configuration identical or similar to the interface 270 of FIG. 2. The interface unit 460 may serve as an interface with all other external devices that are connected to the electronic device 400. The interface unit 460 may receive data or power from an external device and transmit the same to each component of the electronic device 400, or enable data inside the electronic device 400 to be transmitted to an external device. For example, the interface unit 460 may include a wired/wireless headset port, an external charger port, a wired/wireless data port, a memory card port, a port for connecting a device provided with an identification module, an audio input/output port, a video input/output port, an earphone port, and the like.

The camera module 470 (e.g., the camera module 291) may indicate a configuration that supports a photographing function of the electronic device 400. The camera module 470 may support capturing an image (a still image or a moving image) of a subject. The camera module 470 may photograph a subject based on the control of the controller 480, and may transfer the photograph data to the display 431 and the controller 480. The camera module 470 may include an image sensor or a camera sensor (not illustrated) for converting an input photo signal into an electric signal, and an image signal processing unit (not illustrated) for converting the electric signal input from the image sensor into a digital image data. The image sensor may include a sensor using a charge-coupled device (CCD), a complementary metal-oxide-semiconductor (CMOS), or the like. Additionally or alternatively, the camera module 470 may include a color sensor for distinguishing colors by sensing a wavelength of light that an object radiates or reflects. The camera module 470 may support an image processing function to support photographing according to various photographing options (e.g., zooming, a screen ratio, an effect (e.g., sketch, mono, sepia, vintage, mosaic, and a picture frame)) in accordance with a user's settings.

The controller 480 may control the general operations of the electronic device 400. For example, the controller 480 may execute a control associated with a voice communication, a data communication, a video communication, or the like. The controller 480 may include one or more processors (e.g., the processor 210), or the controller 480 may be referred to as a processor. The controller 480 may include a CP, an AP, an interface (e.g., general purpose input/output (GPIO)), an embedded memory, or the like as separate components, or may integrate the above components as one or more integrated circuits. The application processor may execute various software programs and perform various functions for the electronic device 400, and the communication processor may execute a process and a control for the voice communication and data communication. The controller 480 may also execute a predetermined software module (instruction set) stored in the memory 450, and may execute various predetermined functions corresponding to the module.

The controller 480 may control an operation associated with supporting communication between users through a given user interface by working together with electronic devices. For example, the controller 480 may control the display 431 to process data transferred from the user input unit 420 or the wireless communication unit 410, and to display a result of the process. The controller 480 may control the wireless communication unit 410 for communication with an external device (e.g., a server or another electronic device), based on data transferred from the user input unit 420 or data stored in the memory 450.

The controller 480 may execute a control to transmit an event in various transmission schemes based on a user input. The controller 480 may transmit a corresponding event in response to a user input in real time, or may accumulate an event corresponding to a user input until a set condition is satisfied, and transmit the accumulated events. The controller 480 receives various responses corresponding to event transmission, and provides a feedback effect to be different for each transmitted event, based on a received response. For example, when a confirm message is received with respect to a transmitted event, the controller 480 may display an indication indicating that a conversation partner reads the transmitted event. When a presence message is received with respect to a transmitted event, the controller 480 may display presence information indicating that a conversation partner is in a presence state. When a non-confirm message is received with respect to a transmitted event, the controller 480 may display an indication indicating that the event is not checked by a conversation partner.

When an event is received from another electronic device, the controller 480 may process outputting an event corresponding to a type of event. The controller 480 may determine whether a user checks a received event, and determines a presence state of the user when the user does not check the event. The controller 480 may process notification or non-notification with respect to the reception of an event based on the presence state of the user.

The operations of the controller 480, according to various embodiments of the present disclosure, are described below with reference to the drawings.

The controller 480 may work together with software modules stored in the memory 450, and execute a communication function of the electronic device 400 according to various embodiments of the present disclosure. The controller 480 may be embodied as one or more modules that process the above described various functions. The controller 480 may be embodied as one or more processors that control operations (e.g., an operation of executing a communication function based on a touch event using a user interface) of the electronic device 400 by executing one or more programs stored in the memory 450.

The controller 480 may control various operations associated with normal functions of the electronic device 400, in addition to the above described functions. For example, when a specific application is executed, the controller 480 may control the operation and displaying of a screen for the specific application. the controller 480 may also receive input signals corresponding to various touch event inputs or proximity event inputs that are supported by a touch-based or proximity-based input interface (e.g., the touch screen 430), and may control operating functions corresponding thereto. Moreover, the controller 480 may also control the transmission/reception of various data based on wired communication or wireless communication.

The power supply unit 490 may receive an external power or an internal power based on the control of the controller 480, and may supply power required for the operation of each component. The power supply unit 490 may turn on or off the power supplied to one or more processors of the controller 480, the display 431, the wireless communication unit 410, and the like, under the control of the controller 480.

Various embodiments described in the present disclosure may be implemented in a computer (or similar device)-readable recording medium using software, hardware or a combination thereof. According to the hardware implementation, the embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and electrical units for performing other functions.

The recording medium may include a computer readable recording medium that stores a program for implementing an operation of displaying a user interface that includes a first area (e.g., a conversation partner display area) for displaying information associated with a conversation partner for communication, and a second area (e.g., a common area) for displaying a content shared with the conversation partner, and an operation of transmitting and receiving an event corresponding to the communication and displaying related information based on the user interface.

In some cases, the embodiments described in the present specification may be implemented by the controller 480 itself. Furthermore, according to the software implementation, the embodiments such as procedures and functions described in the present specification may also be implemented by separate software modules. The software modules may perform one or more functions and operations described in the present specification.

At least one of the functions executed by the electronic device 400 may be executed by an external device (e.g., the server 106) thereof. For example, the server 106 may include a processing module corresponding to the controller 480, may process, using the processing module, at least one of the functions associated with controlling the execution of a communication function of the electronic device 400, based on at least one of the information transferred from the electronic device 400, and may transmit a result of processing to the electronic device 400.

As described above, the electronic device 400, according to various embodiments of the present disclosure, may include a communication module; a touch screen display; a processor that is electrically connected with the communication module and the touch screen display; and a memory that is electrically connected with the processor, wherein the memory stores an application program that is configured to transmit and receive data to/from an external electronic device using the communication module, as well as instructions to enable the processor to display a user interface of the application program in the touch screen display when the application program is executed. The user interface includes a first area that displays at least one of an image and text that is associated with a user who is related to the external electronic device; and a second area that displays data that is shared with the external electronic device; and the first area overlaps with at least a part of the second area.

As described above, the electronic device 400, according to various embodiments of the present disclosure, may include a communication module; a touch screen display; a processor that is electrically connected with the communication module and the touch screen display; and a memory that is electrically connected with the processor, wherein the memory stores an application program that is configured to transmit and receive data to/from an external electronic device using the communication module, as well as instructions to enable the processor to execute operations when the application program is executed. The operations include displaying, in the touch screen display, a user interface of the application program that includes a first area that displays at least one of an image and text that is associated with a user who is related to the external electronic device and a second area that displays data shared with the external electronic device; receiving an input through at least a portion of the first area and the second area; and transmitting data through the communication module, based on at least a portion of the received input.

As described above, the electronic device 400, according to various embodiments of the present disclosure, may include the touch screen 430 (e.g., a touch screen display) that displays (e.g., via the display 431) a user interface including a first area (e.g., a conversation partner display area) for displaying a conversation partner and a second area (e.g., a common area) for displaying content shared with the conversation partner, and that receives (e.g., via the touch detecting unit 433) a user input based on the first area or the second area; a communication unit (e.g., the mobile communication module 411 or the wireless LAN module 413) that transmits an event based on the first area or the second area, or receives an event from an electronic device of the conversation partner; and the controller 480 that executes a control to recognize an event corresponding to a user input that is based on the first area or the second area, to display a feedback effect corresponding to the event through the first area or the second area where the user input is detected, to transmit the event to an electronic device of a conversation partner in the first area, to display, through the first area or the second area, information associated with a response that is received from the electronic device in response to the event.

FIGS. 5A to 5F and 6 are diagrams illustrating examples of various screen configurations of a user interface according to various embodiments of the present disclosure.

Referring to FIGS. 5A to 5F and FIG. 6, the electronic device 400 may provide a user interface for communication, by including a conversation partner display area 500 and a common area 600 (or a conversation area) in at least a part of the display 431. The user interface may further include an interface area 700 (or a control area) that controls the common area 600.

The conversation partner display area 500 may be an area that displays information associated with at least one conversation partner (e.g., a target user for communication) from among registered conversation partners. The conversation partner may be registered based on contact information, an account, a device or IP address, location information, and the like. The indication of the conversation partner (e.g., information) may be configured with an image, text, or a combination thereof. The conversation partner display area 500 may receive an input of a user in addition to a function of displaying information indicating a conversation partner. The conversation partner display area 500 may display user information (e.g., a conversation partner) of one or more different electronic devices, and may be configured in various forms. The conversation partner display area 500 may be formed in a figure that is identical or similar in shape to the common area 600.

The common area 600 may indicate an area indicating content shared with a user of another electronic device (e.g., a conversation partner). For example, the common area 600 may indicate an area for sharing a message or a content. According to various embodiments of the present disclosure, the message may include Knock, Hand Write, characters, or the like, which is provided by a touch event-based input of a user, such as a touch, a pen, a gesture, or the like. The content may include a picture, a video, or the like that is stored inside or outside an electronic device.

The content may include an image, a video, voice, or the like that is photographed in real time. The common area 600 may be used as a playback area that displays a video or an animation image, when the video or animation image is played back. The common area 600 may be used as a common data generating area for generating various content, in addition to sharing a message and a content. For example, the common area 600 may be used as a camera preview area, or a work area for generating an emoticon. The common area 600 may display a screen that is shared with another electronic device, and may be configured in various forms.

The common area 600 may be formed in a figure that is identical or similar in shape to the conversation partner display area 500, or in a figure that is different in shape from the conversation partner display area 500, and may be provided by being adjacent to, or by overlapping with, the conversation partner display area 500.

The interface area 700 may provide a first interface for selecting a function (operation) to be executed through the common area 600, or may provide a second interface for executing a control related to a function executed (displayed) in the common area 600. In the interface area 700, the first interface and the second interface are in a master-servant relationship. When a predetermined function is executed through the first interface, the first interface may be changed to the second interface corresponding to the predetermined function. The interface area 700 may include one or more functions, and may provide multiple functions through a single interface. According to an embodiment of the present disclosure, the interface area 700 may provide an item (e.g., an icon, a button, a jog dial) that simultaneously executes a plurality of functions (e.g., taking and transmitting a picture). According to various embodiments of the present disclosure, the interface area 700 may be omitted.

A user interface including the conversation partner display area 500, the common area 600, and the interface area 700 (optionally) may be configured (disposed) variously, based on settings of the electronic device 400, as illustrated in FIGS. 5A, 5B, 5C, 5D, 5E, and 5F. The user interface may be configured in various forms, including the above described areas. In the descriptions provided below, an example in which a user interface according to various embodiments of the present disclosure is configured in a form of FIG. 5D, will be described.

Figure 6:
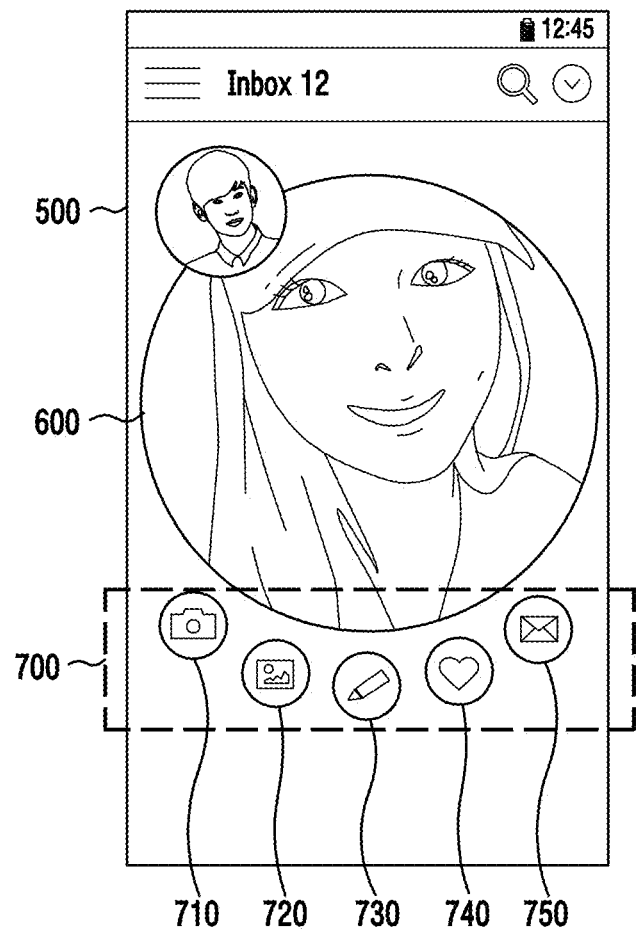

Referring to FIG. 6, for ease of description, the conversation partner display area 500 may be used interchangeably with a circle, and the common area 600 may be used interchangeably with a shared wall.

The conversation partner display area 500 (or circle) may display a profile picture of a user, presence information, transmission and reception of a real-time signal (e.g., a signal corresponding to a touch event), or an unread flag, or the like.

The common area 600 (or shared wall) may display a screen that is shared with a conversation partner (partner) that has a connection, and may display a screen that includes at least one of a picture, a video, a memo, an emoticon, and the like that corresponds to a user input. The common area 600 may provide a welcome address, guidance, or the like when a user interface is initially executed (initially enters), and auto-play and a playback button may be displayed when a video is initially viewed. The common area 600 may provide an item that may store, in the electronic device 400, a screen (a content) displayed in the common area 600.

The interface area 700 may provide various items (e.g., a button) that may input or control a content shared (displayed) in the common area 600. For example, the interface area 700 may include a button 710 for entering a camera-related function (e.g., photo, video, or the like), a button 720 for entering a gallery function, a button 730 for entering a memo function, a button 740 for entering an emoticon function, a button 750 for entering a message function, and the like. The interface area 700 may be configured to include some or all of the above described items, or may be configured to further include various items based on the settings of the electronic device 400. The interface area 700 may also be replaced with another item of a sub-function corresponding to a function that begins when the corresponding function begins by a predetermined button out of the buttons, or displaying of the interface area 700 may be omitted in a similar fashion.

According to various embodiments of the present disclosure, a screen may be switched so as to display a conversation view of communication that may be executed with a corresponding contact, in association with a function that operates based on a link to a separate communication application (e.g., a message (SMS, MMS), a messenger (IM), a video call, or the like) in the interface area 700. In the case of a button related to a message function, a message function may be executed in response to inputting the corresponding button, and a screen is switched so as to display a message writing screen in which a conversation partner of the conversation partner display area 500 is automatically input as a recipient. In the case of a button related to a messenger function, a message function may be executed in response to inputting the corresponding button, and a screen is switched so as to display a conversation screen for conversation with the conversation partner of the conversation partner display area 500.

According to various embodiments of the present disclosure, a conversation view for communication that may be executed with a corresponding contact may be provided in the common area 600, in association with a function that operates based on a link to a separate communication application (e.g., a message (SMS, MMS), a IM, a video call, or the like) in the interface area 700. In the case of a button related to a video call, a video call function that includes the conversation partner of the conversation partner display area 500 as a recipient may be executed in the common area 600 in response to inputting the corresponding button.

As illustrated in FIG. 6, when an item is selected which switches a state in which a user interface is expanded (e.g., a state in which all of the areas 500, 600, and 700 are displayed or an expanded circle) into a reduced state (e.g., a state of being displayed as a widget or an icon based on information associated with a conversation partner of the conversation partner display area 500 or a state of being displayed as a floating circle), or when an area excluding a first area, a second area, and a third area of the user interface is selected, the expanded circle may be displayed to be the floating circle, and one of the applications that are executed as a background (e.g., a most significant application or an application that is used immediately before, out of the applications that are executed as a background) may be selected as a foreground application and may be provided. An example of a screen thereof is illustrated below in FIG. 7.

As described above, according to various embodiments of the present disclosure, a user interface that supports communication in the electronic device 400 may include a first area (e.g., the conversation partner display area 500) for displaying information associated with a conversation partner for communication, a second area (e.g., the common area 600) for displaying a content shared with the conversation partner, and the first area and the second area are configured in figures (e.g., a circle shape and the like) that are similar in shape, and the second area may be adjacent to the first area, or may overlap at least a part of the first area.

According to various embodiments of the present disclosure, the user interface may include a third area (e.g., the interface area 700) that controls the second area.

According to various embodiments of the present disclosure, the first area displays information associated with at least one conversation partner out of registered conversation partners for communication. The conversation partner may be registered based on contact information, an account, a device or Internet Protocol (IP) address, and location information. The information may be configured with an image, text, or a combination thereof.

According to various embodiments of the present disclosure, the first area and the second area receive a user input, and may display data corresponding to the user input. The user input may include a touch-based input provided through the first area or the second area.

According to various embodiments of the present disclosure, the second area may be used as a data display area, a content playback area, a camera preview area, or an emoticon generation area, based on a user input.

According to various embodiments of the present disclosure, the third area may include a first interface for executing a function through the second area, and a second interface for executing a control related to a function executed in the second area. The first interface and the second interface may be in a master-servant relationship. The first interface may be changed to the second interface in response to the execution of the function through the first interface.

According to various embodiments of the present disclosure, the third area may include one or more interfaces (e.g., a uni-function button or a selection button in a form of a jog dial) corresponding to the execution of the function through the second area, and an interface (e.g., a multi-function button) corresponding to multiple functions for executing the function through the second area and for sharing data.

According to various embodiments of the present disclosure, the user interface may be displayed as an entire screen or a partial screen, and may display a part excluding the first area and the second area to be transparent or semitransparent, or display an image stored in the electronic device 400 or an external electronic device after executing a filter processing (e.g., blur or monochrome).

According to various embodiments of the present disclosure, based on a user input in an area excluding the first area and the second area, the first user interface (e.g., an expanded circle) including the first area and the second area is changed to the second user interface (e.g., a floating circle) including the first area.

According to various embodiments of the present disclosure, the second user interface displays an information reception notification corresponding to the second area.

According to various embodiments of the present disclosure, in response to a user input based on the first area or the second area, an event is transmitted to an electronic device of the conversation partner. The state of the conversation partner with respect to the event is reported based on the first area or the second area.

According to various embodiments of the present disclosure, the state notification of the user may include displaying information associated with whether a user checks (e.g., read/unread) the event, or presence information, based on the first area or the second area.

Figure 7:
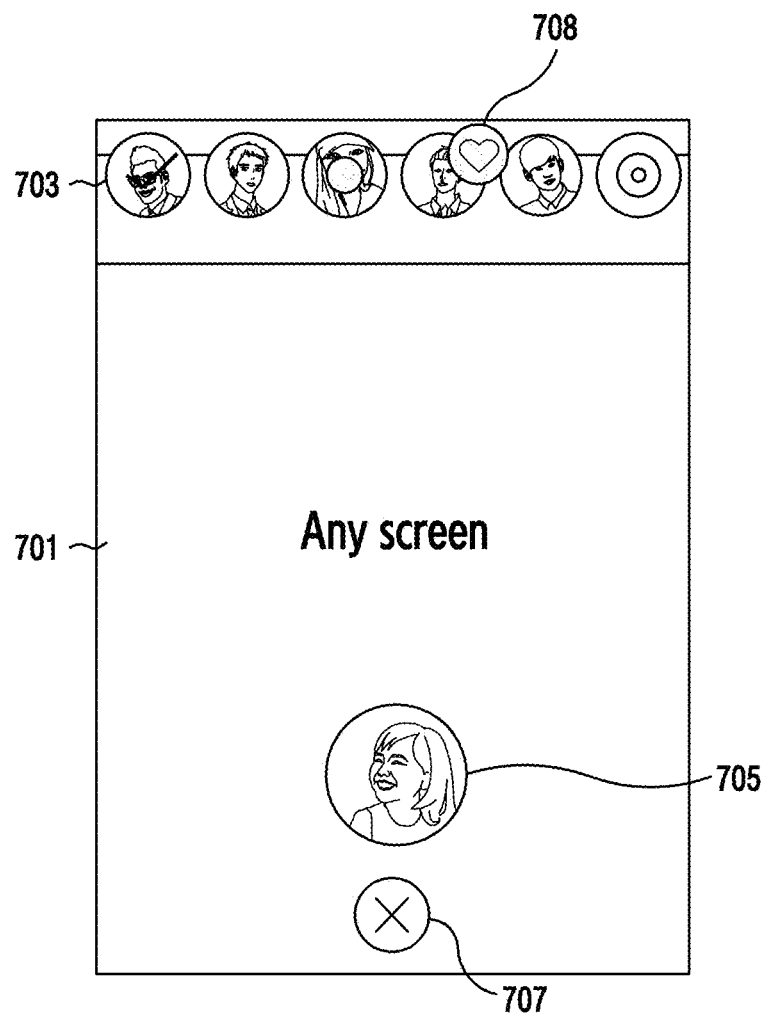
FIG. 7 is a diagram illustrating an example of a user interface according to an embodiment of the present disclosure.

FIG. 7 is a diagram illustrating an example of a user interface according to an embodiment of the present disclosure.

Referring to FIG. 7, an example is illustrated of a screen that is provided after a user interface is changed to a floating circle. According to various embodiments of the present disclosure, a user interface in the form of an expanded circle (hereinafter referred to as an expanded circle) may be changed to a user interface in the form of a floating circle (hereinafter referred to as a floating circle 705), based on a user input, and vice versa.

A floating circle as illustrated in the diagram 705 of FIG. 7 may be provided based on the conversation partner display area 500 of the expanded circle. In the case of the change into the floating circle, one of the applications that are executed as a background may be selected as a foreground application and a screen 701 thereof may be provided. The floating circle 705 may freely move to any area of the screen 701.

A terminating area 707 may be separately provided, which terminates (e.g., terminates (dismisses) a function (operation)) the communication that is executed based on the user interface. According to an embodiment of the present disclosure, a user may move (e.g., drag & drop) the floating circle 705 to the terminating area 707, so as to terminate the communication function.

A member tray 703 (or switch list) that may change (select) a conversation partner based on a user input, may be provided. The member tray 703 may be displayed when a predetermined input (e.g., a long press) is provided based on the floating circle 705, or may be displayed in response to selecting an item (button) for displaying the member tray 703. The member tray 703 may display at least one user out of registered users (conversation partners) of other electronic devices for the communication based on the user interface.

The user may select an item (icon) that indicates a predetermined conversation partner in the member tray 703 so as to change a conversation partner, or may select the item (icon) and move (e.g., drag & drop) the icon to the floating circle 707, so as to change a conversation partner. The locations of the conversation partners may be changed in the member tray 703, based on a user input. The user may change the locations of the members based on a user input (e.g., drag & release) that selects an item of a predetermined conversation partner, moves the selected item to an item of another conversation partner in a desired location, and releases the selected item. When an event is received from a predetermined conversation partner in the user member tray 703, a notification 708 indicating that the event is received may be displayed near the predetermined conversation partner.

FIGS. 8, 9A to 9E, and 10 are diagrams illustrating examples of managing a conversation partner in a user interface according to various embodiments of the present disclosure.

Figure 8:
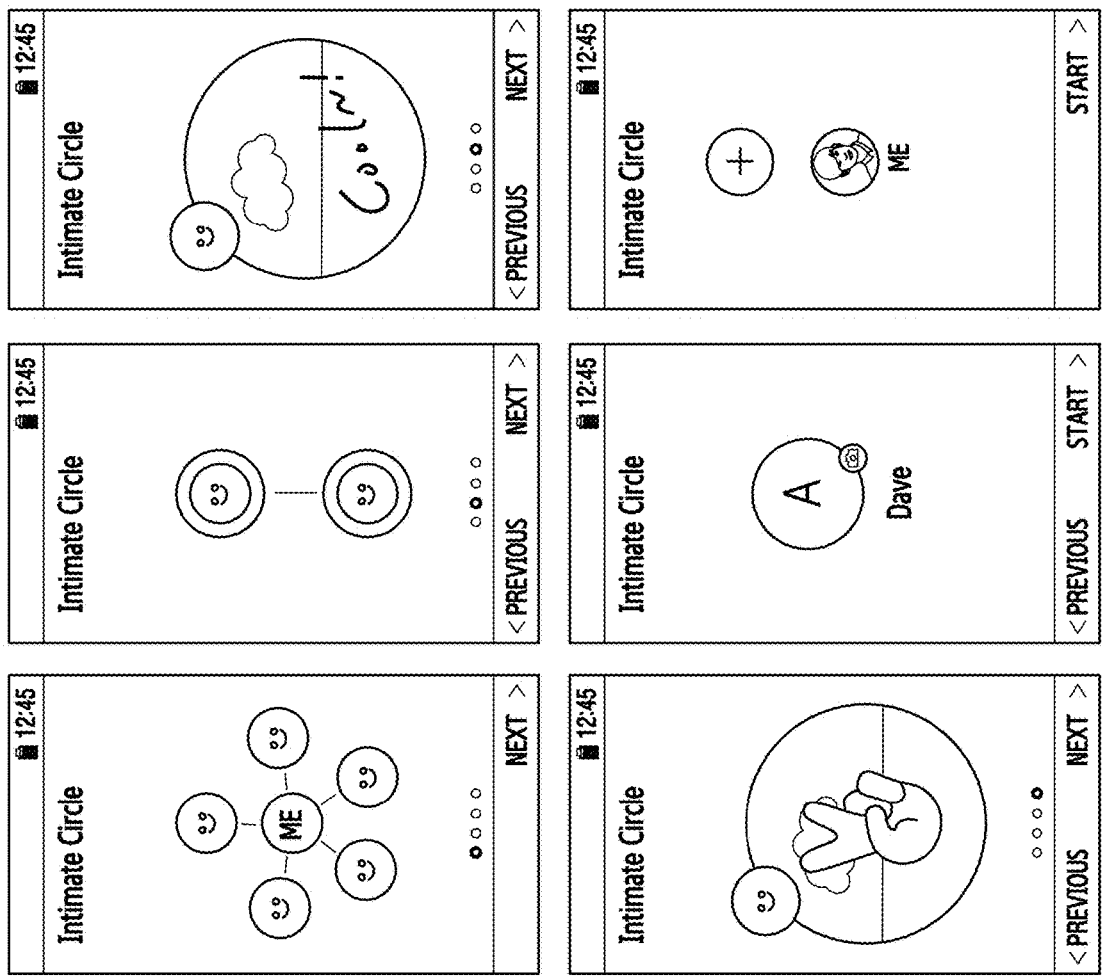
FIGS. 8, 9A to 9E, and 10 are diagrams illustrating examples of managing a conversation partner in a user interface according to various embodiments of the present disclosure.

Referring to FIG. 8, examples are illustrated of a screen that initially executes communication based on a user interface according to various embodiments of the present disclosure.

As illustrated in FIG. 8, when an application (e.g., a communication function) is initially executed based on a user interface by a user, the electronic device 400 may provide guidance (introduction) of various functions in association with the execution of communication through the user interface as illustrated in FIG. 8, and subsequently, may provide a member registration screen as illustrated in FIGS. 9A to 9E.

Referring to FIGS. 9A to 9E, a user may register a member based on contact information, an account, and information associated with an Internet Protocol (IP) or a device (e.g., a communication scheme, proximity, location information, and the like) which are set in the electronic device 400. The electronic device 400 may display a registered member based on a user input, or may display a screen for adding a new member based on a user input, in a member registration screen, as illustrated in FIGS. 9A, 9B, 9C, and 9D. A user may activate contact information using a member registration item 910 in the member registration screen, and may register a member by selecting a conversation partner in the activated contact information. The electronic device 400 may execute displaying in the member registration screen (e.g., the screens of FIGS. 9A, 9B, 9C, and 9D), based on at least one of the information (e.g., an image, text, a phone number, or the like) associated with a conversation partner corresponding to the user input.

As illustrated in an example of a screen of FIG. 9E, the electronic device 400 may display a screen for deleting a previously registered member in response to a user input, in the member registration screen. The user may delete a member based on an input (e.g., drag & drop) that selects a previously registered member from the member registration screen and moves the member to a member deleting item 930. The electronic device 400 may omit displaying information associated with the conversation partner corresponding to the user input, in the member registration screen.

The member may be added or deleted based on contact information, or may be added or deleted based on a phone number, an account, IP or device information (e.g., a communication scheme, proximity, and location information).

Figure 9:
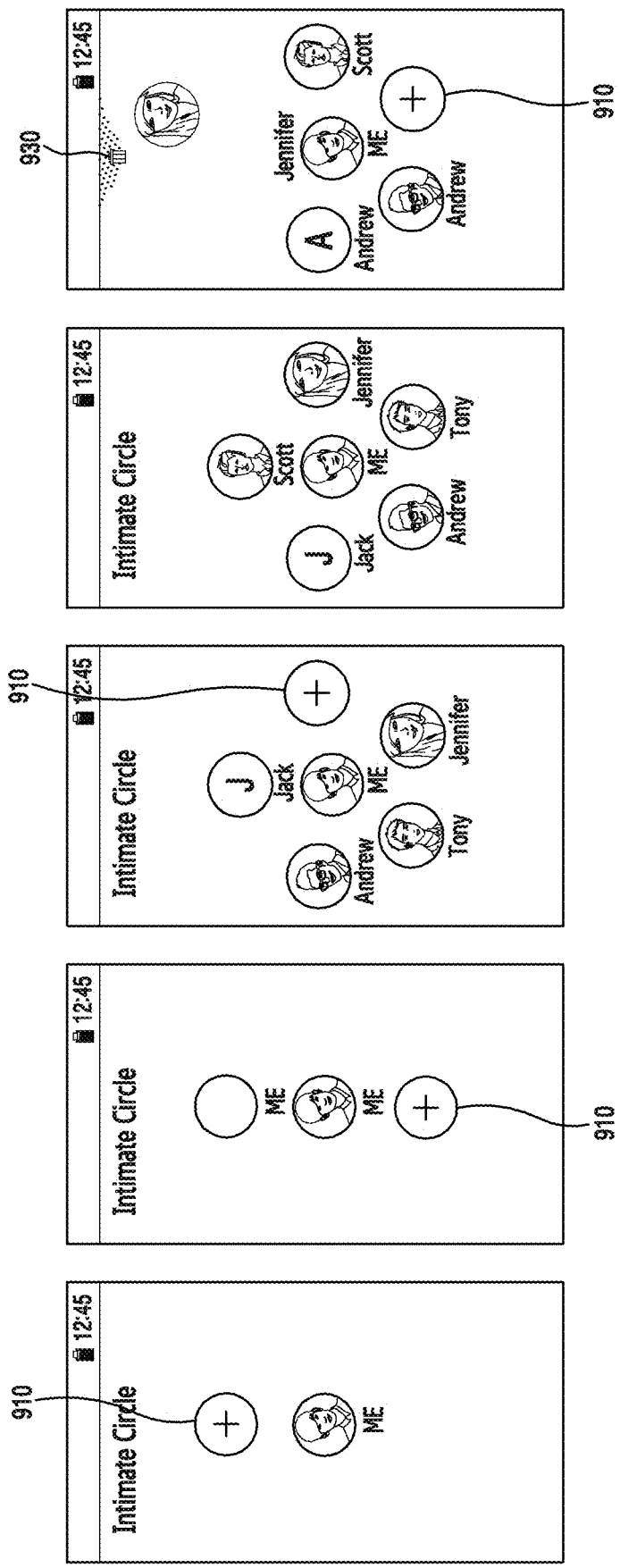
Figure 10:
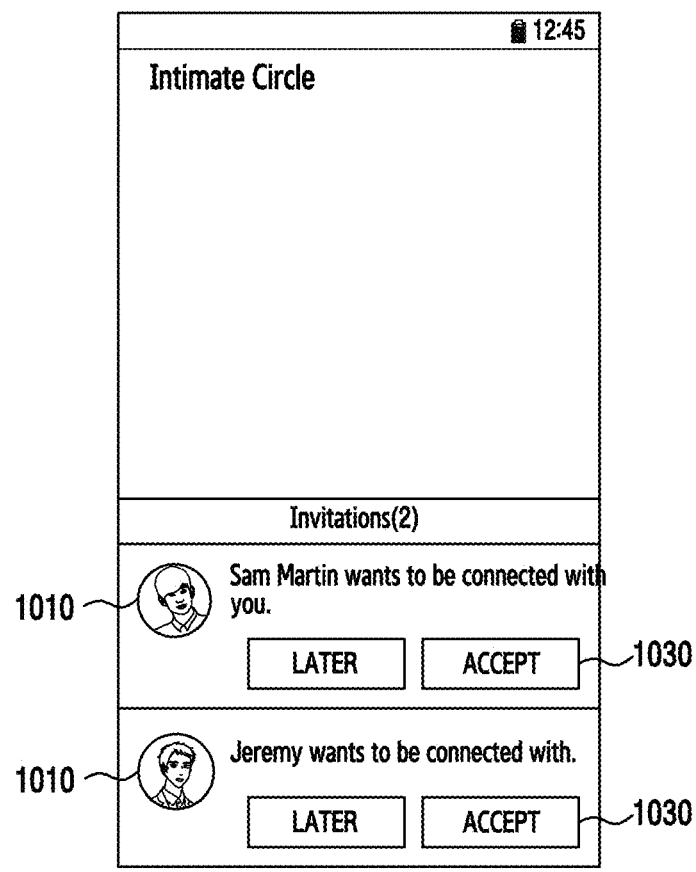

Referring to FIG. 10, in a case of registering a member for the communication that is based on the user interface in the same manner as illustrated in FIG. 9, an invitation message for a conversation partner whose registration as a member is requested may be generated and may be transmitted to an electronic device of the conversation partner. When the invitation message is received by the electronic device 400 of the conversation partner whose registration is requested by a user of another electronic device in the manner of FIGS. 9A to 9E, an example of a screen provided in response thereto is illustrated in FIG. 10.

As illustrated in FIG. 10, the electronic device 400 may provide information 1010 associated with a user (a user of an electronic device that transmits an invitation message) who invites to communicate, and an invitation request message, in response to the reception of the invitation message. The electronic device 400 may also provide a confirm item 1030 to allow a user to "accept" or "refuse" the invitation, in response to the invitation message. The invitation message may be continuously provided until a user provides a confirmation corresponding to "accept" or "refuse", or may be automatically deleted after being managed during a predetermined period of time. The invitation message may be received from a plurality of different users, and the electronic device 400 may display a plurality of invitation messages received from a plurality of different users, and may provide a confirmation item for selecting "accept" or "refuse" with respect to the corresponding communication for each invitation message.

FIGS. 11A to 11C and 12A to 12B are diagrams illustrating an operation of changing a user interface according to various embodiments of the present disclosure.

Figure 11C:
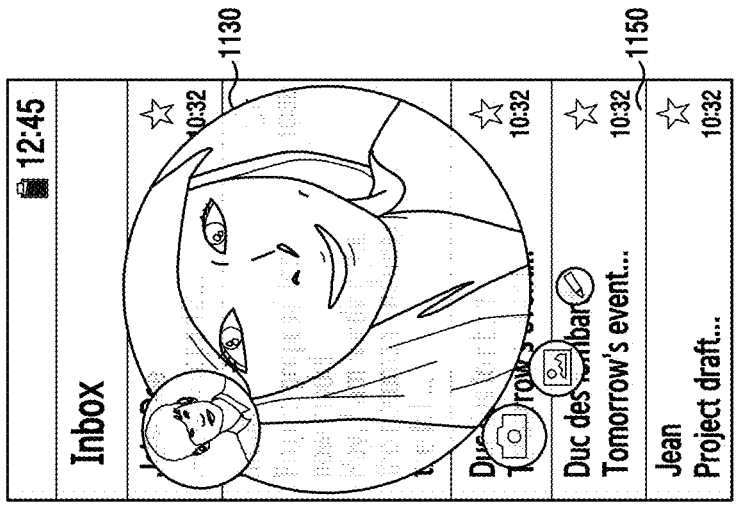

Referring to FIGS. 11A to 11C and FIGS. 12A to 12B, in a user interface according to various embodiments of the present disclosure, a conversation partner may be displayed in various forms, such as a list (FIG. 11A), a floating circle (FIG. 11B), or an expanded circle (FIG. 11C).

Figure 11B:
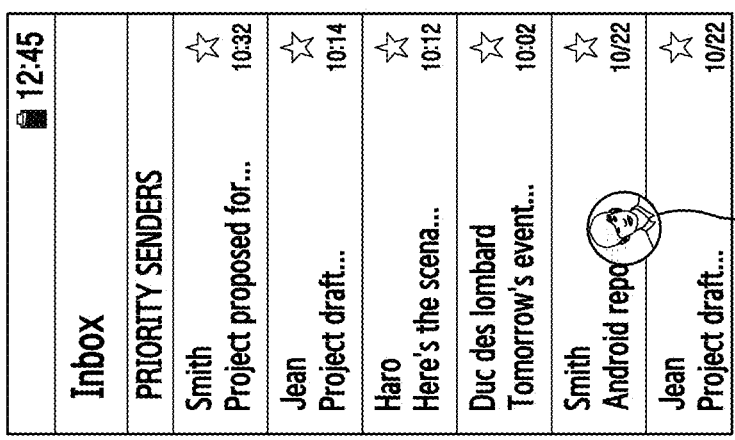
Figure 11A:
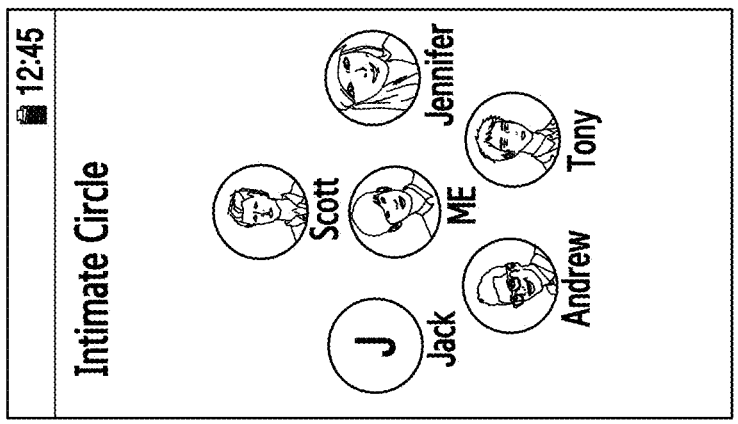

When a floating circle 1110 in FIG. 11B is selected (e.g., tap) by a user, the floating circle 1110 is expanded and may be changed into an expanded circle 1130, as shown in FIG. 11C. An example of a screen in association with an operation of changing the state of the floating circle 1110 into the state of the expanded circle 1130 is illustrated in FIG. 12A.

In the state of the expanded circle 1130, when an adjacent area 1150 (e.g., an area excluding an area where the expanded circle 1130 is displayed) is selected, the expanded circle 1130 is reduced and may be changed into the floating circle 1110. An example of a screen in association with an operation of changing the state of the expanded circle 1130 into the state of the floating circle 1110 is illustrated in FIG. 12B.

Figure 13:
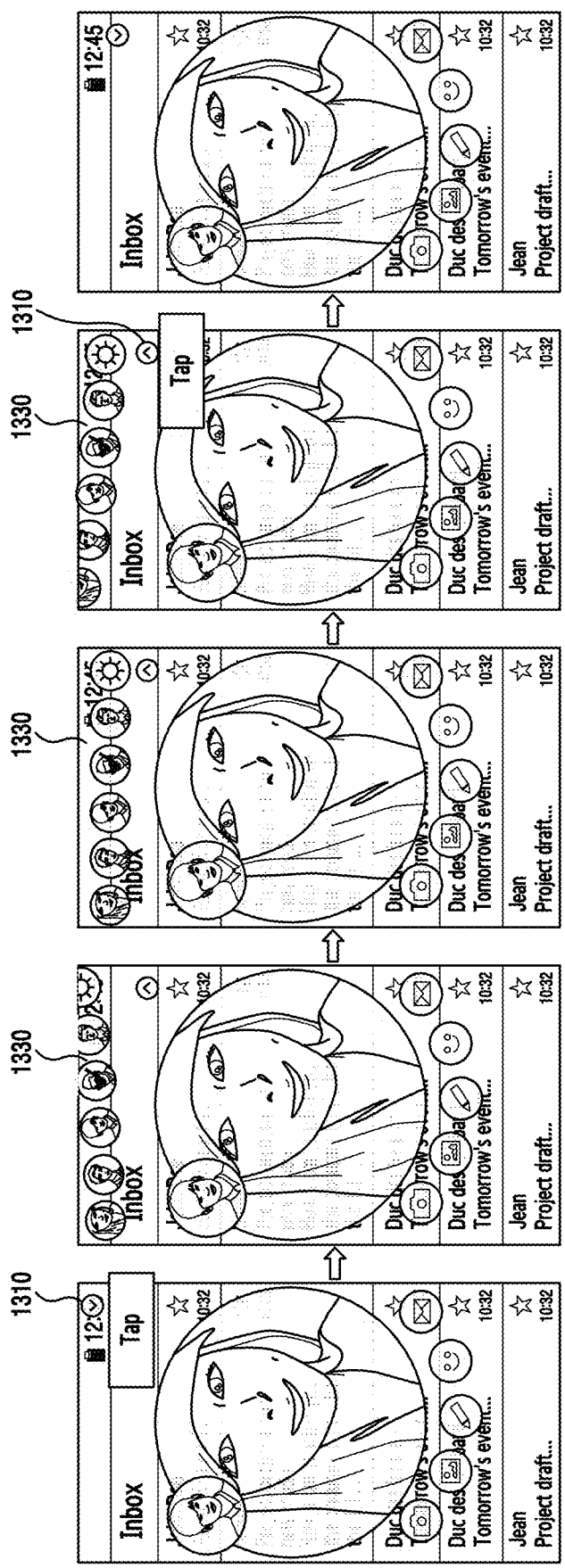
FIG. 13 is a diagram illustrating a member tray managing operation for selecting a conversation partner in a user interface according to an embodiment of the present disclosure.

FIG. 13 is a diagram illustrating a member tray managing operation for selecting a conversation partner in a user interface according to an embodiment of the present disclosure.

Referring to FIG. 13, an example is illustrated of a screen in association with an operation of displaying a member tray. In the state of an expanded circle, another member that is different from a member displayed in the conversation partner display area may be displayed through the member tray 1330. A user may select (e.g., tap) a visual cue 1310 displayed in a predetermined area (e.g., a top right side of a screen), and the electronic device 400 may display the member tray 1330 in response to the user input. In the state in which the member tray 1330 is displayed, the user may also select the visual cue 1310, and the electronic device 400 may remove the member tray 1330 displayed in the screen in response to the user input. In the state of a floating circle, the member tray 1130 may be displayed in response to a user input that selects the floating circle (e.g., a long press).

Figure 14:
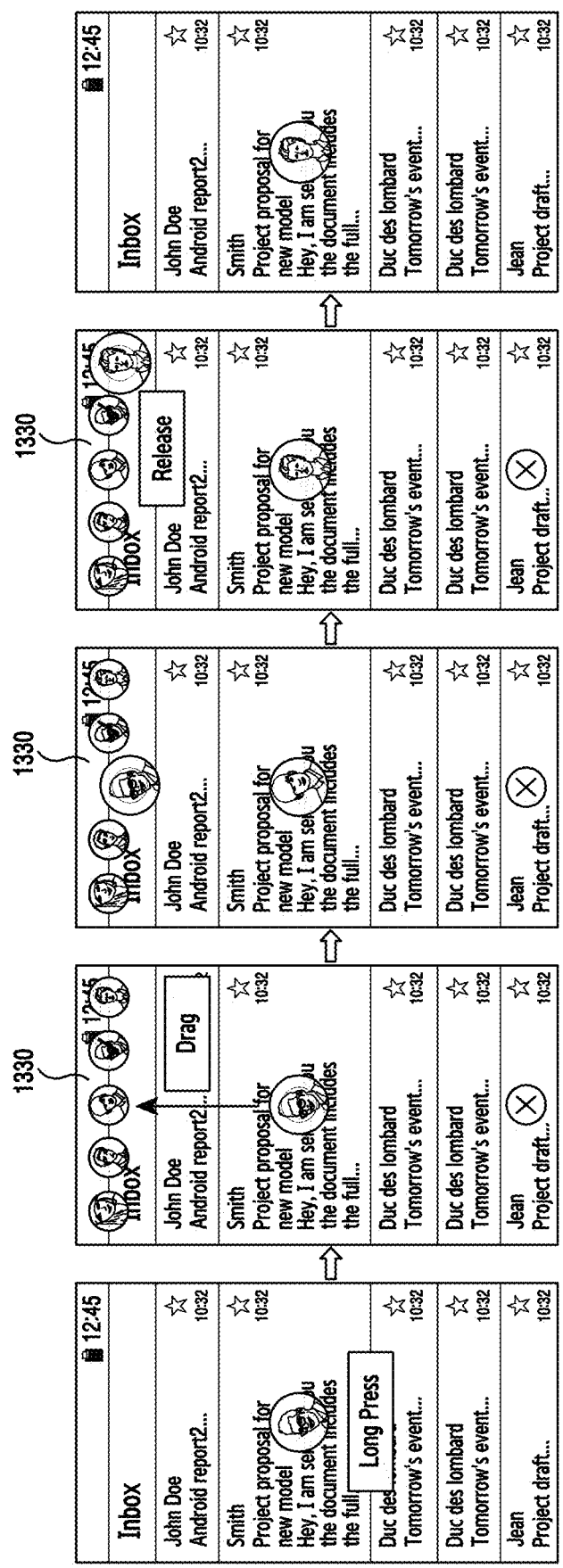
FIGS. 14 and 15 are diagrams illustrating a member tray managing operation for selecting a conversation partner in a user interface according to an embodiment of the present disclosure.
Figure 15:
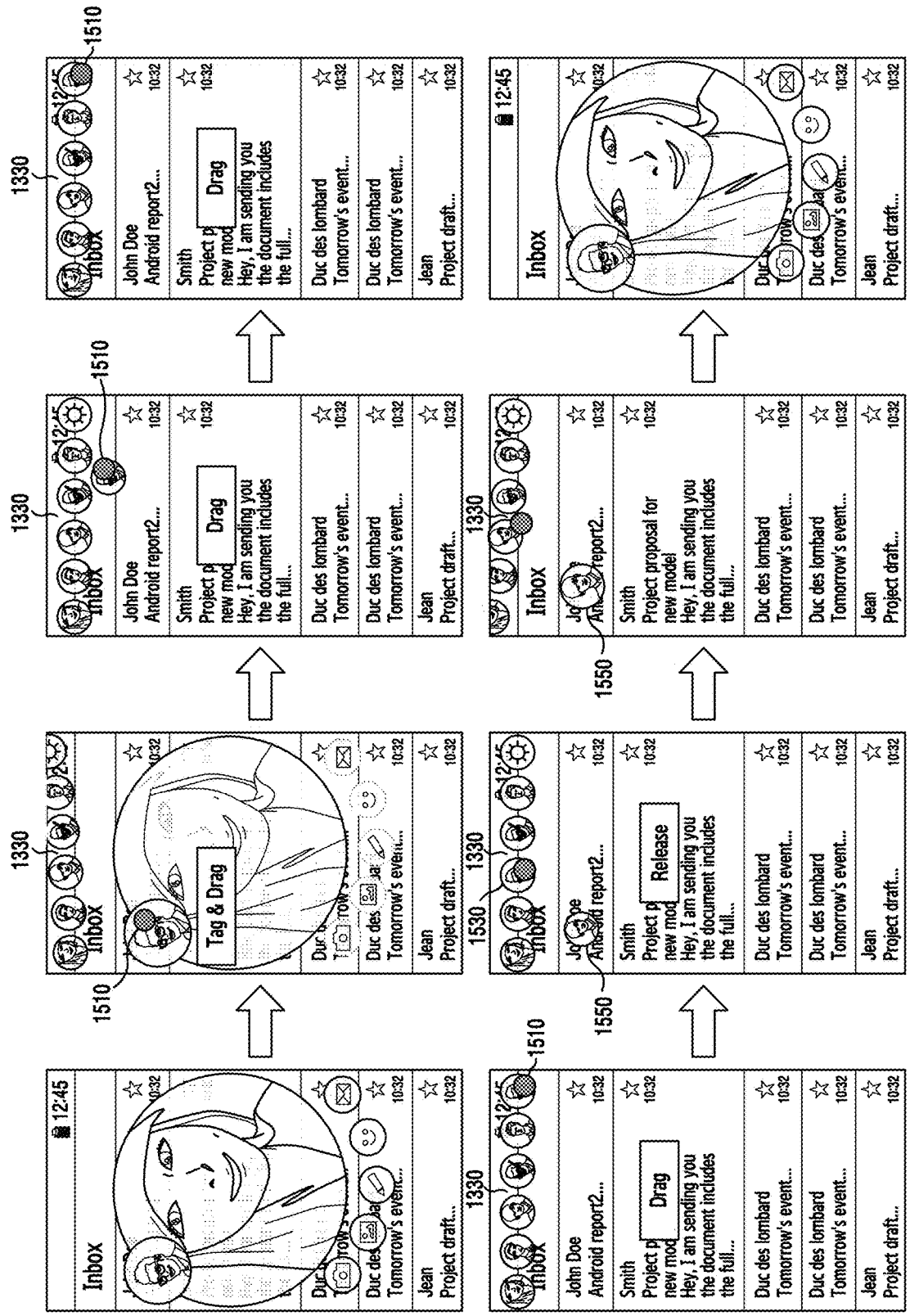
Figure 16:
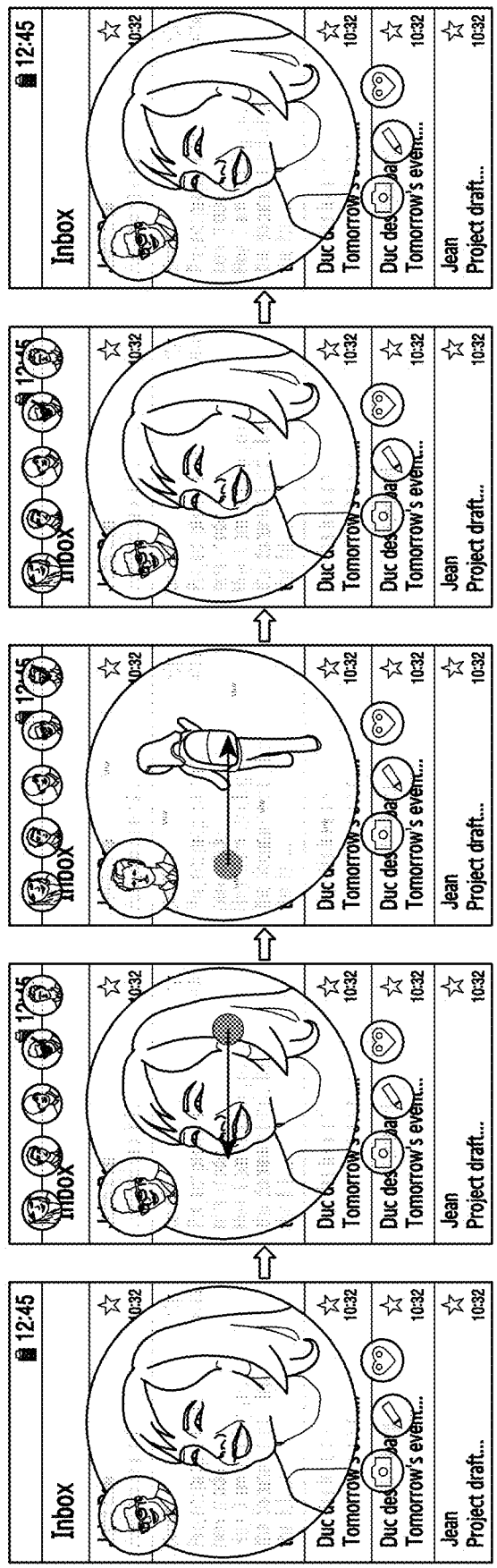
FIG. 16A to 16E are diagrams illustrating an example of management using a user interface according to an embodiment of the present disclosure.

FIGS. 14 and 15 are diagrams illustrating a member tray managing operation for selecting a conversation partner in a user interface according to various embodiments of the present disclosure.

Referring to FIG. 14, an example is illustrated of a screen in association with an operation that activates the member tray 1330 and changes a conversation partner, in the state of a floating circle.

FIG. 14 illustrates an example of a screen in association with a process of changing a conversation partner, when a conversation partner is displayed in a form of a floating circle. The user may select a floating circle (e.g., a long press), and the electronic device 400 may display the member tray 1330 in the top of the screen in response to the user input. The user input may be in a state of being continuously maintained on the floating circle.

Subsequently, the user may move (e.g., drag) the floating circle to the member tray 1330 in the state of selecting the floating circle (e.g., a long press state), and release the input on another predetermined member of the member tray 1330. The electronic device 400 may change and display a conversation partner of the floating circle in response to the user input. The previous conversation partner of the floating circle may be changed at the location of another predetermined member where the user input is released in the member tray 1330, and a conversation partner corresponding to the other predetermined member may be displayed through the floating circle.

Referring to FIG. 15, an example is illustrated of a screen in association with an operation that activates the member tray 1330 and changes a conversation partner, in the state of an expanded circle.

FIG. 15 illustrates an example of screens in association with a process of changing a conversation partner while a conversation partner is displayed in the form of an expanded circle. When a user selects and moves (e.g., tap & drag) a conversation partner display area in the expanded circle, the member tray 1330 is displayed in an area of a screen (e.g., the top of a screen). The electronic device 400 may generate and display an item 1510 (e.g., an image corresponding to a conversation partner display area) indicating a conversation partner based on information that is displayed in the conversation partner display area in the expanded circle, in response to the user input. The electronic device 400 gradually displays the expanded circle to be blurred, in response to the generation and displaying of the item 1510. Subsequently, when the item 1510 moves and enters the member tray 1330, the electronic device 400 may remove displaying of the expanded circle. The electronic device 400 may also provide an effect of displaying the item 1510 by gradually reducing the size of the item 1510 to a set size (e.g., a size corresponding to the size of conversation partner icons in the member tray 1330) based on a change in distance between a user input location (e.g., the location of the item 1510) and the member tray 1330, when the user input moves in a direction to the member tray 1330.

The user may move the item 1510 and release the item 1510 at the location of another predetermined member in the member tray 1330, and the electronic device 400 may change a conversation partner in response to the user input. For example, the electronic device 400 may change a subject of the conversation partner display area of the expanded circle into a predetermined member, and may display the same.

The electronic device 400 may provide an effect in which an item 1550 corresponding to a changed conversation partner moves from the member tray 1330 to the conversation partner display area of the expanded circle and is displayed when the electronic device 400 changes and displays a conversation partner. The electronic device 400 may display the item 1550 by gradually increasing the size of the item 1550 to a set size (e.g., a size corresponding to the size of a conversation partner icon of the conversation partner display area) based on a change in a distance that the item 1550 moves, and may provide an effect of gradually displaying the expanded circle based on the change in the distance that the item 1550 moves. Subsequently, at the same time as when the expanded circle is completely displayed, information associated with a conversation partner corresponding to the item 1550 may be located and displayed at the conversation partner display area of the expanded circle.

FIGS. 16A to 16E are diagrams illustrating an example of management using a user interface according to various embodiments of the present disclosure.

Referring to FIGS. 16A to 16E, various screens are illustrated in association with an operation of intuitively changing a conversation partner for communication (e.g., a member navigation). Member changing for designating a conversation partner may include changing by using a member tray or changing by using a common area or a conversation partner display area of an expanded circle. FIGS. 16A to 16E illustrate an example of a screen in which member changing for a conversation partner is executed in response to a user input (e.g., a swipe gesture) in the common area of the expanded circle.

A user may input a swipe gesture in a direction from right to left or a swipe gesture in a direction from left to right, through the common area, and the electronic device 400 may change a conversation partner in the conversation partner display area in order of members displayed in the member tray in response to the user input. In response to changing the conversation partner in the conversation partner display area, content displayed in the common area may be changed with content previously shared with the changed conversation partner and the previously shared content may be displayed. Information in the conversation partner display area and information in the communication area may be changed together in response to member changing.

While member changing is executed based on a user input, the electronic device 400 may display a member tray until the member changing is completely executed, and a visual effect associated with the member changing may be provided in the member tray. When the electronic device 400 determines that member changing is completely executed (e.g., when a user input does not exist during a predetermined period of time after member changing), the electronic device 400 may remove displaying the member tray.

Although not illustrated in FIGS. 16A to 16E, a user input that is provided in the common area (e.g., a swipe gesture) as illustrated in FIGS. 16A to 16E, may be set to execute another function. In response to the user input provided through the common area, history associated with information shared with a current conversation partner in the conversation partner display area may be changed and displayed in order of sharing. Navigation of information associated with various data that is exchanged with the current conversation partner may be provided.

Figure 17:
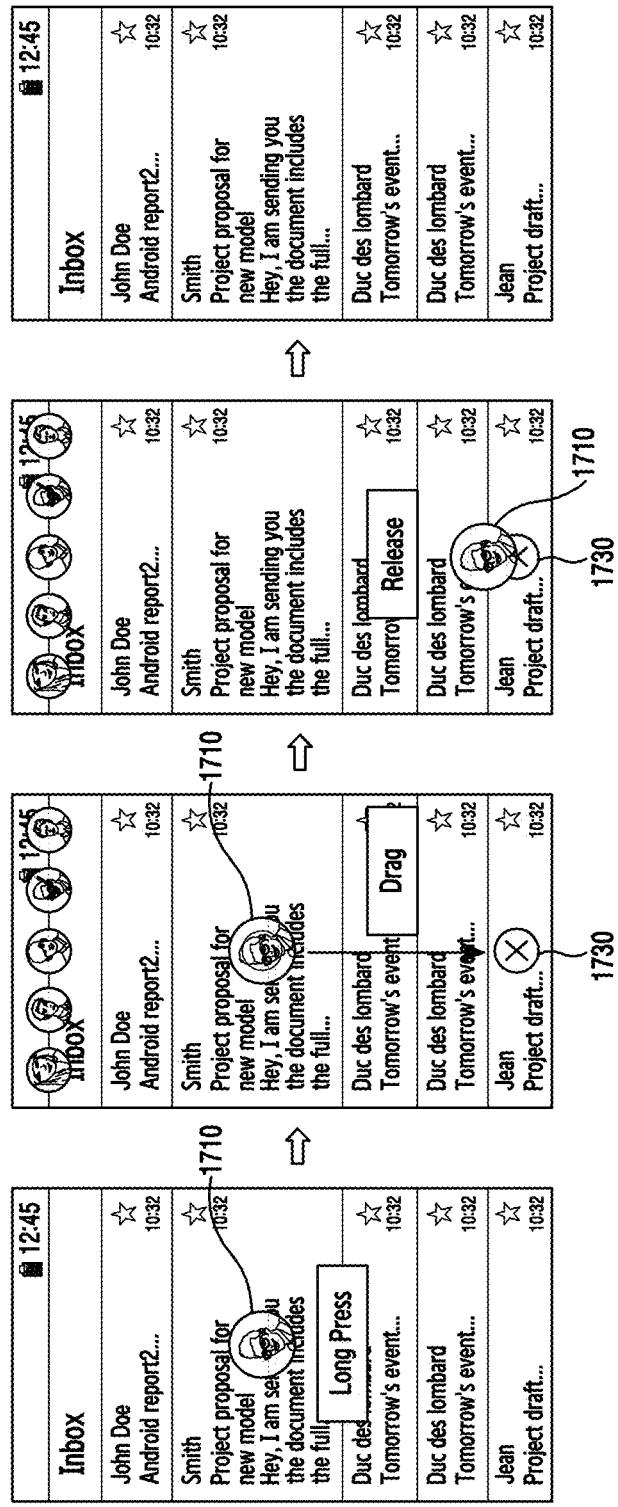
FIG. 17 is a diagram illustrating an example of terminating a user interface-based communication according to an embodiment of the present disclosure.

FIG. 17 is a diagram illustrating an example of terminating a user interface-based communication according to various embodiments of the present disclosure.

Referring to FIG. 17, an example is illustrated of a screen in association with an operation that terminates (dismisses) communication using a floating circle, in the state of the floating circle.

The user may execute a long-press on the floating circle 1710 to terminate communication (e.g., to remove displaying a conversation partner). The electronic device 400 may sense the long-press on the floating circle 1710, and may activate a terminating area 1730 in response thereto. The electronic device 400 may generate a terminating area 1730 in an area of a screen (e.g., the bottom of the screen), and displays an intuitive item (e.g., "X") in the terminating area 1730.

A user may move (e.g., drag) the floating circle 1710 to the terminating area 1730 (e.g., an area where "X" is displayed) and release (e.g., drag & drop) the same, while maintaining the input with respect to the floating circle 1710 (e.g., long-press). The electronic device 400 may sense the user input (e.g., drag & drop), and may terminate communication in response to the user input.

As described above, a user interface that is provided to support the communication between users in various embodiments of the present disclosure has been described. Operations according to various embodiments of the present disclosure, which execute communication between users based on the above described user interface are described below.

Figure 18:
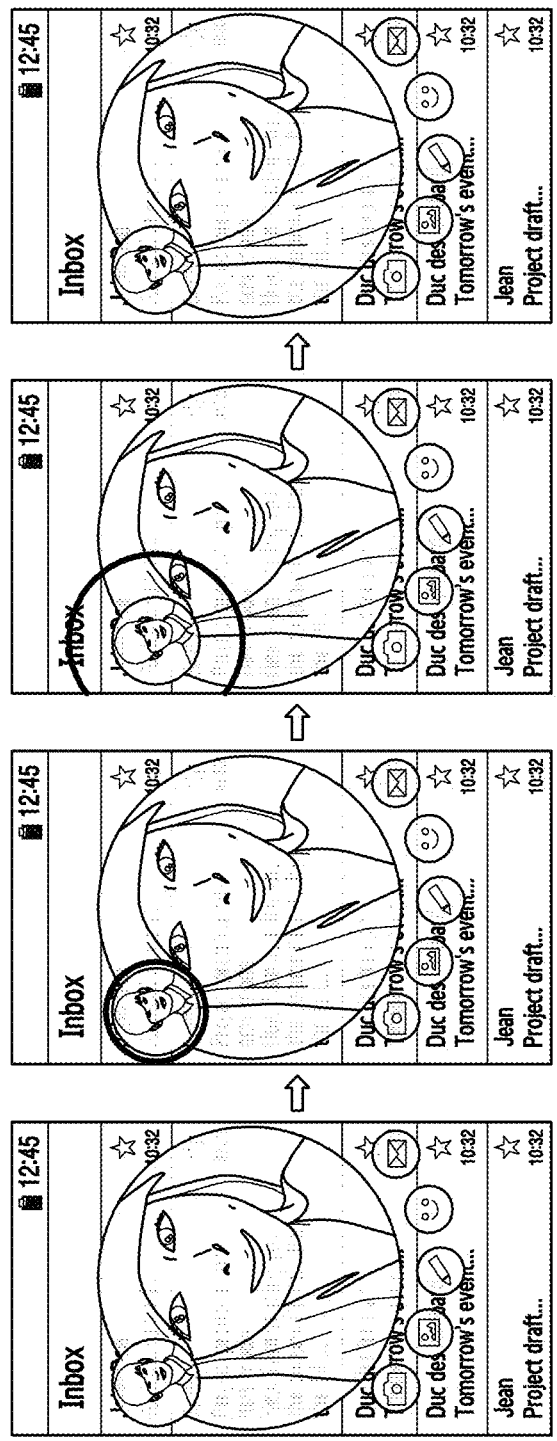
FIGS. 18 and 19 are diagrams illustrating an operation of executing communication using an electronic device according to an embodiment of the present disclosure.
Figure 19:
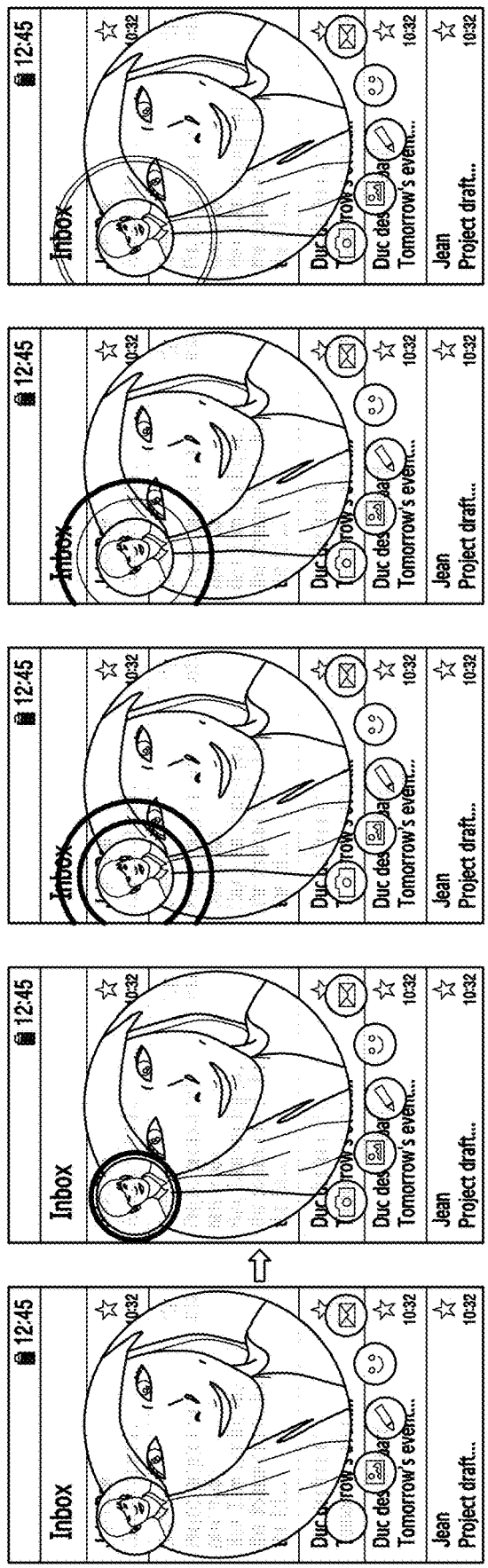

FIGS. 18 and 19 are diagrams illustrating an operation of executing communication using an electronic device according to various embodiments of the present disclosure.

Referring to FIG. 18, an example is illustrated of a screen in association with an operation of transmitting a signal corresponding to a user input to an electronic device of a conversation partner while communication with the conversation partner in a conversation partner display area is executed in the state of an expanded circle state. Even in the state of a floating circle, a signal corresponding to a user input for executing communication with a conversation partner may be transmitted to an electronic device of the conversation partner.

When a user input (e.g., a touch) that selects the floating circle or the conversation partner display area of the expanded circle is detected, the electronic device 400 may recognize the user input as a knock event for the communication with a conversation partner. The electronic device 400 may display a knock visual effect (e.g., ripple effect) in the floating circle or the conversation partner display area of the expanded circle, or around the conversation partner display area, in response to the knock event. The electronic device 400 may also transmit a message (knock event message) corresponding to the knock event to the electronic device of the conversation partner, in response to the knock event. The knock event message may include at least one of an event type (e.g., knock), transmitter/receiver information, a message transmission time, the number of events, and an event start time, and may further include other additional information depending on embodiments. The knock event message is described below with reference to FIG. 20.

The electronic device 400 may provide a feedback effect when a touch input of the user is detected, and may change the received touch input into a knock event (e.g., a processing signal associated with a touch input in the conversation partner display area) or a handwriting event (e.g., a processing signal associated with a touch input in the common area), and transmit the event to the electronic device of the conversation partner. An example in which a first electronic device recognizes a touch, generates a corresponding event, and transmits the same to a second electronic device, is described below.

The first electronic device receives a touch input on a conversation partner display area or a common area. A means for inputting the touch input may include various objects that are capable of executing pointing, in addition to a hand and a pen. When the first electronic device detects a touch input by a user, the first electronic device may recognize the touch input as a knock event (e.g., a tap), or a handwriting event (e.g., a stroke) based on an area where the touch input is detected. For example, a touch input in the conversation partner display area may be changed to a knock event, and a touch input in the common area may be changed to a handwriting event.

The first electronic device may provide the user with a related feedback effect based on an area where a touch input is detected or a recognized event. For example, the first electronic device may provide the user with an animation such as ripple effects, a change in color, vibration, sound, information associated with handwriting, or the like. The electronic device 400 may distinguish a touch start point (e.g., a point in time when a means for inputting a touch is in contact with the touch screen 430) and a touch end point (e.g., a point in time when a means for inputting a touch is released from the touch screen 430), with respect to both the knock event and the handwriting event.

Referring to FIG. 19, an example is illustrated of an operation screen when a knock event as described in FIG. 18 occurs multiple times in response to consecutive user inputs. A user may provide a touch input that continuously repeats "press" and "release" more than a predetermined number of times within a predetermined period of time, and the electronic device 400 may recognize the touch input as an urgent event when recognizing the repetitive touch inputs. The electronic device 400 may generate and display various effects (e.g., a color effect, a shaking effect, an inertial effect, repetitive ripple effects, or the like) in response to the urgent event.

In the case of the knock event, the knock event is available in the floating circle in addition to the expanded circle. Effects corresponding to the effects provided in the expanded circle may be provided.

FIG. 20 is a diagram illustrating an example of a knock event message format according to an embodiment of the present disclosure.

Referring to FIG. 20, the electronic device 400 may generate a knock event message corresponding to a user input, and may transfer the knock event message to an electronic device of a conversation partner or a server. For example, a first electronic device may transmit the knock event message to an electronic device of a conversation partner (hereinafter referred to as a second electronic device) through a peer to peer (P2P) scheme or a server-client scheme. FIG. 20 provides a description using an example in which a knock event message is transmitted based on the server-client scheme.

As described in FIG. 20, the knock event message, may be embodied as a format including various fields associated with at least one of an event type, transmission side information, reception side information, a message transmission time, the number of events, and an event. Each field of the knock event message format may be defined in Table 1 provided below.

TABLE 1

| Field | Descriptions |
| --- | --- |
| Event type | Identifier for determining a type of event<br>'KG': Knock Group<br>'HWG': Hand Writing Group<br>'C': Confirm |
| Transmission side information | message sender information and a unique value (e.g., a phone number, an account, an e-mail, or the like) for identifying a sender or a transmitting device |
| Reception side information | message recipient information and a unique value (e.g., a phone number, an account, an e-mail, or the like) for identifying a receiver or a receiving device |
| Transmission time | Message transmission time (absolute time or relative time) |
| Number of events | The number of events included in a single message |
| event #1 . . . n | The number of events is variable due to a value of 'the number of events', and includes the following information:<br>event start signal<br>event occurrence time<br>additional information: touch up, touch down |

An example of a knock event message provided based on the example of Table 1, may be listed in Table 2 provided below. The example of Table 2 shows a case in which a total of three knock events are included.

TABLE 2

| Event Type | Transmission side information | Reception side Information | Message transmission time | number of events | Event #1 | Event #2 | Event #3 |
| --- | --- | --- | --- | --- | --- | --- | --- |
| KG | 0102160534 | 0103157929 | 1416572628930 | 3 | K\|<br>1416572629665\|<br>True | K\|<br>1416572630292\|<br>True | K\|<br>1416572630792\|<br>True |

Figure 21:
FIGS. 21, 22, and 23 are diagrams illustrating examples of a screen that processes a received event in an electronic device according to an embodiment of the present disclosure.
Figure 22:
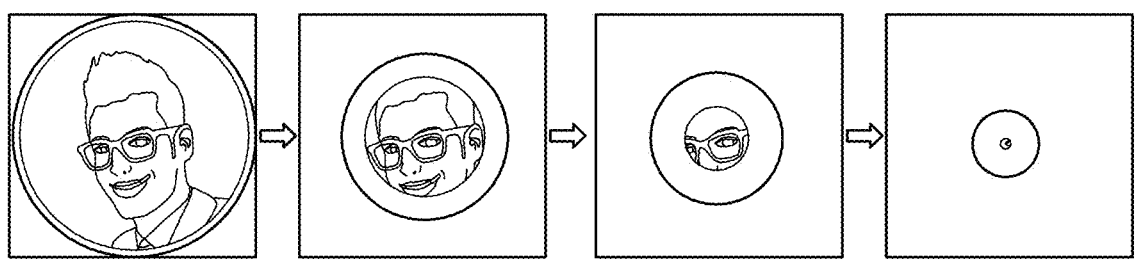
Figure 23:
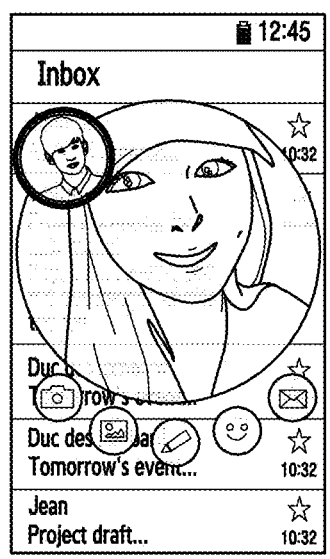

FIGS. 21, 22, and 23 are diagrams illustrating examples of a screen that processes a received event in an electronic device according to various embodiments of the present disclosure.

Referring to FIG. 21, the electronic device 400 may display information corresponding to a related event (e.g., a knock event or a handwriting event) based on an event (e.g., a knock event message or a handwriting event message) received from another electronic device.

When a touch input in a conversation partner display area or a common area is detected, a first electronic device may recognize the touch input as a knock event or a handwriting event, based on an area where the touch input is detected. The first electronic device may generate a message corresponding to the recognized event, and may transmit the same by taking a second electronic device corresponding to a conversation partner as a destination.

When the second electronic device receives the event, the second electronic device may display information associated with the event based on a floating circle or an expanded circle, in response to the reception of the event.

As illustrated in FIG. 21, the second electronic device may be in a state of executing a predetermined application by a user, and displaying a screen corresponding thereto. In this instance, in FIG. 21, when the second electronic device receives the event in a state in which a user interface for the communication is not displayed, the second electronic device may display information corresponding to a user of the first electronic device that transmits the event. For example, the second electronic device may display a floating circle. An effect associated with the reception of the event may be provided in or around an indication corresponding to the user of the first electronic device. For example, a visual effect, a vibration effect, or a sound effect may be provided.

When interaction does not come from the user of the second electronic device during a predetermined period of time, the second electronic device may remove displaying of the floating circle. An example of an operation screen thereof is illustrated in FIG. 22.

Referring to FIG. 22, when interaction is not detected from the user during a predetermined period of time after an operation is processed associated with the event (e.g., displaying a floating circle), the second electronic device may execute a process so that the floating circle gradually disappears from the screen. Subsequently, when a user interaction is detected in the electronic device 400, the floating circle may be displayed.

The second electronic device may receive an event from the first electronic device based on a communication method according to various embodiments of the present disclosure. When the second electronic device receives the event in the above described state, the second electronic device may display a notification associated with the event based on a displaying method according to various embodiments of the present disclosure. An example of an operation screen thereof is illustrated in FIG. 23.

Referring to FIG. 23, when an event is received from a conversation partner in a state in which an expanded circle is displayed, the second electronic device may provide various effects based on the event through a conversation partner display area. For example, various effects that provide a user with a notification, such as a visual effect (e.g., color and ripples), a vibration effect, a sound effect, or the like may be included. FIG. 23 illustrates an example in which the event corresponds to a knock event. When the event corresponds to a handwriting event, a notification thereof may be provided through a common area, and an operation thereof is described below.

FIGS. 24 and 25A to 25E are diagrams illustrating examples of a screen that processes a received event in an electronic device according to various embodiments of the present disclosure.

Figure 24:
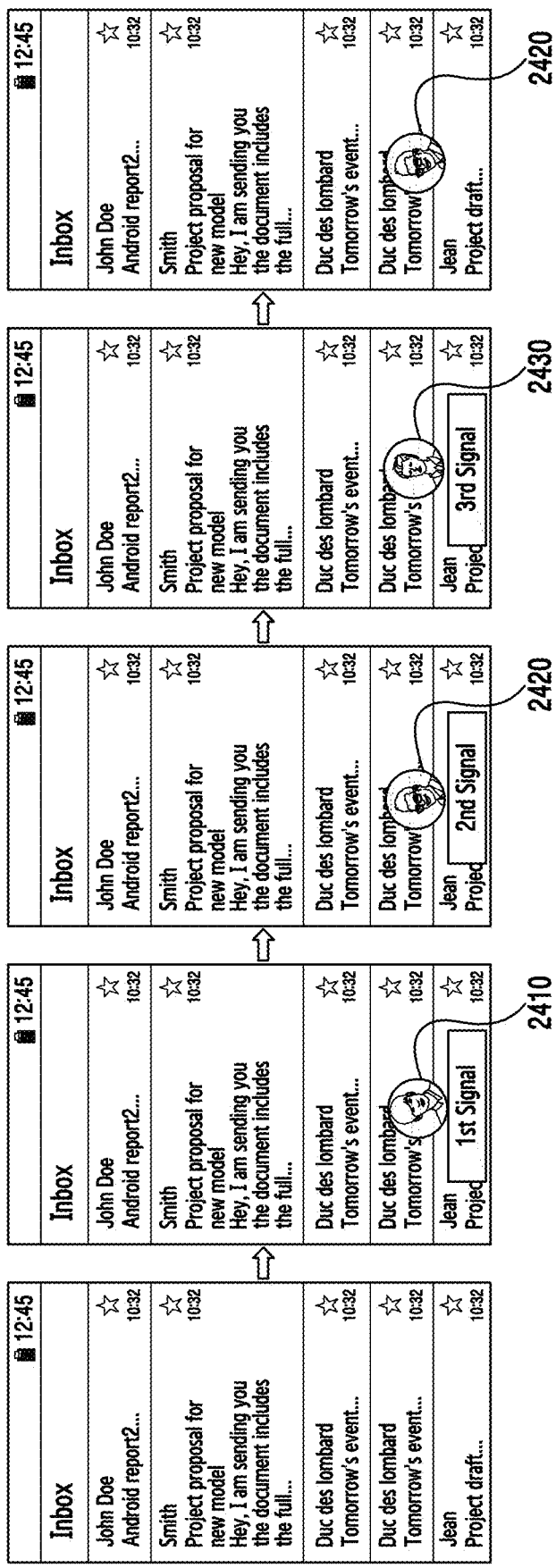

Referring to FIG. 24, an example is illustrated of an operation of notifying an event when at least one event is received from a plurality of different electronic devices.

When an event is received from a plurality of senders, the electronic device 400 displays an event by replacing a previous event with the latest event in order of reception of an event.

As illustrated in FIG. 24, in a state in which a first event is displayed, a second event and a third event may be successively received, and subsequently, an event may be received from a conversation partner of the second event after the third event. The electronic device 400 in a state of displaying a floating circle 2410, may display a floating circle 2420 including information associated with a conversation partner of the second event by replacing the floating circle 2410, in response to the reception of the second event. The electronic device 400, in a state of displaying the floating circle 2420, may display a floating circle 2430 including information associated with a conversation partner of the third event by replacing the floating circle 2420 in response to the reception of the third event. The electronic device 400, in a state of displaying the floating circle 2430, may display the floating circle 2420 including information associated with the conversation partner of the second event by replacing the floating circle 2430 in response to the reception of the additional event from the conversation partner of the second event.

Referring to FIGS. 25A to 25E, an example is illustrated in which the electronic device 400 reports an event when a user of the electronic device 400 and a user in a conversation partner display area 2500 transmit events to each other almost at the same time.

When a user input of the electronic device 400 for transferring an event to the user corresponding to the partner display area 2500 and reception of an event of the user corresponding to the conversation partner display area 2500 with respect to the user of the electronic device 400 are detected within a predetermined period of time, the electronic device 400 may display previously set effects.

As illustrated in FIGS. 25A to 25E, in a state as illustrated in FIG. 25A, when a user input for transmitting an event of the electronic device 400 and reception of an event from a conversation partner are detected within a predetermined period of time, a bubble animation effect 2550 may be provided as illustrated in the FIGS. 25B, 25C, and 25D. The bubble animation effect 2550 may be displayed during a predetermined period of time, and after the predetermined period of time, the bubble animation effect 2550 may disappear, as illustrated in FIG. 25E.

Figure 26C:
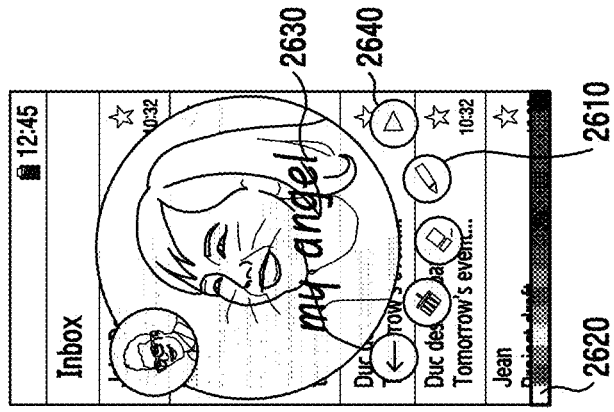
FIGS. 26A to 26C are diagrams illustrating an operation of executing communication using an electronic device according to an embodiment of the present disclosure.
Figure 26B:
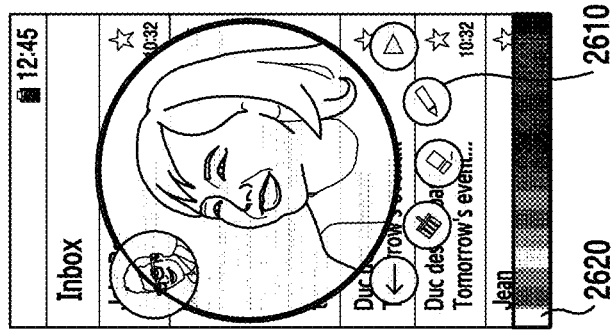
Figure 26A:
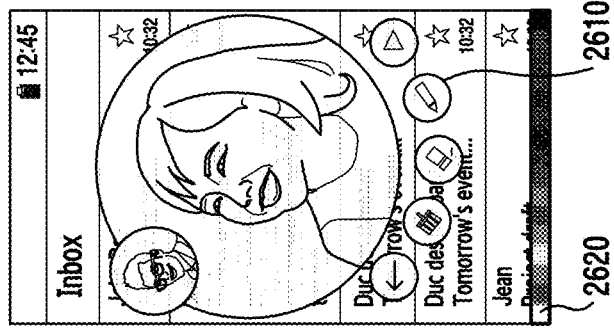

FIGS. 26A to 26C are diagrams illustrating an operation of executing communication using an electronic device according to various embodiments of the present disclosure.

Referring to FIGS. 26A to 26C, an example is illustrated of a screen in association with an operation of transmitting a signal corresponding to a user input to an electronic device of a conversation partner while communication with the conversation partner in a conversation partner display area is executed in a state of an expanded circle state. FIGS. 26A to 26C illustrate an example of a screen of an operation that generates a handwriting event.

A user may write a memo using a common area of an expanded circle. For example, a user may select a memo button 2610 for writing a memo in an interface area. When a user input that selects the memo button 2610 is detected, the electronic device 400 may recognize the same as a conversion to a memo writing mode. The electronic device 400 may display a related control interface (e.g., a memo color setting interface 2620) in response to the recognition of the memo writing mode. The user may select a memo color through the control interface 2620, and the electronic device 400 may recognize a color selected by the user.

The electronic device 400 may reflect the color selected by the user to the memo button 2610 and display the same, as illustrated in FIG. 26B. The user may write, through a handwriting input (e.g., a touch), a memo 2630 to be shared (transmitted) with a conversation partner through a common area. The electronic device 400 may display the handwriting memo 2630 in the common area, in response to the common area-based user input (e.g., a touch).

The user writes the memo 2630 in the common area, and shares (transmits) the memo with a communication conversation partner. For example, the electronic device 400 may share the memo 2630 with a conversation partner in real time when a user input is generated, or may share the memo 2630 with a conversation partner through a sharing (transmission) button 2640-based user input. When a user input (e.g., a touch) that selects the sharing (transmission) button 2640 is detected in an interface area, the electronic device 400 may recognize the user input as a handwriting event for transmitting the memo 2630 in the communication with the partner. The electronic device 400 may transmit a message (hereinafter referred to as a handwriting event message) corresponding to the handwriting event to the electronic device of the conversation partner in response to the handwriting event. The handwriting event message may include an event type (e.g., handwriting), transmitter/receiver information, a message transmission time, the number of events, an event start time, and the like, and may further include other additional information depending on embodiments. The handwriting event message is described below with reference to FIG. 27.

Figure 27:
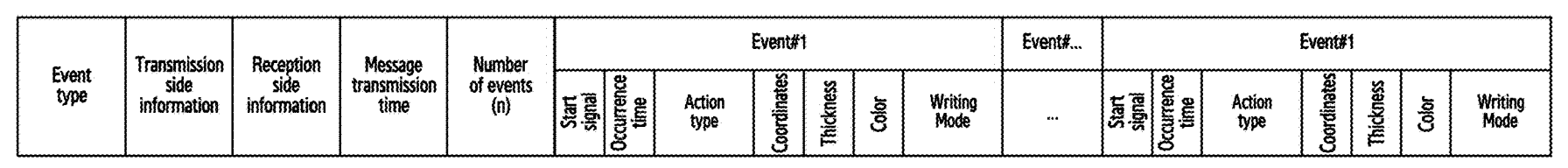

FIG. 27 is a diagram illustrating an example of a handwriting event message format according to an embodiment of the present disclosure.

Referring to FIG. 27, the electronic device 400 may generate a handwriting event message corresponding to a user input, and may transfer the handwriting event message to an electronic device of a conversation partner or a server. For example, a first electronic device may transmit the handwriting event message to an electronic device of a conversation partner (hereinafter referred to as a second electronic device) through a P2P scheme or a server-client scheme.

As illustrated in FIG. 27, the handwriting event message may be embodied as a format including a field corresponding to at least one of an event type, transmission side information, reception side information, a message transmission time, the number of events, and an event. Each field of the handwriting event message format may be defined in Table 3 provided below.

TABLE 3

| Field | Descriptions |
| --- | --- |
| Event Type | Identifier for determining a type of event<br>l 'KG': Knock Group |

TABLE 3-continued

| Field | Descriptions |
| --- | --- |
| | l 'HWG': Hand Writing Group<br>l 'C': Confirm |
| Transmission side information | message sender information and a unique value (e.g., a phone number, an account, an e-mail, or the like) for identifying a sender or a transmitting device |
| Reception side information | message recipient information or a unique value (e.g., a phone number, an account, an e-mail, or the like) for identifying a recipient or a receiving device |
| Transmission time | Message transmission time (absolute time or relative time) |
| Number of events | The number of events included in a single message |
| event #1 . . . n | The number of events is variable due to a value of 'the number of events', and includes the following information:<br>l event start signal<br>l event occurrence time<br>l Action Type: touch Up, touch Down<br>l touch coordinate information<br>l thickness<br>l color<br>l Mode(Writing, Erasing) |

An example of a handwriting event message provided based on the example of Table 3, may be listed in Table 4 provided below. The example of Table 4 shows a case in which a total of 73 handwriting events are included in a single message.

TABLE 4

| Event Type | transmission side information | Reception side information | Message transmission time | Number of events | Event #1 | Event #2 | — | Event #73 |
| --- | --- | --- | --- | --- | --- | --- | --- | --- |
| HWG | 01021605314 | 01031507929 | 1416572713724 | 73 | HW\|0\|<br>0.86210316\|<br>0.38392857\|<br>10.0\|<br>−32896\|<br>false | HW\|2\|<br>0.86210316\|<br>0.38392857\|<br>10.0\|<br>−2896\|<br>false | — | HW\|2\|<br>0.86210316\|<br>0.38392857\|<br>10.0\|<br>−32896\|<br>false |

FIGS. 28A to 28E are diagrams illustrating an example of a screen in association with an operation of executing communication in an electronic device according to various embodiments of the present disclosure.

Figures 28A, 28B, 28C, 28D, 28E:
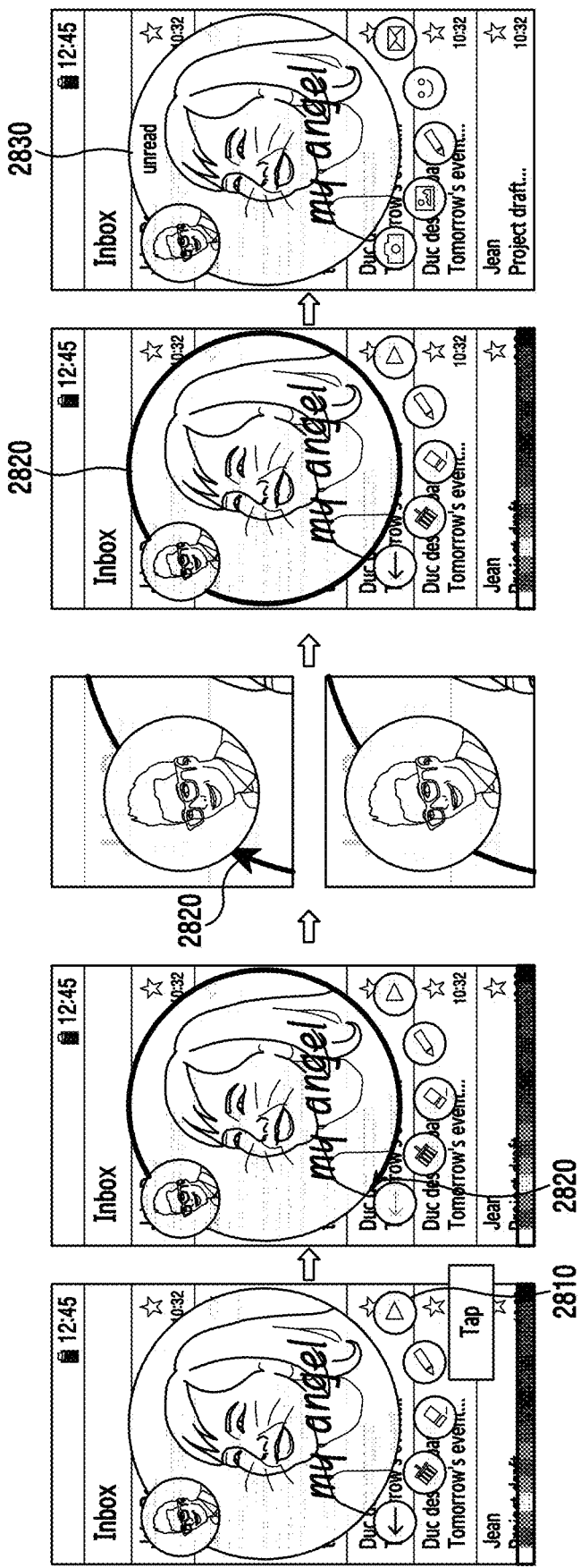
FIGS. 28A to 28E are diagrams illustrating an example of a screen in association with an operation of executing communication in an electronic device according to an embodiment of the present disclosure.

Referring to FIGS. 28A to 28E, a user may transmit a memo written through a common area to a conversation partner using a sharing (transmission) button 2810, as illustrated in FIG. 28A.

The electronic device 400 may provide a user with an effect that intuitively shows that data is currently transmitted when data, such as the memo, is transmitted. For example, as illustrated in FIGS. 28B, 28C, and 28D, a visual effect may be displayed, which gradually completes a border 2820 around the common area based on the progress of transmission (an effect that fills the circular border 2820 with a predetermined color, clockwise).

The electronic device 400 may display information indicating whether the conversation partner checks the data, after transmitting the data. For example, as illustrated in FIG. 28E, when the conversation partner of an electronic device that receives the data does not check the transmitted data, the electronic device 400 may provide a confirm indicator 2830 (e.g., an icon, text, or the like) in or around a conversation partner display area or a common area. When a confirm message with respect to the transmitted data is received from the conversation partner, the corresponding indicator may not be displayed or may be changed to another indicator. For example, the confirm indicator 2830 may disappear from the screen. Similarly, the other indicator may be a receipt notification indicator.

Figure 29:
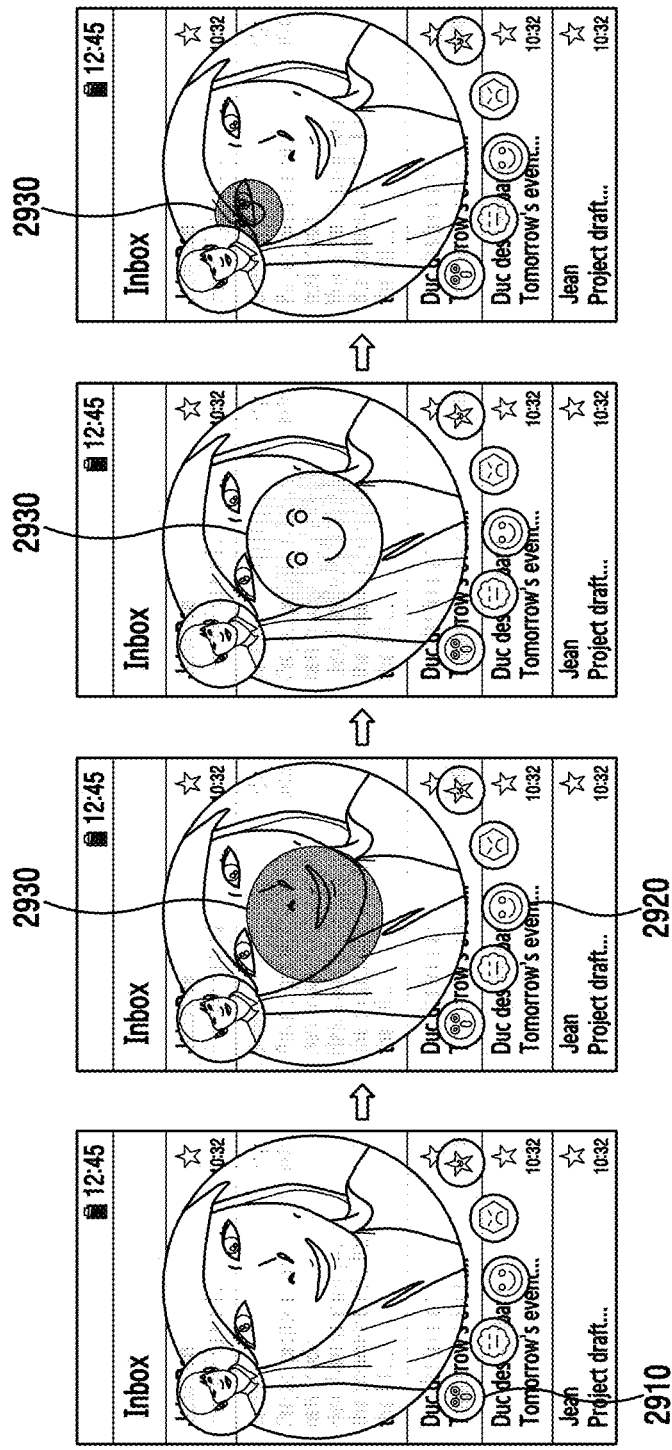
FIG. 29 is a diagram illustrating an operation of executing communication using an electronic device according to an embodiment of the present disclosure.

FIG. 29 is a diagram illustrating an operation of executing communication using an electronic device according to an embodiment of the present disclosure.

Referring to FIG. 29, an example is illustrated of a screen in association with an operation of transmitting a signal corresponding to a user input to an electronic device of a conversation partner while communication with the conversation partner in a conversation partner display area is executed in a state of an expanded circle state. FIG. 29 illustrates an example of a screen of an operation that generates an emoticon event.

A user may transmit an emoticon to a conversation partner through a common area of an expanded circle. For example, the user may select an emoticon button for selecting, writing, or transmitting an emoticon in an interface area. The emoticon may have animation effects. The emoticon may also be contained or may be produced directly by the user.

When a user input for selecting an emoticon button is detected, the electronic device 400 may recognize the user input as a conversion to an emoticon selection or writing mode for the communication (e.g., sharing (transmitting) an emoticon) with the conversation partner. In response to the recognition of the emoticon selection or writing mode, the electronic device 400 may convert the interface area into a control interface (e.g., an emoticon setting interface 2910) related to the emoticon and display the control interface. The user displays a selectable emoticon 2920 through the control interface 2910 or an interface through which a user may directly produce an emoticon may be included.

The electronic device 400 may display an emoticon 2930 selected or produced by the user, through a common area. The emoticon 2930 may be displayed using a scene transition effect (e.g., fade-in effect) that gradually shows an emoticon to be clear in the common area, in response to a user input.

The electronic device 400 may transmit the emoticon 2930 to an electronic device of a conversation partner automatically a predetermined period of time after a state of displaying the emoticon 2930, or manually through a selection made by the user. When the transmission of the emoticon 2930 based on the automatic scheme or manual scheme is determined, the electronic device 400 may provide the emoticon 2930 using a scene transition effect (e.g., fade-out effect) in which an emoticon gradually becomes blurred and smaller, and disappears, while moving the emoticon 2930 to a conversation partner display area.

The user writes the emoticon 2930 in the common area, and shares (transmits) the emoticon with a communication conversation partner. When the electronic device 400 detects the transmission of the emoticon 2930 based on the automatic scheme or manual scheme, the electronic device 400 may recognize the same as an emoticon event. The electronic device 400 may transmit a message (hereinafter referred to as an emoticon event message) corresponding to the emoticon event to an electronic device of the conversation partner in response to the recognition of the emoticon event.

The emoticon event message may include an event type (e.g., emoticon), transmitter/receiver information, a message transmission time, emoticon information, and the like, and may further include other additional information depending on embodiments. The emoticon event message is described below with reference to FIG. 30.

FIG. 30 is a diagram illustrating an example of an emoticon event message format according to an embodiment of the present disclosure.

Referring to FIG. 30, the electronic device 400 may generate an emoticon event message, and may transfer the emoticon event message to an electronic device of a conversation partner or a server. For example, a first electronic device may transmit the emoticon event message to an electronic device of a conversation partner (e.g., a second electronic device) through a P2P scheme or a server-client scheme.

As described in FIG. 30, the emoticon event message may be embodied as a format including various fields associated with at least one of an event type, transmission side information, reception side information, a message transmission time, and emoticon information. Each field of the emoticon event message format may be defined in Table 5 provided below.

TABLE 5

| Field | Descriptions |
|---|---|
| Event Type | Identifier for identifying a type of event<br>1 'E': Emoticon |
| Transmission side information | message sender information and a unique value (e.g., a phone number, an account, an e-mail, or the like) for identifying a sender or a transmitting device |
| Reception side information | message receiver information and a unique value (e.g., a phone number, an account, an e-mail, or the like) for identifying a recipient or a receiving device |
| Transmission time | Message transmission time |
| Emoticon information | Location where an emoticon is stored, an access route, or the name of an emoticon |

An example of an emoticon event message provided based on the example of Table 5, may be listed in Table 6 provided below. The example of Table 6 shows a case in which a total of one emoticon event is included.

TABLE 6

| Event Type | Transmission side information | Reception side information | Message transmission time | Emoticon information | |
|---|---|---|---|---|---|
| | | | | Location | Unique name |
| E | 01021030837 | 01031507929 | 1419384805312 | myfile.emoticon.default | Pleasure_Emoticon.gif |

FIGS. 31A to 31D are diagrams illustrating an operation of executing communication using an electronic device according to various embodiments of the present disclosure.

Referring to FIGS. 31A to 31D, an example is illustrated of a screen in association with an operation of sharing a signal corresponding to a user input with an electronic device of a conversation partner while communication with the conversation partner in a conversation partner display area is executed in a state of an expanded circle state. FIGS. 31A to 31D illustrate an example of a screen of an operation that shares a picture in a gallery.

A user may share an image using a common area of an expanded circle. For example, the user may select an image button 3110 for selecting an image in an interface area, as illustrated in FIG. 31A. The image may be stored in an internal or external server of the electronic device 400, and may be generated by user's direct photographing. The image may include a video.

When a user input (e.g., a touch) that selects an image button 3110 is detected, the electronic device 400 may recognize the user input as a conversion to an image selection mode for the communication with a conversation partner. The electronic device 400 may replace the content in the common area with an image selected by the user, as illustrated in FIGS. 31B, 31C, and 31D, in response to the recognition of the image selection mode, and may provide a scene transition effect (e.g., fade-in effect) that displays the selected image. For example, the electronic device 400 may provide an effect in which a background image 3130 that is currently displayed in FIG. 31B is displayed to be blurred gradually and an selected image 3140 is gradually displayed to be clear, overlaying the background image 3130, as illustrated in FIG. 31C, and the background image 3130 disappears and the selected image 3140 is completely displayed as illustrated in FIG. 31D.

When the image 3140 selected by the user is displayed through the common area as illustrated in FIG. 31D, the selected image 3140 may be shared (transmitted) with a communication conversation partner. Alternatively, before sharing (transmitting) the selected image 3140, the user may edit the selected image 3140 and share (transmit) the selected image 3140. For example, the user may select a memo button 3150 in the interface area, as illustrated in FIG. 31E, and writes a memo (e.g., handwriting) in the selected image 3140 of the common area.

A picture that is directly photographed by a user may be shared, in addition to an image that is stored in the electronic device 400 or an external electronic device. For example, when the user desires to share a directly photographed picture, the user may select a camera button 3120 for photographing a picture in the interface area as illustrated in FIG. 31A.

When a user input that selects the camera button 3120 is detected, the electronic device 400 may recognize the user input as a conversion to a camera photographing mode for the communication (e.g., sharing (transmitting) a picture or a video) with the conversation partner. The electronic device 400 may display a related control interface (e.g., an interface related to photographing a picture or a video) in response to the recognition of the camera photographing mode. The electronic device 400 may display a camera preview through the common area, in response to the conversion to the camera photographing mode. In a state in which the camera preview is displayed through the common area, the user may execute photographing a picture, a video, or the like. For example, the user may select a photographing button of the control interface, and the electronic device 400 may execute photographing when the selection of the photographing button is detected. The electronic device 400 may display a photographed picture (or a photo image) in the common area, after photographing. Subsequently, the electronic device 400 may share (transmit) the photographed photo image or a photo image obtained by additionally editing (e.g., memo) the photographed photo image with an electronic device of a conversation partner.

When communication is executed by interworking with the camera function, the communication may be executed based on a single button for a photographing and transmitting operation in a control interface. For example, when photographing is executed by a photographing button in a state in which a camera preview is displayed through the common area, the electronic device 400 may display a photographed photo image in the common area and simultaneously transmits the photographed photo image immediately to a conversation partner.

According to various embodiments of the present disclosure, as described above, an image or picture existing inside or outside the electronic device 400 may be selected by a user and shared, in addition to a picture that is directly photographed by the user, as described above.

Figure 32A:
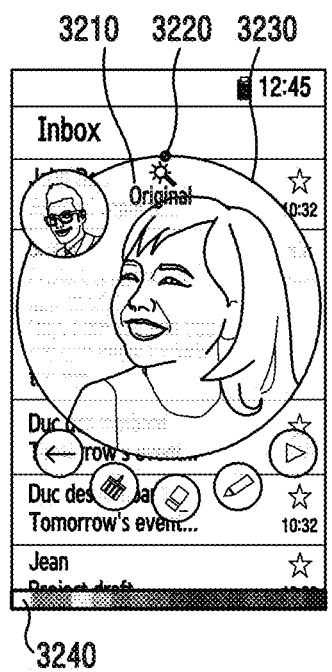
FIGS. 32A and 32B are diagrams illustrating an operation of executing communication using an electronic device according to various embodiments of the present disclosure.
Figure 32B:
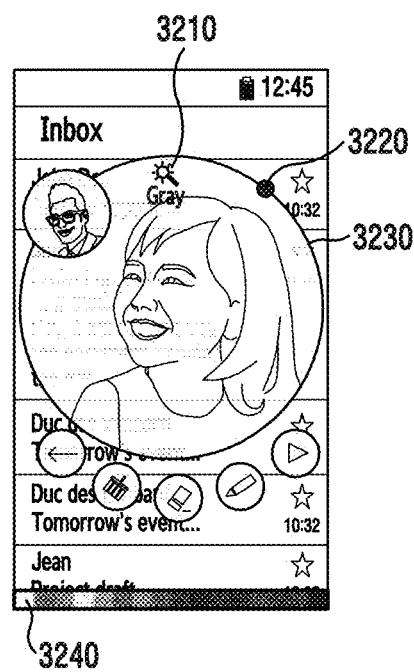

FIGS. 32A to 32B are diagrams illustrating an operation of executing communication using an electronic device according to various embodiments of the present disclosure.

Referring to FIGS. 32A to 32B, an example is illustrated of a screen in association with an operation that provides a filter effect to a picture photographed as illustrated in FIGS. 31A to 31D, through a common area. For example, as illustrated in FIG. 31D, in a state in which a picture photographed by a user is displayed in the common area, a memo button 3150 may be selected. The electronic device 400 may display a control interface related to editing a picture, as illustrated in FIG. 32A, in response to the selection of the memo button 3150.

For example, the electronic device 400 may provide an interface 3240 for selecting a memo color, as described above, and an interface (e.g., set filter information 3210 or a handler 3220 for changing a filter) for editing (e.g., adjusting a filter) a picture through a border 3230 of the common area. The user may select a memo color for writing a memo through the interface 3240, and may select a filter through the handler 3220. "Original" is displayed in the set filter information 3210 before a filter is changed, as illustrated in FIG. 32A. Subsequently, when the user moves the handler 3220 along the border 3230 (e.g., clockwise), a filter (e.g., "Gray") corresponding to a point to which the handler 3220 is moved may be applied to a picture in the common area, and may be displayed as illustrated in FIG. 32B. In response to the movement of the handler 3220, information indicating the set filter information 3210 may be reflected and displayed in real time.

FIGS. 33A to 33D are diagrams illustrating an operation of executing communication using an electronic device according to various embodiments of the present disclosure.

Referring to FIGS. 33A to 33D, an example is illustrated of a screen in association with an operation of sharing a signal corresponding to a user input with an electronic device of a conversation partner while communication with the conversation partner in a conversation partner display area is executed in a state of an expanded circle state. FIGS. 33A to 33D illustrate an example of a screen in association with an operation that shares a video.

A user may share a video obtained through video recording, using a common area of an expanded circle. For example, the user may select a photographing button 3310 for video recording in an interface area, as illustrated in FIG. 33A. According to various embodiments of the present disclosure, in a screen of FIG. 33A, a camera preview may be displayed through the common area.

When a user input that selects the photographing button 3310 is detected, the electronic device 400 may recognize the user input as a conversion to a video recording mode for the communication (e.g., sharing (transmitting) a video) with the conversation partner. The electronic device 400 proceeds with video recording in response to the recognition of the video recording mode, and displays various information corresponding to the execution of the video recording through the common area, as illustrated in FIGS. 33B, 33C, and 33D. For example, as illustrated in FIGS. 33B and 33C, the photographing button 3310 may be modified and displayed so as to indicate that video recording is currently executed, and visual effects are provided so that a user may recognize a video recording time. For example, the progress of video recording may be displayed by changing a color of a border 3360 of the common area, over time. A maximum video recording time may be set in advance. A residual time for video recording or a video recording time may be displayed through visual effects such as changing the color of a border. The progress may be displayed through a separator 3330 that moves along the border 3360.

The separator 3330 may move clockwise or counterclockwise to correspond to a video recording time, and a color of a route that the separator 3330 passes may be changed (e.g., reversed) and displayed. The user may terminate the operation using the photographing button 3310 while video recording is executed, as illustrated in FIGS. 33B and 33C, and the electronic device 400 may terminate video recording in response to the user input that terminates video recording. The electronic device 400 may provide a button 3340 that plays back (or plays back and transmits) a video obtained through video recording, as illustrated in FIG. 33D. The electronic device 400 may remove the displaying of state information (e.g., "REC") displayed in the common area, and the separator 3330 on the border 3360 of the common area, when video recording is terminated. When recording is terminated, recording information may be transmitted to a conversation partner in the conversation partner display area, automatically or based on a user input.

FIGS. 34A to 34C are diagrams illustrating an operation of executing communication using an electronic device according to various embodiments of the present disclosure.

Referring to FIGS. 34A to 34C, an example is illustrated of a screen in association with operations executed in a transmission side and a reception side, when a signal corresponding to a user input is shared with an electronic device of a conversation partner while communication with the conversation partner in a conversation partner display area is executed in a state of an expanded circle state. FIGS. 34A to 34C illustrate an example of a screen of an operation that shares streaming contents.

A user may play back and share streaming content using a common area between users. Streaming content may be provided by playing back content inside or outside an electronic device. For example, a playback function may be provided by using content stored in an electronic device, by interfacing a streaming service, such as Youtube, or by using a dedicated content server.

As illustrated in FIG. 34A, a user of a transmission side electronic device may select streaming content to be shared with a conversation partner through the common area, and the common area may share the streaming content when the streaming content is selected. An interface associated with selecting, sharing, or playing back a content may be displayed in the interface area.

The interface area may include various buttons corresponding to a playback control and sharing function. The user of the transmission side electronic device may transmit, to a conversation partner, streaming information (e.g., playback address of streaming content (e.g., uniform resource locator (URL)) using a sharing function. Information associated with whether automatic playback is applied, a volume, a size of displaying, and the like may be further included and transmitted. When streaming content is shared, a recipient partner may check and play back the same through a conversation partner display area. A conversation partner in the conversation partner display area may be automatically designated as a recipient, and thus, the user may not need to separately input recipient information. Additionally, when a user of the transmission side electronic device desires to share (transmit) content to many conversation partners, the user may designate an additional recipient. A method of designating a plurality of pieces of recipient information is described below with reference to drawings described below.

The reception side electronic device may receive streaming information from the transmission side electronic device, and may display a notification indicating that the streaming information is received as illustrated in FIG. 34B in response to the reception of the streaming information. When a user interface for the communication is in a deactivated state (e.g., a state in which communication is not executed) or operates based on a floating circle, in the reception side electronic device, the streaming information notification may be provided through a floating circle 3410 as illustrated in FIG. 34B. When the reception side electronic device operates based on an expanded circle, the streaming information notification may be displayed through a conversation partner display area or a common area.

When a user selects (e.g., touches) the playback of streaming content through the floating circle 3410, in a state of FIG. 34B, the reception side electronic device may obtain streaming content corresponding to the streaming information, and may display the obtained streaming content through the common area as illustrated in FIG. 34C. For example, the reception side electronic device connects to a server (e.g., Youtube, Samsung Mike, or the like) corresponding to the streaming information so as to initiate a streaming service operation of the streaming content, and receives the streaming content from the server so as to play back the same automatically or manually.

The transmission side electronic device may also transfer playback point information of the streaming content, and the reception side electronic device may play back the content from a point (e.g., playback section) identical to that of the transmission side electronic device, based on the playback point information (e.g., playback section). Content may also be played back by transferring a playback list. When an access right is required to play back a content, a message indicating that transmission is unavailable or a message indicating playback in the reception side electronic device is unavailable, may be displayed. Alternatively, when streaming information is transmitted, authority information may be encoded and transmitted together for playback.

Various events above, may be transferred to a conversation partner in real time, or may be transmitted when a predetermined condition is satisfied. The predetermined condition may indicate a reference for accumulating events. For example, events accumulated during a predetermined period of time (e.g., 3000 ms) may be transmitted, accumulated events including the last event may be transmitted when no event occurs during a predetermined period of time (e.g., 700 ms) after the last event occurs, or accumulated events may be transmitted when at least a predetermined number of events (e.g., 40 events) are accumulated. The time and the number of events may be defined in advance or may be redefined based on a communication response time.

When the electronic device 400 provides content (e.g., an image, music, a video, or the like) to an external electronic device, the electronic device 400 provides various context information (e.g., a transmitter/receiver, an application, a time, a communication scheme, and information indicating whether transmission and reception of a content is completed) of the time when the content is transmitted, together with the content. Alternatively, when the electronic device 400 receives a content (e.g., an image, music, a video, or the like) from an external electronic device, the electronic device 400 may generate context information (e.g., a transmitter/receiver, an application, a time, a communication scheme, and information associated with whether transmission or reception of a content is completed) of the time when the content is received, may store the same together with the content, and may display the context information together with the received content. An operation of receiving and storing provided contents and context information associated with the contents, and outputting a content based on received context information, is described below with reference to FIG. 35.

Figure 35:
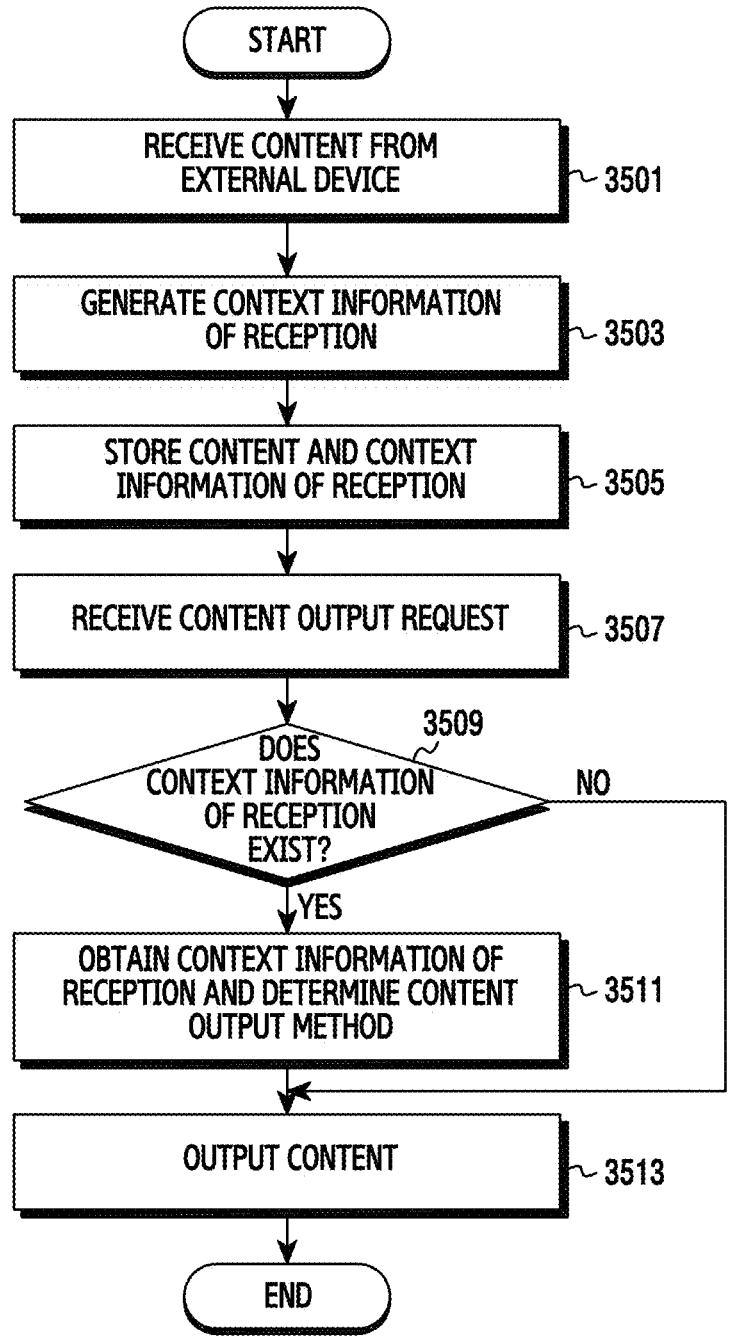
FIG. 35 is a flowchart illustrating a method of managing a content in an electronic device according to an embodiment of the present disclosure.

FIG. 35 is a flowchart illustrating a method of managing a content in an electronic device according to an embodiment of the present disclosure.

Referring to FIG. 35, when a content is received from another device (e.g., a server, a cloud, another electronic device, or the like) in operation 3501, the controller 480 of the electronic device 400 generates context information of the time when the content is received, in operation 3503. The context information of the reception may include at least one of a transmitter/receiver, a transmitting/receiving device, a title of the content, a type of the content, a size of the content, a transmitting/receiving application, a communication scheme, a transmission/reception time, and a path of storage.

In operation 3505, the controller 480 may store the content and the context information of the reception. The context information of the reception may be stored in the content or may be stored separately. When the context information of the reception is separately stored, link information between the content and the context information of the reception may be additionally managed.

When a request for outputting a content is received from a user in operation 3507, the controller 480 determines whether context information of the reception, which is associated with the content of which output is requested, exists, in operation 3509. For example, when the controller 480 should output a received content by a user's request, the controller 480 may determine whether context information of the reception associated with the content exists, and may execute a different content output process based on whether the context information of the reception exists.

When it is determined that the context information of the reception that is associated with the content does not exist in operation 3509 (NO in operation 3509), the controller 480 may output the content in operation 3513. For example, the controller 480 may output the content, irrespective of the context information of reception.

When it is determined that the context information of reception, which is associated with the content exists in operation 3509 (YES in operation 3509), the controller 480 obtains the context information of the reception and determines a content output scheme based on the context information of the reception in operation 3511.

In operation 3513, the controller 480 may output the content based on the determined output scheme. For example, the controller 480 may output the content based on the obtained context information of reception, or may output at least one of the context information of the reception together with the content. When the controller 480 loads content that is delivered through a message application, the controller 480 may output the content and a recipient together, through the message application. When the controller 480 loads an attached file, which is downloaded through an e-mail client, the controller 480 may search for and provide an e-mail where the attached file belongs, or may display an e-mail writing window including a sender of the attached file as a recipient. When the controller 480 loads an image that is downloaded from a website, the controller 480 may move (connect) to the website where the image is downloaded, and display the location of the corresponding image.

FIGS. 36A to 36C and 37 are diagrams illustrating an operation of executing communication using an electronic device according to various embodiments of the present disclosure.

Figure 36:
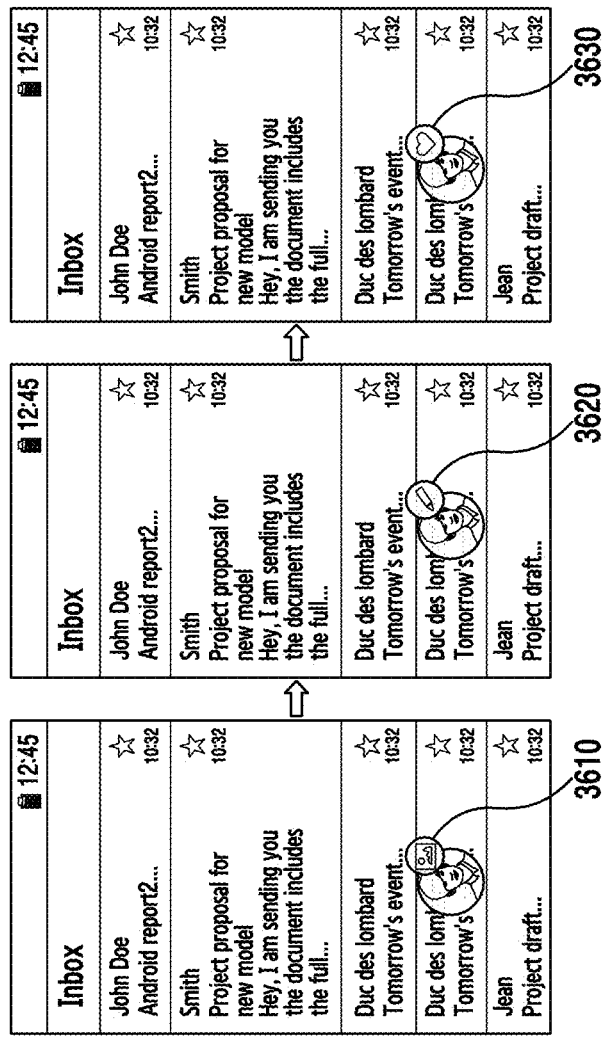
FIGS. 36A to 36C and 37 are diagrams illustrating an operation of executing communication using an electronic device according to various embodiments of the present disclosure.

Referring to FIGS. 36A to 36C, an example is illustrated of a screen in association with an operation of providing a notification corresponding to the reception of a content when the electronic device 400 receives the content transmitted from another electronic device in the state in which a floating circle is provided.

As described above, various content (e.g., a memo, a picture, an emoticon, or the like) may be received in response to various events that occur in an electronic device of a conversation partner of communication. When the electronic device 400 receives content from an electronic device of a conversation partner who has communication with, the electronic device 400 may notify a user of the same through various methods. For example, the electronic device 400 may provide a visual effect (e.g., a badge effect) indicating that the received content exists, using a floating circle, as illustrated in FIGS. 36A, 36B, and 36C.

The visual effect may be provided in the form of an image, text, an icon, or a combination thereof, which corresponds to a type of received content so as to enable the type of content (e.g., a memo, a picture, or an emoticon) to be identified, and may be provided to be close to, or by overlapping with, the floating circle. A badge may be displayed based on a type of a received event, such as a badge 3610 (e.g., a picture) as illustrated in FIG. 36A, a badge 3620 (e.g., a memo) as illustrated in FIG. 36B, a badge 3630 (e.g., an emoticon) as illustrated in FIG. 36C, or the like.

Figure 37:
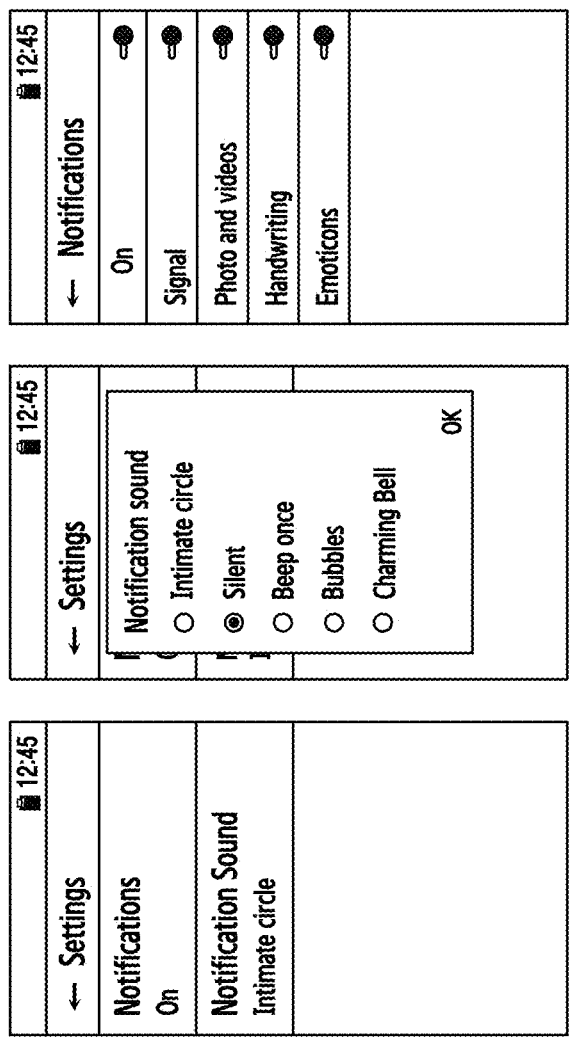

A notification associated with the received content may be provided through an acoustic effect based on various sounds or a tactile effect based on various vibrations, in response to a predetermined condition. For example, the notification associated with the received content may be provided based on settings as illustrated in FIG. 37. The notification in association with the received content may be reported based on at least one of a visual effect, an acoustic effect, and a tactile effect, according to the settings of the electronic device 400.

Referring to FIG. 37, the notification of the received content may be set through a notification setting menu provided in the electronic device 400. A user may operate the electronic device 400 and display a notification setting menu, and may determine a notification scheme (e.g., setting one or more of a visual effect, a sound effect, a vibration effect, and the like), and set a detailed option (e.g., a sub-option of a visual effect, a sub-option of a sound effect, a sub-option of a vibration effect, and the like) of each notification scheme in the notification setting menu. The user may also set the type of content of which reception is to be reported. For example, the user may set to report the reception of a content with respect to a predetermined single content, or may set to report the reception of contents with respect to two or more contents. As described above, various notification methods and effects may be provided with respect to the reception of content, through various user-based settings (adjustments).

Figure 38:
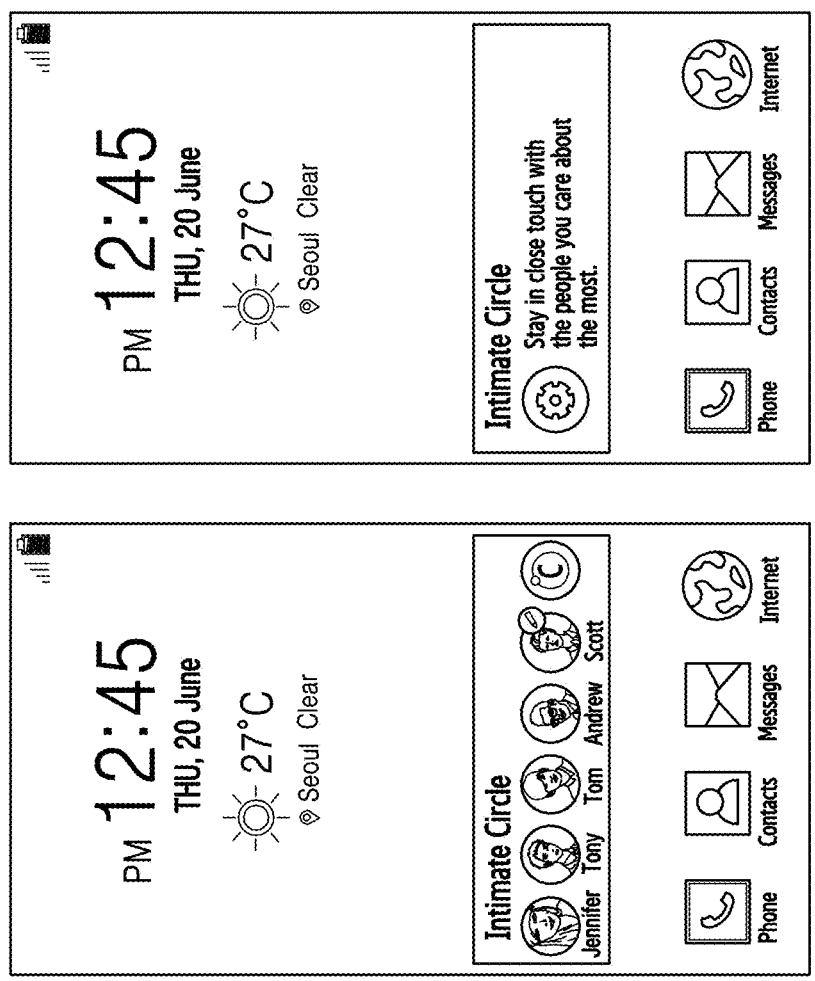
FIG. 38 is a diagram illustrating another example of an interface that is provided for communication in an electronic device according to an embodiment of the present disclosure.

FIG. 38 is a diagram illustrating another example of an interface that is provided for communication in an electronic device according to an embodiment of the present disclosure.

Referring to FIG. 38, an example of a screen of a widget (e.g., an intimate circle widget) that is provided to a home screen of the electronic device 400, for a quick execution of communication. The screen may be an example of a screen in which a conversation partner that is registered for communication is included. The screen may also be an example of a screen that is initially provided, or a screen in which a conversation partner registered for communication does not exist, and a function of a widget or brief description (e.g., stay in close touch with the people you care about the most) may be included. As illustrated in FIG. 38, when a user selects a conversation partner of communication using a widget, the user may immediately execute the above described user interface-based communication.

Figure 39:
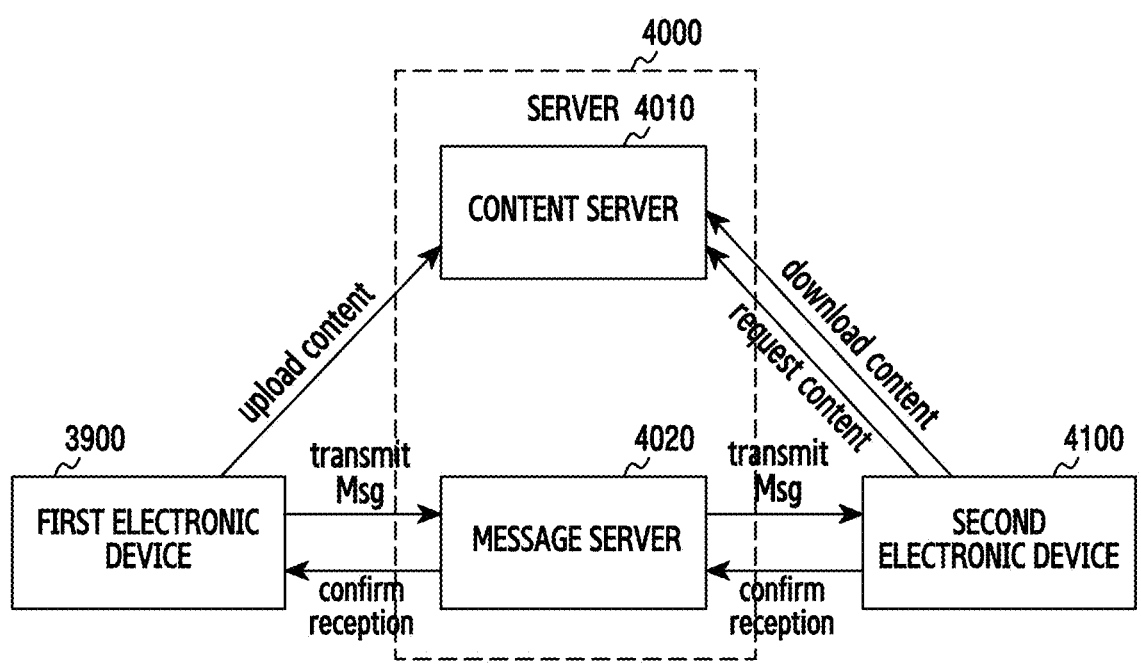
FIG. 39 is a diagram illustrating an operation of executing communication between electronic devices according to an embodiment of the present disclosure.

FIG. 39 is a diagram illustrating an operation of executing communication between electronic devices according to various embodiments of the present disclosure.

Referring to FIG. 39, an example of a configuration of a system for illustrating an operation of transmitting or receiving a content corresponding to communication between electronic devices, according to various embodiments of the present disclosure. The system may include a first electronic device 3900, a server 4000, and a second electronic device 4100.

Each of the first electronic device 3900 and the second electronic device 4100 may include the entire or a part of the electronic device 400 of FIG. 4, and may be of a type identical to or different from the electronic device 400. FIG. 39 illustrates an example in which the first electronic device 3900 operates as a transmission side electronic device that transmits content, and the second electronic device 4100 operates as a reception side electronic device that receives content.

The server 4000 may include a content server 4010 and a message server 4020. Although FIG. 39 illustrates the content server 4010 and the message server 4020 as separate components for ease of description, they may be operated by the server 400 in an integrative manner. The content server 4010 may receive content delivered from the first electronic device 3900 in the communication between the first electronic device 3900 and the second electronic device 4100, and transfers the content to the second electronic device 4100, automatically or in response to the second electronic device 4100. The message server 4020 may receive a message delivered from the first electronic device 3900 in the communication between the first electronic device 3900 and the second electronic device 4100, and transfers the message to the second electronic device 4100, automatically or in response to the second electronic device 4100. The server 4000 may be omitted when the first electronic device 3900 and the second electronic device 4100 communicate based on a P2P scheme.

As illustrated in FIG. 39, in communication between electronic devices, content may be transmitted or received, in addition to an event (or signal) (e.g., touch information) corresponding to a user input. The server 4000 may be distinguished into the content server 4010 and the message server 4020, based on a role. The content server 4010 and the message server 4020 may be embodied as the single server 4000.

When the first electronic device 3900 transmits content to the second electronic device 4100, the first electronic device 3900 uploads the content to the content server 4010, and may transmit a content message (e.g., a location address of a content (e.g., URL)) to the second electronic device 4100 through the message server 4020.

The server 4000 may receive content for which uploading is requested by the first electronic device 3900, and store the content in the content server 4010. The server 400 may process a content message of which transmission is requested by the first electronic device 3900, and may transmit the content message to the second electronic device 4100, which is a recipient.

When the second electronic device 4100 receives, through the message server 4020, the content message transmitted by the first electronic device 3900, the second electronic device 4100 accesses the content server 4010, and requests and downloads the content, based on the content message. The content request may use a URL form.

Figure 40:
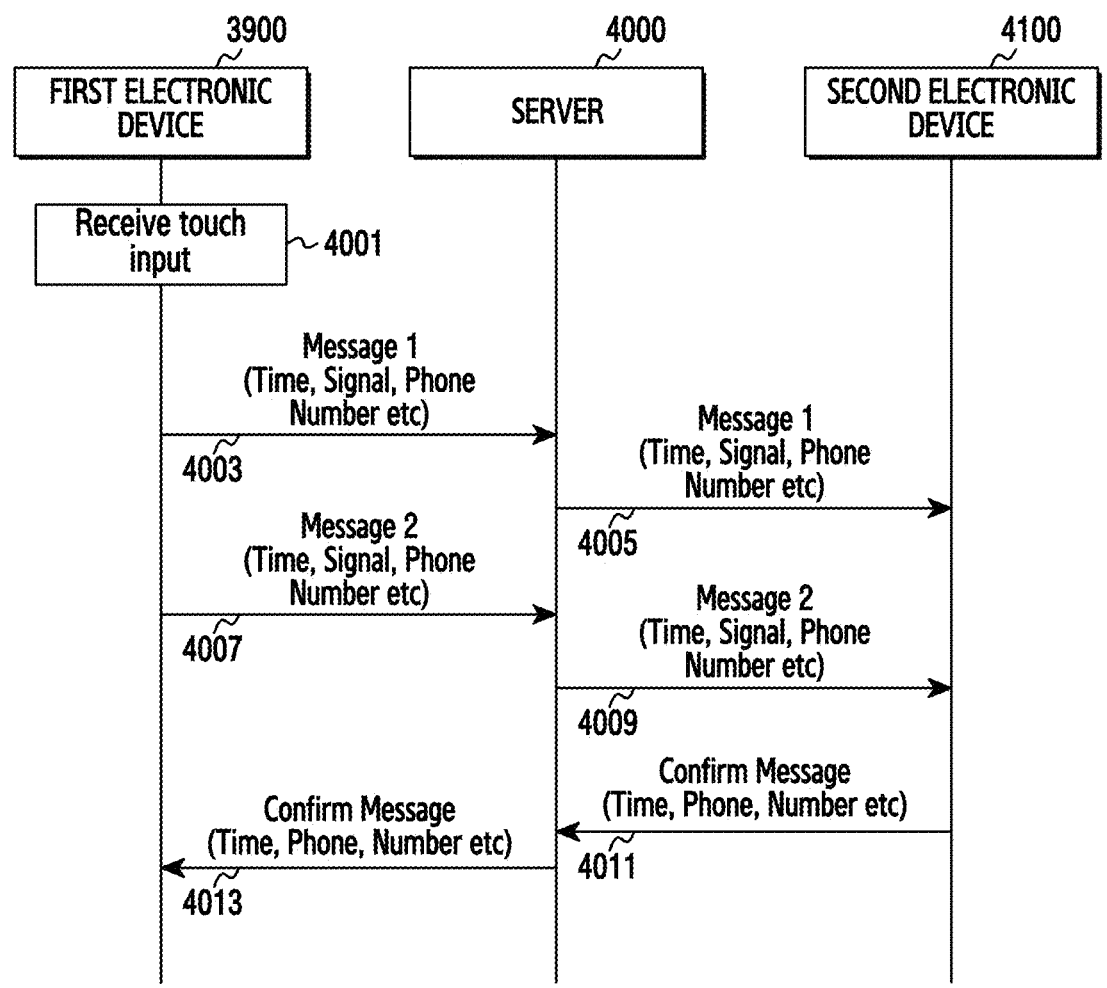
FIG. 40 is a diagram illustrating an operation of executing communication between electronic devices according to an embodiment of the present disclosure.

FIG. 40 is a diagram illustrating an operation of executing communication between electronic devices according to an embodiment of the present disclosure.

Referring to FIG. 40, an operation is illustrated of transmitting content in response to an event and an operation of transmitting a response in response to the reception of the content, when communication is executed in response to the event (e.g., touch information) generated from the first electronic device 3900, in a system according to various embodiments of the present disclosure.

As illustrated in FIG. 40, in operation 4001, the first electronic device 3900 receives a touch input based on a floating circle or an expanded circle.

In operations 4003 and 4007, the first electronic device 3900 generates a message (e.g., Message 1 and Message 2) in response to the touch input, and transmits the message to the server 4000. The message may include information such as a time, a signal (e.g., touch information), a phone number, or the like. An example of the format of the message is described below.

In operations 4005 and 4009, the server 4000 may transfer the message received from the first electronic device 3900 to the second electronic device 4100. For example, the server 4000 may determine a destination of the message (e.g., the second electronic device 4100) based on reception side information included in the message, in response to the reception of the message, and may transfer the message to the second electronic device 4100, which is the destination of the message. The message may be the same as the message that is transferred from the first electronic device 3900, or may further include information added by the server 4000.

In operation 4011, the second electronic device 4100 may generate a confirmation message when a user checks the message, and may transmit the confirmation message to the server 4000. For example, the second electronic device 4100 may report the reception of the message to the user, and may determine whether the user checks the message. When it is determined that the user checks the message, the second electronic device 4100 may transmit the confirm message. The confirm message may include information such as a time, a phone number, or the like, and an example of the format of the confirm message will be described in the description provided below with reference to the following drawings.

In operation 4013, the server 4000 determines a destination of the confirm message in response to the confirm message received from the second electronic device 4100, and may transfer the confirm message to the first electronic device 3900, which is the destination of the confirm message.

FIG. 41 is a diagram illustrating an example of a content event message format according to various embodiments of the present disclosure.

Referring to FIG. 41, the electronic device 400 may generate a content event message corresponding to a user input, and may transfer the content event message to the server 4000 or the second electronic device 4100 of a conversation partner. For example, the first electronic device 3900 may transmit the content event message to the second electronic device 4100 of the conversation partner through a server-client scheme or a P2P scheme. FIG. 41 illustrates an example in which a content event message is transmitted based on the server-client scheme.

As described in FIG. 41, the content event message may include various fields associated with at least one of an event type, transmission side information, reception side information, a message transmission time, and a content URL, and the format may further include other additional information depending on embodiments. Each field of the content event message format may be defined in Table 7 provided below.

TABLE 7

| Field | Descriptions |
|---|---|
| Event Type | Identifier for determining a type of event<br>1 'IS': Image Share<br>1 'VS': Video Share |
| Transmission side information | message sender information and a unique value (e.g., a phone number, an account, an e-mail, and the like) for identifying a sender or a transmitting device |
| Reception side information | message recipient information and a unique value (e.g., a phone number, an account, an e-mail, and the like) for identifying a receiver or a receiving device |
| Transmission time | message transmission time |
| URL | URL<br>URL of content storage |

An example of a content event message provided based on the example of Table 7, may be listed in Table 8 provided below.

In the example of Table 8 provided below, it is assumed that an image is shared, and accordingly, an example is provided in which a content event message is an image sharing message.

TABLE 8

| Event Type | Transmission side information | Reception side information | Message transmission time | Content URL |
|---|---|---|---|---|
| IS | 01021030837 | 01031507929 | 1419385590100 | http://Ors-DEV-elb-1164306257.ap-northeast-1.elb.amazonaws.com/ors/v2/public/download/70wT1NHMOlP4X?auth_code=52531/01021030837/EC_20141224104623.jpg|531920 |

FIGS. 42A to 42C are diagrams illustrating an example of a screen for each type of message that is received as communication is executed in an electronic device according to various embodiments of the present disclosure.

Referring to FIGS. 42A to 42C, the second electronic device 4100 may execute an operation based on received information. The second electronic device 4100 may determine a type of event and transmission side information through the message received from the server 4000, and may display information included in the message in an area associated with a corresponding sender.

When a message is received, the second electronic device 4100 may generate a vibration and display a circle associated with a sender (e.g., a floating circle or an expanded circle) so as to provide a notification. As illustrated in FIG. 42A, a knock event may display a visual cue in a circle (e.g., a floating circle), generating a vibration as many times as the number of events included in the message. As illustrated in FIG. 42B, a handwriting event may display strokes in a common area of an expanded circle, based on the number of strokes, thickness, colors included in the message. As illustrated in FIG. 42C, a content transmission event may receive content from a predetermined server (e.g., a file server) and display the content in a common area of an expanded circle, based on URL information included in the message. As illustrated in FIG. 42C, when content (e.g., an image) is received, content that has been displayed in the common area may be changed with the received content (e.g., an image), and the received content is displayed.

The message of the knock event may be formed of at least one touch signal and each signal generation time. The second electronic device 4100 may calculate a difference in time between the occurrence of signals included in the message so as to obtain an interval between the signals. Based on the interval, the second electronic device 4100 may generate a vibration and display a visual cue at intervals, which are similar to the input intervals of the first electronic device 3900.

In the case of the handwriting event, each stroke may exist in a form of a signal and thus, the order of displaying strokes may be determined based on touch occurrence times of signals included in the message.

The second electronic device 4100 may transfer information associated with a user checks a message, to the first electronic device 3900. For example, when the user of the second electronic device 4100 checks, through a common area, a message received from the first electronic device 3900, the second electronic device 4100 may transfer a confirm message as illustrated in the example of FIG. 43, to the server 4000. The server 4000 may transfer the received confirm message to the first electronic device 3900. When the first electronic device 3900 receives the confirm message, the first electronic device 3900 determines that a conversation partner (the user of the second electronic device 4100) checks the transmitted message, and reports the same to the user of the first electronic device 3900.

FIG. 43 is a diagram illustrating an example of a confirm message format according to an embodiment of the present disclosure.

Referring to FIG. 43, the electronic device 400 may generate a confirm message in response to the fact that a user checks a received message, and may transfer the confirm message to a server or an electronic device of a conversation partner. For example, the second electronic device 4100 may transmit the confirm message to the first electronic device 3900 of a conversation partner through a server-client scheme or a P2P scheme. FIG. 43 provides description using an example in which a confirm message is transmitted based on the server-client scheme.

As described in FIG. 43, the confirm message may include various fields associated with at least one of an event type, transmission side information, reception side information, a message transmission time, a transmission time of a received message, additional information, and the like, and the format may further include another additional information depending on embodiments. Each field of the confirm message format may be defined in Table 9 provided below.

TABLE 9

| Field | Descriptions |
|---|---|
| Event Type | Identifier for determining a type of event<br>l 'KG': Knock Group |

TABLE 9-continued

| Field | Descriptions |
|---|---|
| | l 'HWG': Hand Writing Group<br>l 'C': Confirm |
| Transmission side information | Message sender information, and a unique value (e.g., a phone number, an account, an e-mail, and the like) for determining a sender or a transmitting device |
| Reception side information | Message receiver information, and a unique value (e.g., a phone number, an account, an e-mail, or the like) for identifying a recipient or a receiving device |
| Message transmission time | Message transmission time |
| Transmission time of received message | Transmission time of received message |
| Additional information | Action Type: touch Up, touch Down |

An example of a confirm message provided based on the example of Table 9, may be listed in Table 10 provided below.

TABLE 10

| Event Type | Transmission side information | Reception side information | Message transmission time | Transmission time of received message | Additional information |
|---|---|---|---|---|---|
| C | 01031507929 | 01021605314 | 1416585236271 | 1416572628930 | True |

Figure 44:
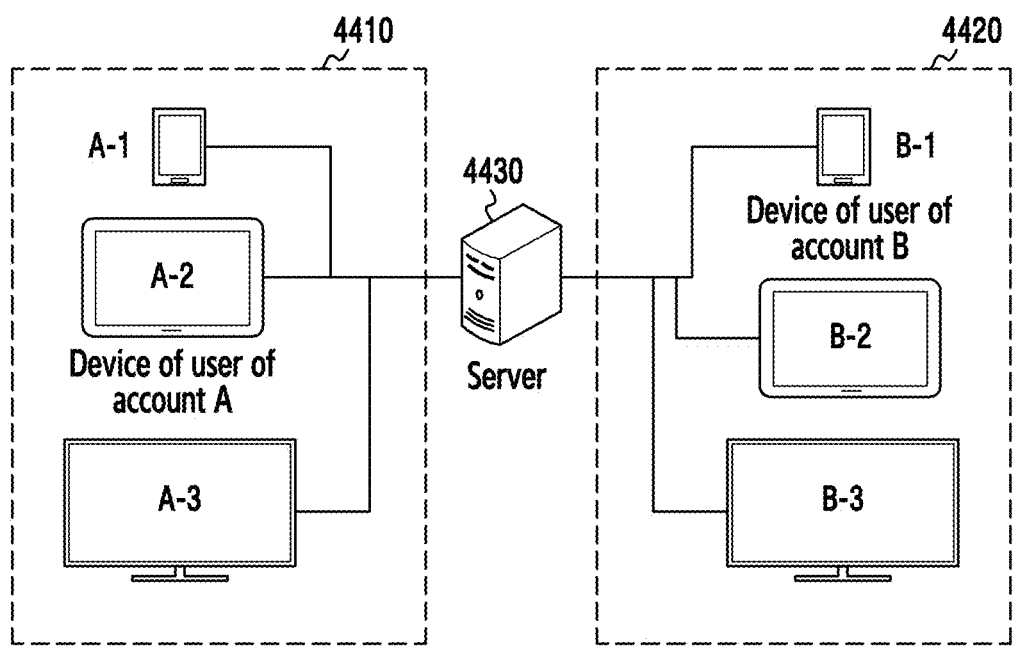
FIG. 44 is a diagram illustrating an operation of determining a message reception electronic device when communication is executed, according to an embodiment of the present disclosure.

FIG. 44 is a diagram illustrating an operation of determining a message reception electronic device when communication is executed, according to an embodiment of the present disclosure.

Referring to FIG. 44, various types of methods may be used for identifying users for the transmission and reception of a message. For example, users may be identified based on a phone number-based scheme, an account-based scheme, a device-based scheme that identifies devices, an application-based scheme that identifies applications, and the like.

When a user who is to receive a message is identified based on a phone number, a device, or an application which has a unique identification value, a single device that may receive a notification of reception of the corresponding message may be used.

A plurality of devices may be registered in a user's account. When a user who is to receive a message is identified based on an account, an operation of determining a device to which a notification of reception of a message is to be transferred, out of a plurality of devices of the corresponding account, may be further included.

As illustrated in FIG. 44, an example is illustrated of a case in which a plurality of user devices are registered in a single identical account. For example, when a user of an account A 4410 transmits a message to a user of an account B 4420, a server 4430 determines a device to which a notification of reception of a message is to be transmitted, out of the devices (e.g., B-1, B-2, and B-3) that are registered as user devices of the user of the account B 4420, and transfer the notification of reception to at least one of the registered devices (e.g., B-1, B-2, and B-3) of the user of the account B 4420 based on a result of the determination.

The server 4430 may transmit a notification of reception of a message to all of the devices that are registered in an account of a message recipient. The server 4430 may determine a device that is capable of receiving a message (e.g., a device that is registered in advance for communication), and may transmit a notification of the reception of a message with respect to at least one determined device. In addition, a notification of reception of a message may be transmitted to only a device of which a user is detected.

Figure 45:
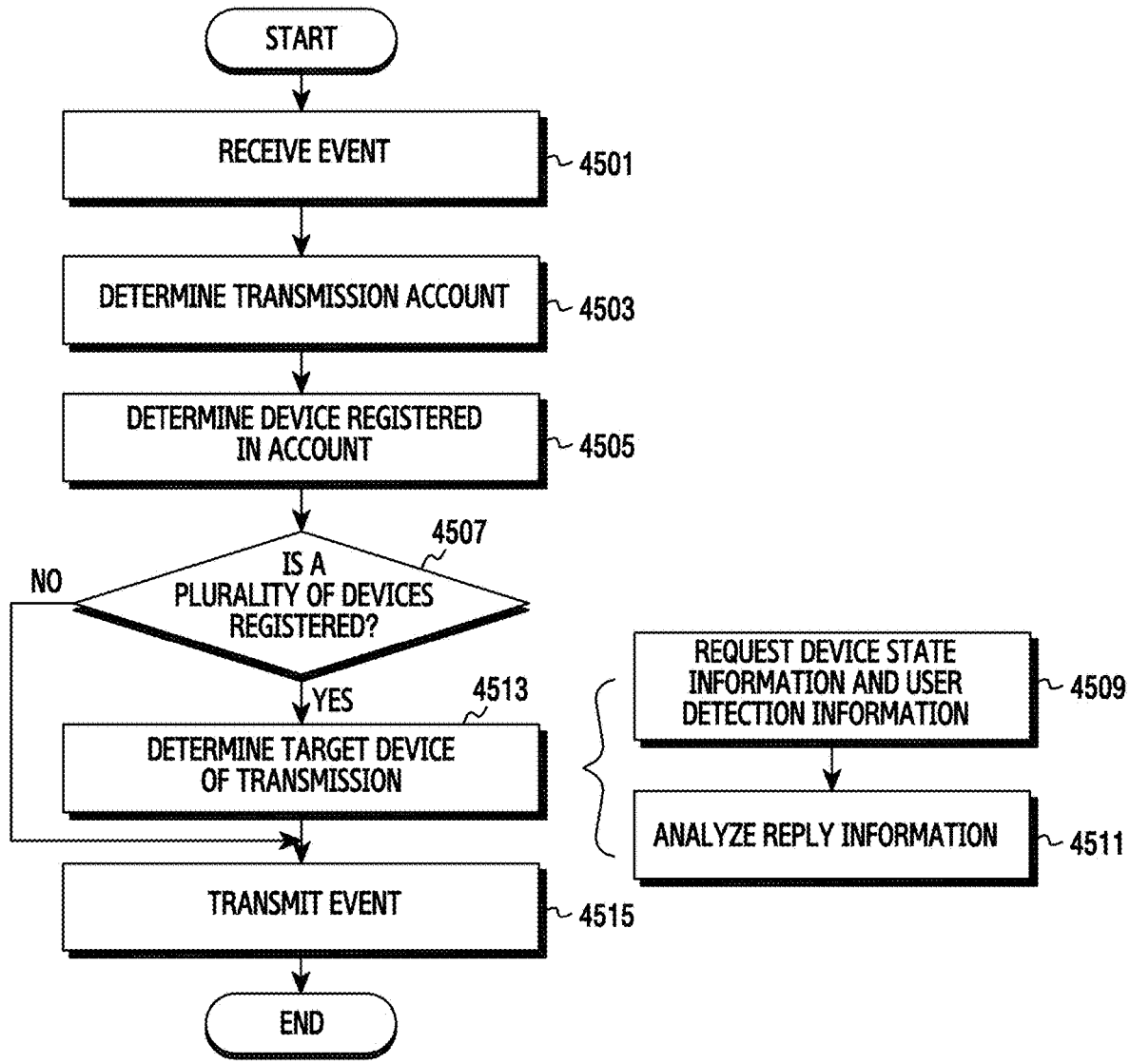
FIG. 45 is a flowchart illustrating an operation of determining a message reception electronic device when communication is executed, according to an embodiment of the present disclosure.

FIG. 45 is a flowchart illustrating an operation of determining a message reception electronic device when communication is executed, according to an embodiment of the present disclosure.

Referring to FIG. 45, an example is illustrated of an operation of relaying a message of the server 4430 of FIG. 44. Although a notification of reception of a message is selectively transmitted/received through relaying of a message by the server 4430, a receiver (a user of a second account 4420) may be capable of checking a received message through a device that is registered in an identical account.

When the reception of an event is detected in operation 4501, the server 4430 determines an account that transmits the event in operation 4503.

The server 4430 determines a registered device that is registered in the account that transmits the event through the determination operation in operation 4505, and determines whether a plurality of devices are registered in the account in operation 4507.

When the server 4430 determines that a single device is registered in the account in operation 4507 (NO in operation 4507), the server 4430 transmits the event to the single registered device of the account in operation 4515.

When the server 4430 determines that a plurality of devices are registered in the account in operation 4507 (YES in operation 4507), the server 4430 determines a target device of transmission out of the plurality of registered devices of the account in operation 4513. The operation of determining the target device of transmission may determine a device of which a user is detected. For example, in operation 4509, the server 4430 may request device state information and user detection information from registered devices of the account. In operation 4511, the server 4430 may analyze reply information received from the registered devices. In operation 4513, the server 4430 determines a target device of transmission out of the registered devices of the account, based on a result of analyzing the received reply information.

In operation 4515, the server 4430 transmits the event to one or more devices that are determined to be target devices of transmission out of the registered devices of the account.

Figure 46:
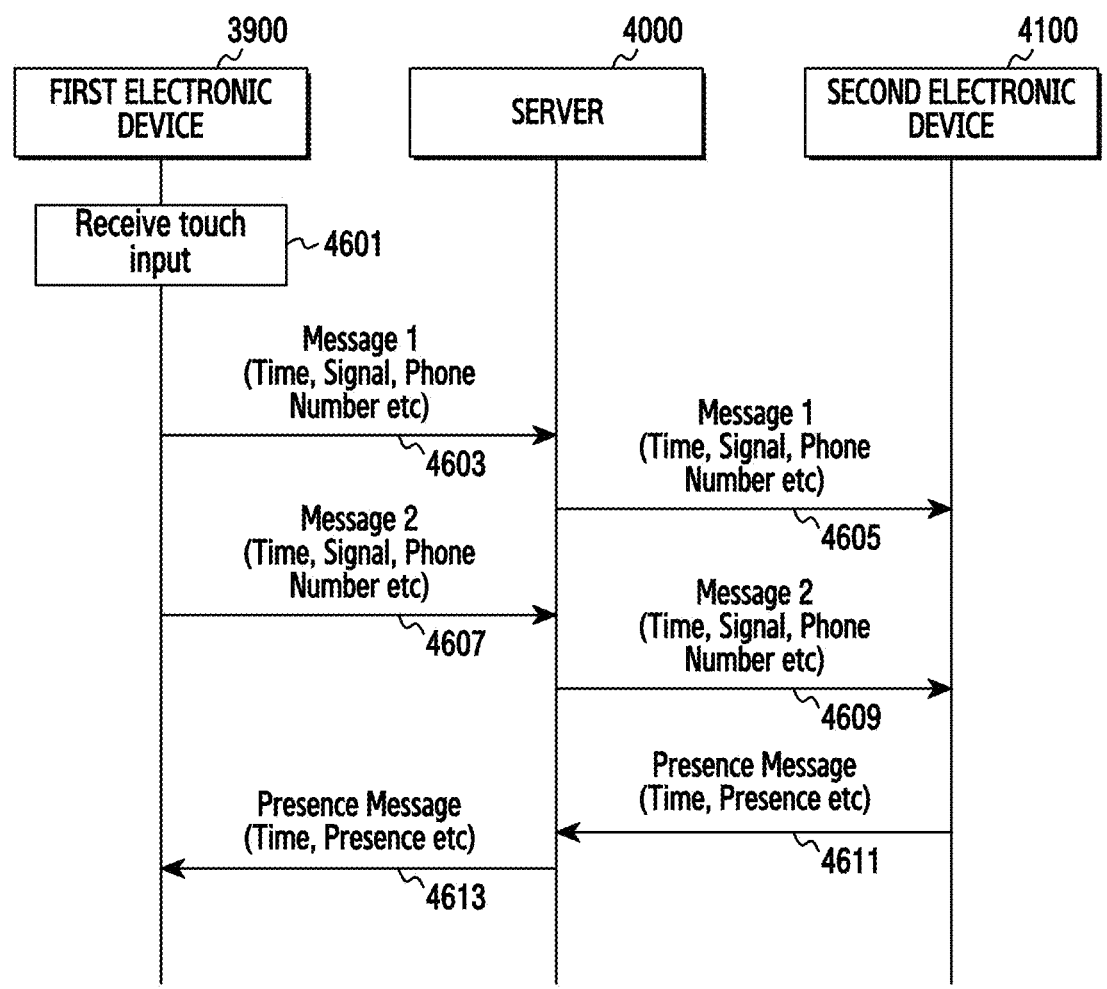
FIG. 46 is a diagram illustrating an operation of executing communication between electronic devices according to an embodiment of the present disclosure.

FIG. 46 is a diagram illustrating an operation of executing communication between electronic devices according to an embodiment of the present disclosure.

Referring to FIG. 46, an operation is illustrated of transmitting content in response to an event and an operation of transmitting a response in response to the reception of the content, when communication is executed in response to the event (e.g., touch information) generated from the first electronic device 3900, in a system according to various embodiments of the present disclosure.

As illustrated in FIG. 46, in operation 4601, the first electronic device 3900 receives a touch input based on a floating circle or an expanded circle.

In operations 4603 and 4607, the first electronic device 3900 generates a message (e.g., Message 1 and Message 2) in response to a touch input, and transmits the message to the server 4000. The message may include information such as a time, a signal (e.g., touch information), a phone number, or the like. An example of the format of the message is described above with reference to FIG. 41.

In operations 4605 and 4609, the server 4000 may transfer a message received from the first electronic device 3900 to the second electronic device 4100. For example, according to various embodiments of the present disclosure, the server 4000 may determine a destination of the message (e.g., the second electronic device 4100) based on reception side information included in the message, in response to the reception of the message, and may transfer the message to the second electronic device 4100 which is the destination of the message. The message may be the same as the message that is transferred from the first electronic device 3900, or may further include information added by the server 4000.

In operation 4611, the second electronic device 4100 generates a presence message when a user does not check the received message, and transmits the presence message to the server 4000. For example, the second electronic device 4100 may report the reception of the message to the user, and may determine whether the user checks the message. When it is determined that the user does not check the message, the second electronic device 4100 may transmit the presence message. The presence message may include information, such as time, presence, or the like.

The presence of the second electronic device 4100 may execute tracking (or recognizing context) various contexts (e.g., the context of driving, the context of movement, the context of sleep, or the like) in association with a user of the second electronic device 4100 based on context cognition technology. The second electronic device 4100 may generate context information in response to tracking. The second electronic device 100 may obtain the context information based on at least one of operation information of the second electronic device 4100, usage information of the second electronic device 4100, circumstance information of the second electronic device 4100, and communication information of the second electronic device 4100 through the context cognition with respect to the second electronic device 4100. The second electronic device 4100 may generate the presence message including the context (e.g., the context of driving) of the user, based on the state information. The second electronic device 4100 may execute context cognition using various sensors for the cognition of the context of the second electronic device 4100.

In operation 4613, the server 4000 determines a destination of the presence message in response to the presence message received from the second electronic device 4100, and may transfer the presence message to the first electronic device 3900, which is the destination of the presence message.

The first electronic device 3900 that receives the presence message may execute a process to display an indication corresponding to the context information of the presence message, in response to the reception of the presence message. An example is described below with reference to FIGS. 47A to 47D.

FIGS. 47A to 47D are diagrams illustrating an operation of executing communication between electronic devices according to various embodiments of the present disclosure.

Referring to FIGS. 47A to 47D, FIGS. 47A to 47D illustrate an example of screens in association with operations of a transmission side and a reception side, when the first electronic device 3900 shares a signal (e.g., a knock event) corresponding to a user input with the second electronic device 4100 of a conversation partner in the communication with the conversation partner of a conversation partner display area in a state of a floating circle state.

FIGS. 47A to 47D illustrate an example of a case in which the user of the second electronic device 4100 does not check a knock event of the first electronic device 3900. In the example of FIGS. 47A to 47D, the second electronic device 4100 transmits a presence message to the first electronic device 3900 since the user does not check the knock event, and the first electronic device 3900 displays context information associated with the conversation partner in response to the reception of the presence message.

Figure 47:
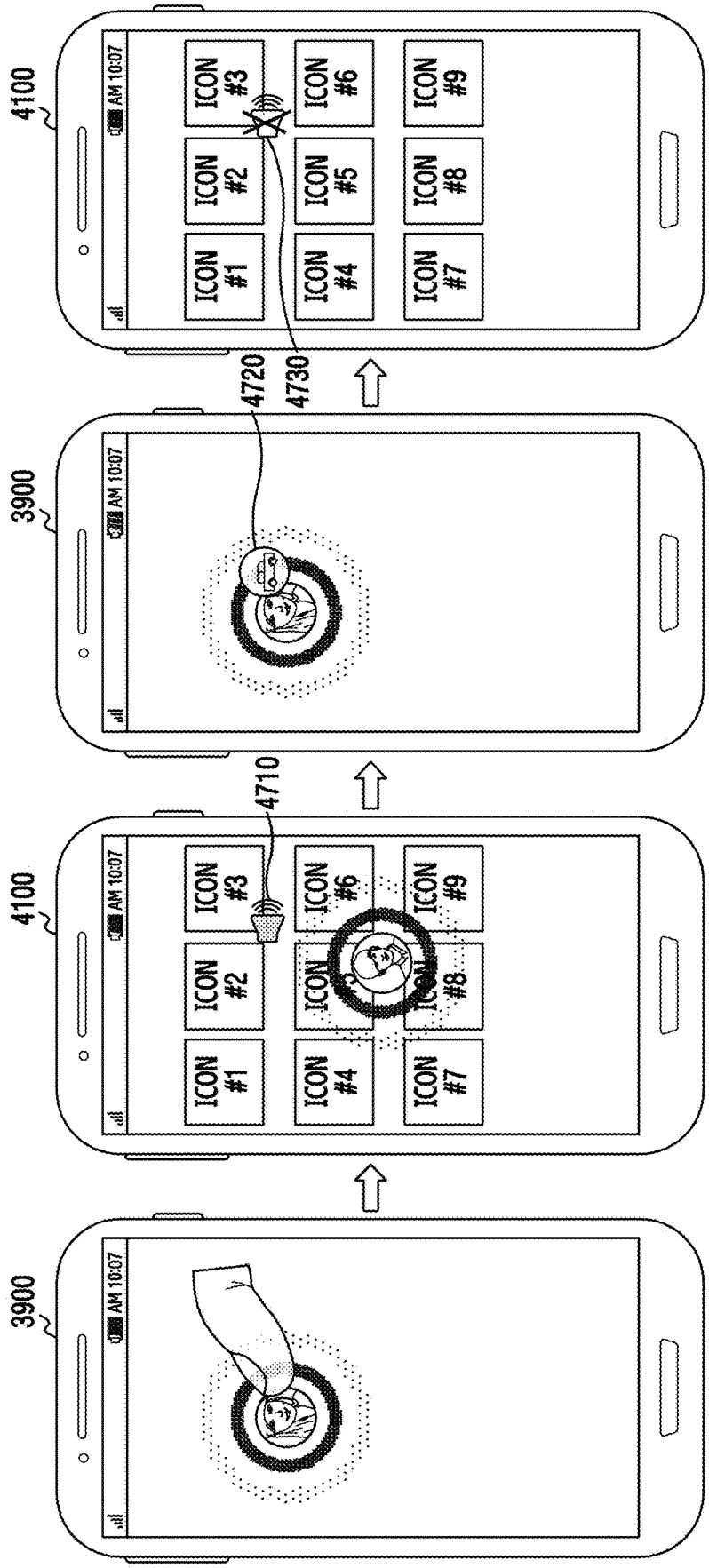
FIGS. 47A to 47D are diagrams illustrating an operation of executing communication between electronic devices according to various embodiments of the present disclosure.

As illustrated in FIG. 47A, the user of the first electronic device 3900 may input an event (e.g., a knock event including a touch or successive touches) for the communication with a conversation partner, through the floating circle. The first electronic device 3900 may transmit the event to the second electronic device 4100 corresponding to the conversation partner of the floating circle, in response to inputting the event by the user.

As illustrated in FIG. 47B, the second electronic device 4100 may provide a notification 4710 (e.g., a ripple effect based on a floating circle) corresponding to the event in response to the reception of an event from the first electronic device 3900. The second electronic device 4100 may determine whether a user checks the reception of the event, and when it is not detected that the user checks the event, the second electronic device 4100 may determine the presence of the user, based on the context information (sensor information) of the second electronic device 4100. When it is determined that the user is not able to provide a response (e.g., the context of driving), the second electronic device 4100 may transmit the presence of the second electronic device 4100 to the first electronic device. The second electronic device 4100 may transfer a presence message to the first electronic device 3900.

As illustrated in FIG. 47C, when the presence message is received from the second electronic device 4100, the first electronic device 3900 may display presence information 4720 of the conversation partner based on the floating circle of the conversation partner.

In this instance, the user of the first electronic device 3900 may input an additional event through the floating circle, and the first electronic device 3900 may transmit an additional event to the second electronic device 4100 in response to inputting the event by the user.

As illustrated in FIG. 47D, when the additional event is received in the state in which the user does not check a previous event, the second electronic device 4100 may determine the presence of the user, based on the sensor information of the second electronic device 4100. When it is determined that the user not able to provide a response, the second electronic device 4100 may transmit the presence of the second electronic device 4100 to the first electronic device 3900, and may not provide a notification associated with the additional event. For example, unlike the notification 4710 in the example of the screen of FIG. 47B, only information 4730 indicating that a previous event is not checked may be provided. Conversely, when it is determined that the user checks the event, based on a result of the determination, the second electronic device 4100 may provide a notification associated with the additional event.

The transmission of the presence information in the second electronic device 4100 that receives an event may be embodied variously in response to the settings of the electronic device 400.

In the case in which the first electronic device 3900 transmits a previous event to the second electronic device 4100, and subsequently, transmits an additional event, when the user of the second electronic device 4100 does not check the additional event, the second electronic 4100 may determine the presence of the user of the second electronic device 4100. Based on a result of the determination, the second electronic device 4100 may transmit presence information to the first electronic device 3900, and may not provide a notification associated with the additional event.

In the case in which the first electronic device 3900 transmits an initial event, when a user of the second electronic device 4100 does not check the initial event during a predetermined period of time, the second electronic device 4100 may determine the presence of the user of the second electronic device 4100. Based on a result of the determination, the second electronic device 4100 may transmit presence information to the first electronic device 3900, and may not provide a notification associated with the additional event.

Figure 48:
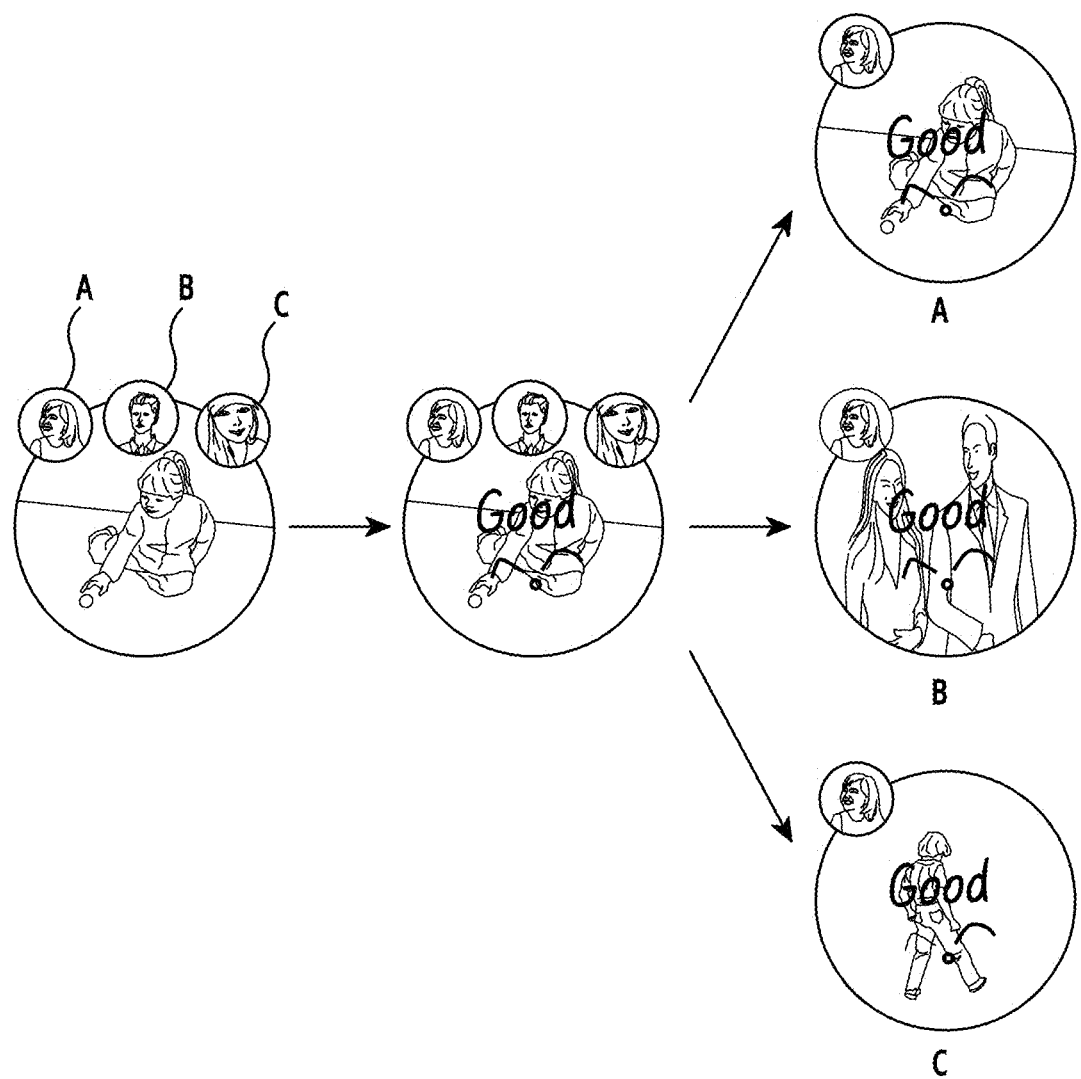
FIG. 48 is a diagram illustrating an example of an operation of selecting a conversation partner when communication is executed in an electronic device according to an embodiment of the present disclosure.

FIG. 48 is a diagram illustrating an example of an operation of selecting a conversation partner when communication is executed in an electronic device according to an embodiment of the present disclosure.

Referring to FIG. 48, FIG. 48 illustrates an example of a screen in association with an operation that provides a plurality of conversation partners through a conversation partner display area in an expanded circle, selects one or a plurality of conversation partners for the communication out of the plurality of conversation partners, and executes communication.

A conversation partner may be selected from a conversation partner list, or a conversation partner may be selected by embodying a plurality of conversation partner display areas and additionally disposing a conversation partner for each conversation partner display area.

For example, as illustrated in FIG. 48, a user may set a user A, a user B, and a user C as conversation partners through a conversation partner display area, and the electronic device 400 may provide three conversation partner display areas corresponding to the user A, the user B, and the user C, in response to the user's settings. The user may input a content to be shared through a common area, and the electronic device 400 may generate an event (message) corresponding to a user input, and may transmit the event to different electronic devices which respectively correspond to the user A, the user B, and the user C. Each of the electronic devices of the user A, the user B, and the user C may receive the event from the electronic device 400, and may display the received event through a common area.

With respect to a plurality of conversation partners corresponding to the plurality of conversation partner display areas, group communication based on all of the conversation partners or individual communication based on predetermined one or more conversation partners may be executed in response to a selection made by the user. Also, a conversation partner of the conversation partner display area may be deleted, edited, or added, based on a user input. The pause of a message (event) transmission, the resumption of a message (event) transmission, an individual conversation interface, and the like may be provided for each conversation partner through a conversation partner display area.

As illustrated in FIG. 48, each of the electronic devices that respectively correspond to the user A, the user B, and the user C may display information associated with the user in a single conversation partner display area, and may display a content corresponding to an event received from the conversation partner through a common area. Each of the electronic devices corresponding to the user A, the user B, and the user C may maintain a background screen and displays only the content (e.g., a memo (e.g., Good ^.^)) of the received event through the common area, and may display the identical content in the location identical to the content displayed in the common area of the electronic device 400.

Figure 49:
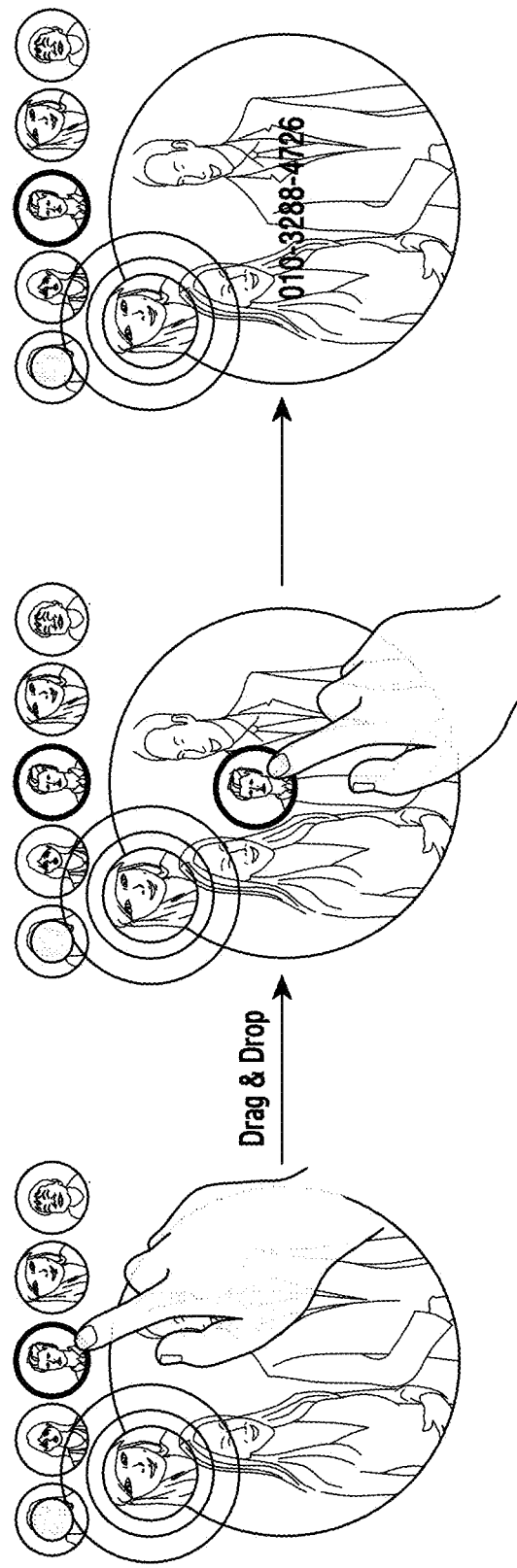
FIG. 49 is a diagram illustrating an example of a screen in association with an operation of executing communication using an electronic device according to various embodiments of the present disclosure.

FIG. 49 is a diagram illustrating an example of a screen in association with an operation of executing communication using an electronic device according to an embodiment of the present disclosure.

Referring to FIG. 49, an example of a screen in association with an operation of transmitting a signal corresponding to a user input to an electronic device of a conversation partner while communication with the conversation partner in a conversation partner display area is executed in a state of an expanded circle state. FIG. 49 illustrates an example of a screen in association with an operation that generates a profile event, and accordingly, shares a profile (e.g., contact information or the like) of a predetermined user with a conversation partner.

As illustrated in FIG. 49, a user may share contact information with a conversation partner using a common area of an expanded circle. For example, the user may activate a member tray, and may provide an input (e.g., drag & drop) that moves a circle of a predetermined user from the member tray to a common area. The electronic device 400 may share the entirety or a portion of the profile information (e.g., contact information or the like) of the user of the circle that is moved to the common area, in response to the user input. The electronic device 400 may extract profile information (e.g., contact information (e.g., 010-3288-4726)) of a user of the circle that is moved to the common area, and may transmit a profile event message to an electronic device of the conversation partner while displaying the extracted profile information through the common area.

Although not illustrated, various content may be shared based on the above described embodiments of the present disclosure.

According to various embodiments of the present disclosure, content captured through capturing may be shared. The electronic device 400 may provide a screen capturing function that captures a screen displayed in the common area, and a captured data sharing function. The common area may be used for designating a target of capturing, and an interface for capturing a screen may be provided in an area (e.g., an interface area) adjacent to the common area.

When a request for executing a capturing function is detected from a user through the interface area, the electronic device 400 may process the common area to be transparent and display a common area lower screen. The electronic device 400 may display text or image (e.g., a thumbnail, an icon, a screenshot, or the like) of an executed application in the common area lower screen. The application may include a home screen, a menu screen, or the like.

A user may adjust an area so as to display a desired area of the common area lower screen, through the common area, and may execute capturing. The electronic device 400 may capture a screen of a sub-window that is displayed through the common area, in response to the execution of capturing. A captured area may be the entire screen, or may be similar or identical in size or shape to the common area.

Information associated with a target of capturing, in addition to a captured screen, may be obtained and provided. For example, when the target of capturing is a web browser, a URL may be additionally obtained. Also, when the target of capturing is an image viewer, a title of a displayed image, a path of storage, or the like may be obtained. When the target of capturing is a content that is played back, such as music, video, or the like, a title of content, a location of content, a location of playback of content, security information for access to content, or the like may be obtained. In the case of content that requires security information, obtaining information may be limited. When the target of capturing is a message or a mail, a conversation partner and a conversation content may be obtained. When the target of capturing is text, the content of the text may be obtained by executing optical character recognition (OCR) or the like. The captured content may be transmitted to an electronic device of a conversation partner of a conversation partner display area, automatically or by request of a user.

Message content in association with transmission and reception of a text message may be displayed through a common area of an expanded circle, and may be shared with a conversation partner.

Information (e.g., contact information) recently transmitted and received through a communication application may be displayed through a common area of an expanded circle, and may be shared with a conversation partner.

A user interface for executing communication may be provided in various types of interfaces (e.g., a type of floating circle) that may be called in the execution screens of various applications.

In the communication between electronic devices, the locations of the users may be mutually shared and displayed. For example, through the common area of the expanded circle, the current location of a user may be transferred to a conversation partner. The coordinates of the current location of the user may be transferred, or the current location of the user may be marked on a map application that may be executable in the electronic device 400 and map data where the current location of the user is marked may be transferred to a conversation partner. An interface for sharing the location of a user may be provided in an interface area. An operation of obtaining the location of the user, an operation of executing a map application, an operation of sharing the location of the user, and the like may be executed separately or automatically at once, based on the interface.

Figure 50:
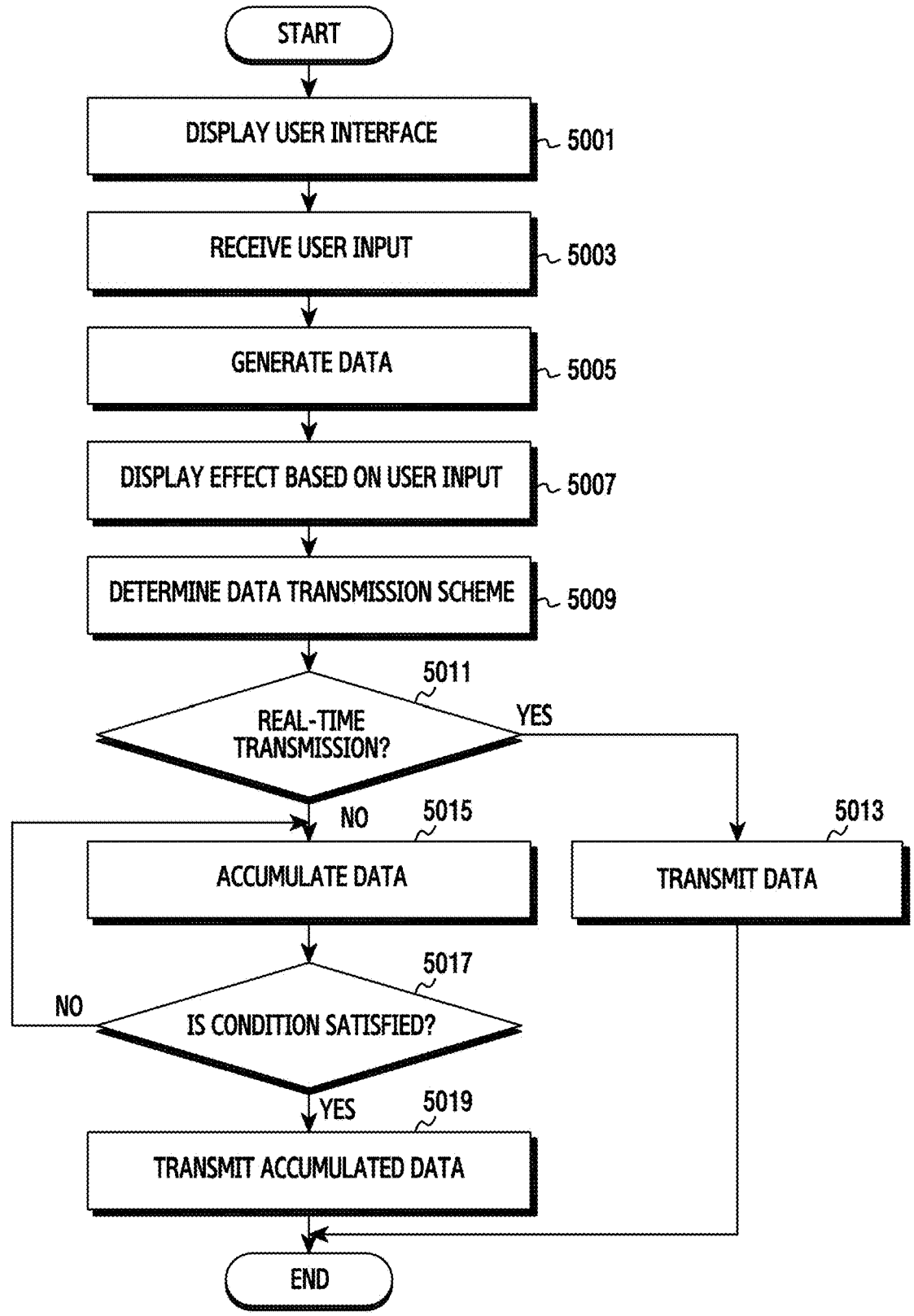
FIG. 50 is a flowchart illustrating a method of processing an event corresponding to a user input in an electronic device according to an embodiment of the present disclosure.

FIG. 50 is a flowchart illustrating a method of processing an event corresponding to a user input in an electronic device according to an embodiment of the present disclosure.

Referring to FIG. 50, in operation 5001, the controller 480 may display a circle (e.g., a floating circle or an expanded circle)-based user interface for the communication, in response to the communication executed by a user. The user interface to support the communication of a user may be embodied in various types as described above.

In operation 5003, the controller 480 receives a user input based on the user interface. For example, the user may input a touch based on a floating circle, or may input a touch based on a common area of an expanded circle.

In operation 5005, the controller 480 may generate data corresponding to the user input. For example, when a touch input of the user is detected through the floating circle or the common area of the expanded circle, the controller 480 may recognize a type of event, such as a knock event, a handwriting event, an emoticon event, a content sharing event, and the like, based on an area (e.g., the floating circle or the common area) where the touch input is detected, and may generate data corresponding thereto.

In operation 5007, the controller 480 may control displaying a user input-based effect. For example, the controller 480 may output (e.g., display) an effect to the user, based on the area where a touch input is detected (e.g., an area where an input is received) or at least one of the user input. For example, the controller 480 may display various animations such as a ripple effect or the like, as described above, or may display a change in color, vibration, an image or text associated with handwriting, or the like.

The controller 480 determines a data transmission scheme in operation 5009, and determines whether the data transmission scheme is a real-time transmission scheme or an accumulative transmission scheme in operation 5011. Data generated to correspond to an input event may be transferred to a conversation partner in real time, or may be transferred to a conversation partner when a predetermined condition is satisfied.

When the controller 480 determines that the transmission scheme is the real-time transmission scheme in operation 5011 (YES in operation 5011), the data may be transmitted to an electronic device of the conversation partner in operation 5013. The event may be transmitted to an electronic device of a conversation partner based on a P2P scheme or a server-client scheme.

When the controller 480 determines that the transmission scheme is the accumulative transmission scheme in operation 5011 (NO in operation 5011), the data may be accumulated in operation 5015.

In operation 5017, the controller 480 determines whether the accumulated data satisfies a set condition. For example, the controller 480 may determine whether the accumulated data is accumulated until a predetermined period of time is satisfied, or whether the accumulated data is accumulated to be as many as a predetermined number of data.

When it is determined that the accumulated data does not satisfy the set condition in operation 5017 (NO in operation 5017), the controller 480 returns to operation 5015.

When it is determined that the accumulated data satisfies the set condition in operation 5017 (YES in operation 5017), the controller 480 may transmit the accumulated data to an electronic device of the conversation partner in operation 5019. The accumulated data may be transmitted to an electronic device of a conversation partner based on a P2P scheme or a server-client scheme.

Figure 51:
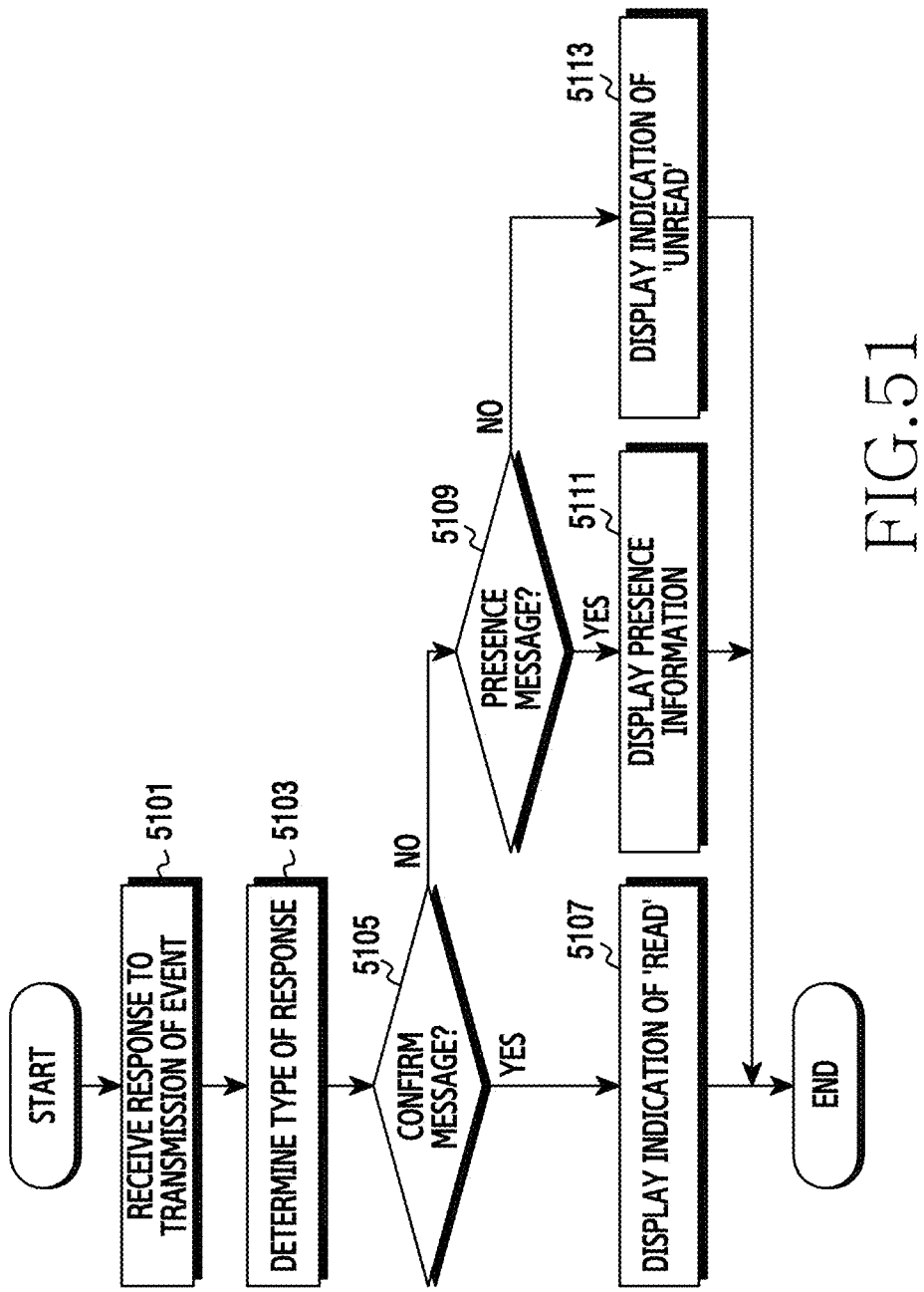
FIG. 51 is a flowchart illustrating a method of processing a response in response to an event in an electronic device according to an embodiment of the present disclosure.

FIG. 51 is a flowchart illustrating a method of processing a response in response to an event in an electronic device according to an embodiment of the present disclosure.

Referring to FIG. 51, in operation 5101, the controller 480 receives a response to the transmission of an image. For example, as described in the descriptions provided with reference to FIG. 50, the controller 480 may transmit an event to an electronic device of a conversation partner, and may receive a response from the electronic device of the conversation partner, in response to the event.

In operation 5103, the controller 480 determines a type of the response received from the electronic device of the conversation partner.

In operations 5105 and 5109, the controller 480 determines whether the response is a confirm message, a presence message, a non-confirm message, or the like, based on a result of the determination.

When it is determined that the type of response is a confirm message in operation 5105 (YES in operation 5105), the controller 480 notifies (e.g., display an indication of 'read') that a conversation partner checks the transmitted event in operation 5107.

When it is determined that the type of response is not the confirm message in operation 5105 (NO in operation 5105), the controller 480 determines whether the response message is a presence message in operation 5109. When it is determined that the type of response is a presence message in operation 5109 (YES in operation 5109), the controller 480 notifies (e.g., display presence information) a state in which the conversation partner is not capable of checking the transmitted event in operation 5111.

When it is determined that the type of response is a non-confirm message in operation 5109 (NO in operation 5109), the controller 480 notifies (e.g., display an indication of 'unread') that the conversation partner does not yet check the transmitted event in operation 5113.

Figure 52:
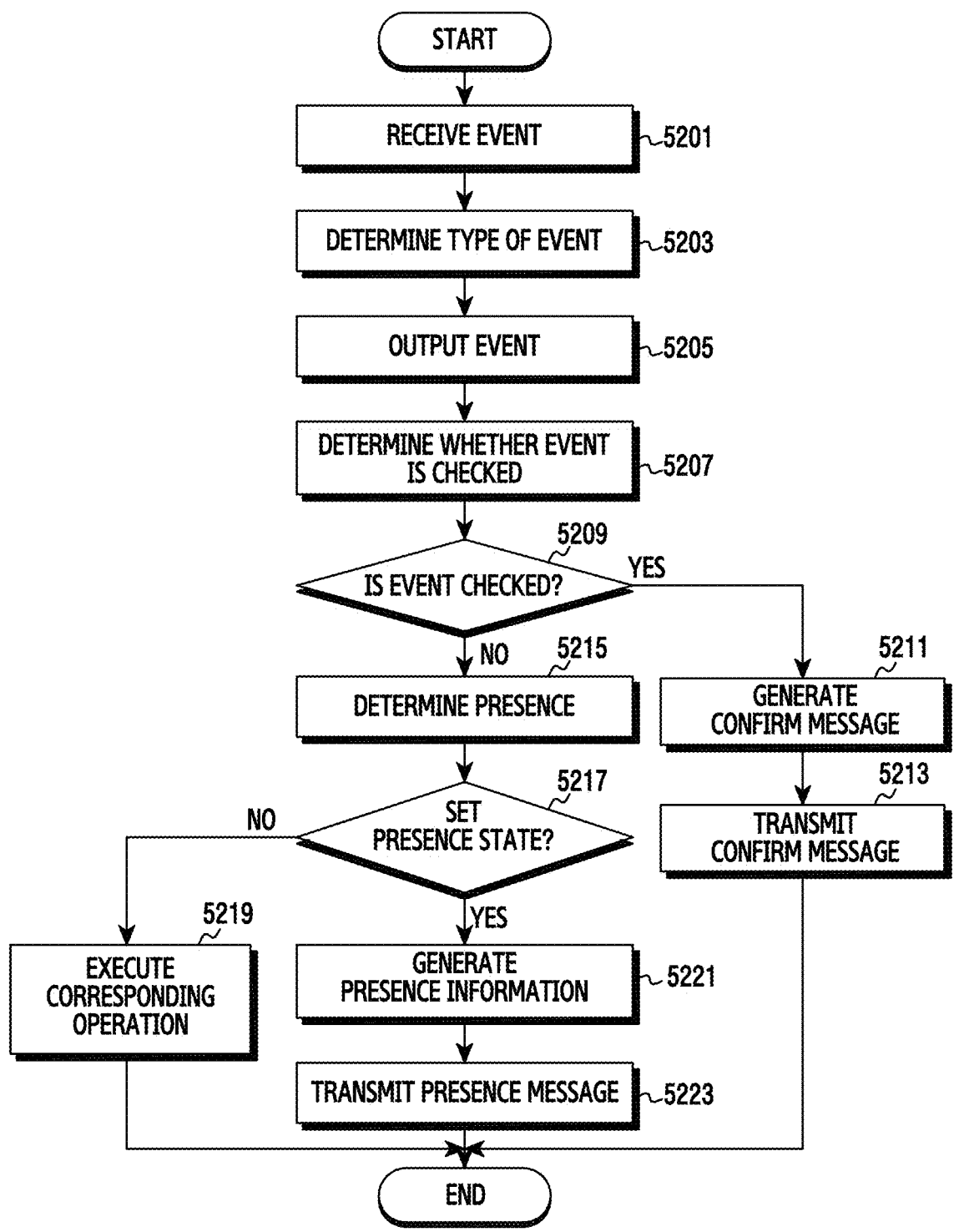
FIG. 52 is a flowchart illustrating a method of processing the reception of an event in an electronic device according to an embodiment of the present disclosure.

FIG. 52 is a flowchart illustrating a method of processing the reception of an event in an electronic device according to various embodiments of the present disclosure.

Referring to FIG. 52, in operation 5201, the controller 480 receives an event from an electronic device of a conversation partner.

In operation 5203, the controller 480 determines a type of event of the received event. For example, the controller 480 may determine a type of event, such as a knock event, a handwriting event, an emoticon event, a content sharing event, and the like, based on an area where an event is transmitted such as a floating circle and a common area of an expanded circle.

In operation 5205, the controller 480 outputs (displays) an event based on a result of the type of event. For example, the controller 480 may display various animations, such as a ripple effect or the like, as described above, or may display a change in color, vibration, an image or text associated with handwriting, or the like.

In operations 5207 and 5209, the controller 480 outputs the event, and determines whether a user checks the event.

When it is determined that the user checks the event in operation 5209 (YES in operation 5209), the controller 480 generates a confirm message in operation 5211, and transmits the confirm message to an electronic device of the conversation partner in operation 5213.

When it is determined that the user does not check the event in operation 5209 (NO in operation 5209), the controller 480 determines the presence of the user based on various sensor information of the electronic device 400 in operation 5215.

In operation 5217, the controller 480 determines whether the presence of the user is a set presence state based on a result of the determination. For example, the controller 480 determines whether the user is placed in a difficult situation (e.g., the context of driving) to provide a response to the event.

When it is determined that the presence of the user is different from the set presence state in operation 5217 (NO in operation 5217), the controller 480 processes the execution of a corresponding operation in operation 5219. For example, the controller 480 generates a non-confirm message with respect to the situation in which the user does not check the event, and transmits the non-confirm message to an electronic device of the conversation partner, or continuously monitors the presence state of the user and processes an operation associated with the reception of an additional event or repeatedly outputs a notification with respect to the reception of the event.

When it is determined that the presence of the user is the set presence state in operation 5217 (YES in operation 5217), the controller 480 generates presence information in operation 5221, and transmits the presence information to the electronic device of the conversation partner in operation 5223.

Figure 53:
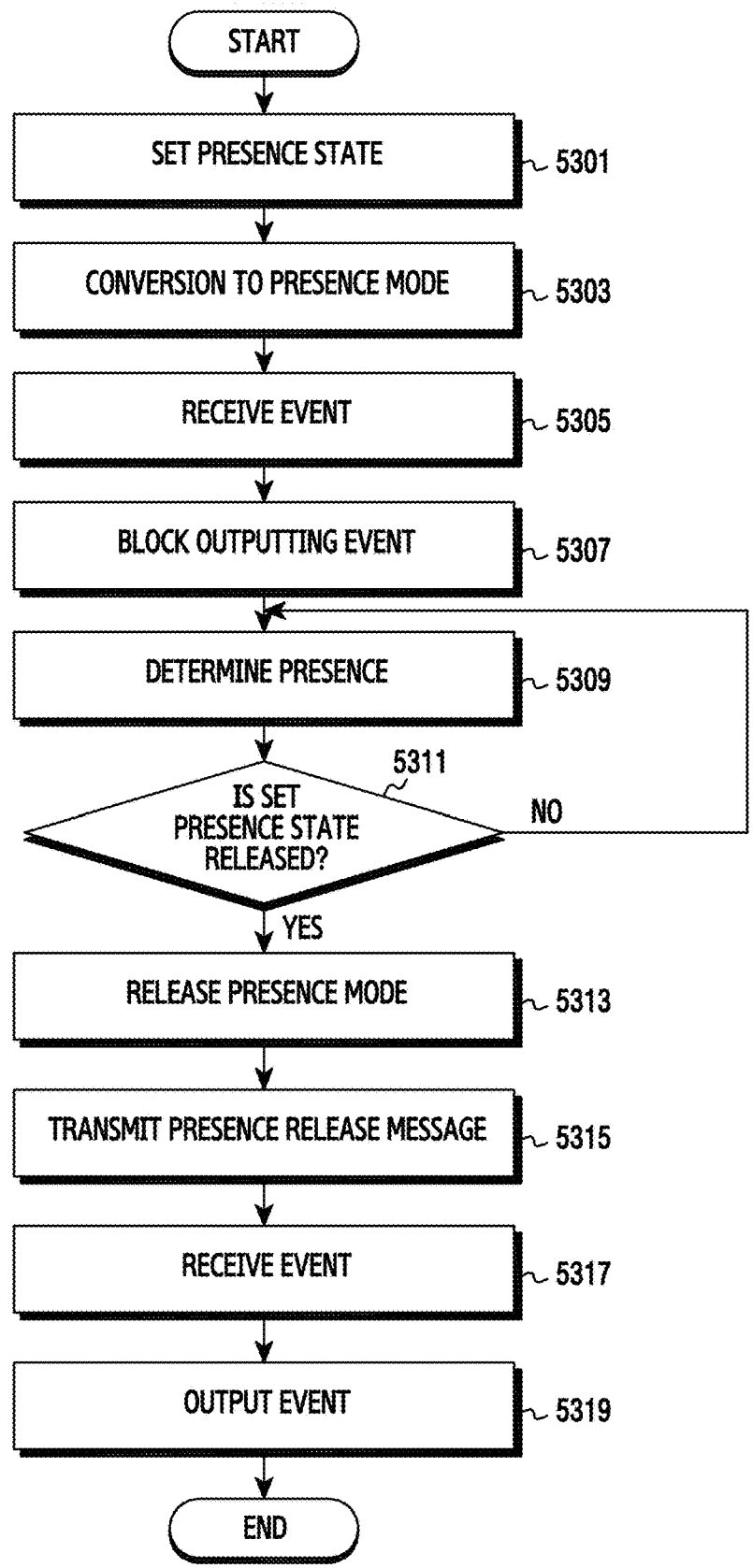
FIG. 53 is a flowchart illustrating a method of processing a presence state of a user in an electronic device according to an embodiment of the present disclosure.

FIG. 53 is a flowchart illustrating a method of processing a presence state of a user in an electronic device according to an embodiment of the present disclosure.

Referring to FIG. 53, in operation 5301, when it is determined that the presence of a user is a set presence state, the controller 480 processes the conversion to a presence mode in operation 5303. When the user in a predetermined context (e.g., the context of driving) in which the user has difficulty in responding to an event, the presence mode indicates a mode of blocking a notification (report) with respect to the reception of an event.

In operation 5305, when the reception of an event is detected in the presence mode, the controller 480 blocks outputting the event in operation 5307. For example, the controller 480 may execute a process to not output the notification with respect to the received event.

In operation 5309, the controller 480 continuously determines the presence of the user in the presence mode state. For example, the controller 480 may monitor the presence of the user based on various sensor information.

In operation 5311, the controller 480 determines whether the set presence state is released based on a result of determining the presence of the user. For example, the controller 480 may execute monitoring the presence of the user based on various sensor information, and may determine whether the context of user's driving is over, based on a result of monitoring.

When it is determined that the set presence state is not released in operation 5311 (NO in operation 5311), the controller 480 returns to operation 5309.

When it is determined that the set presence state is released in operation 5311 (YES in operation 5311), the controller 480 releases the presence mode in operation 5313.

In operation 5315, the controller 480 transmits a presence release message to the electronic device of the conversation partner in response to the release of the presence mode.

When an event is received in a state in which the presence mode is released in operation 5317, the controller 480 processes an output (notification) associated with the received event in operation 5319.

Figure 54:
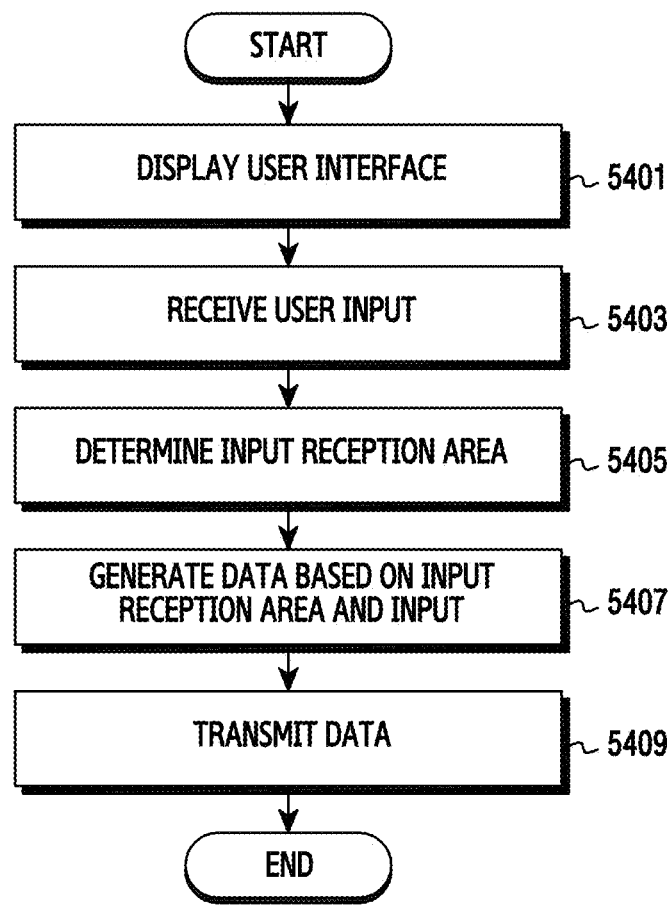
FIG. 54 is a flowchart illustrating an operation of transmitting data based on a user input in an electronic device according to an embodiment of the present disclosure.

FIG. 54 is a flowchart illustrating an operation of transmitting data based on a user input in an electronic device according to various embodiments of the present disclosure.

Referring to FIG. 54, in operation 5401, the controller 480 displays a user interface for communication, in response to the communication executed by a user. The user interface may include a first area that displays at least one of an image and text that is associated with a user who is related to an external electronic device, and a second area that displays data shared with the external electronic device, and the first area may be disposed by overlapping at least a part of the second area. The external electronic device may transmit or receive data based on contact information, an account, a device or IP address, or location information.

In operation 5403, the controller 480 receives a user input. For example, the controller 480 receives the user input based on at least one of the first area and the second area.

In operation 5405, the controller 480 determines an input reception area. For example, the controller 480 determines whether the user input is received based on the first area, the second area, or both the first area and the second area.

In operation 5407, the controller 480 generates data to be transmitted based on an area where the input is received and at least a portion of the received input. For example, the controller 480 may generate a type of data to be transmitted, to be different based on the location (e.g., the first area or the second area) where a user input is received. The controller 480 may generate data by including at least one information from among a type of input, an input occurrence time, an order of occurrence of an input, coordinates of an input, a location of an input, color information, input up/down information, and content information.

In operation 5409, the controller 480 controls data transmission. For example, the controller 480 may execute a control to transmit the data through a communication module, based on at least a portion of an input received through at least a portion of the first area and the second area.

The controller 480 may receive data that the external electronic device transmits, in response to the data transmission. Based on the data received from the external electronic device, the controller 480 executes a process to display at least one of a user's reception state with respect to the transmitted data and the state of the user who is related to the external electronic device, through at least a portion of the first area and the second area.

As described above, an operation method of the electronic device 400, according to various embodiments of the present disclosure, may include displaying a user interface that includes a first area and a second area, the first area displaying at least one of an image and text that is associated with a user who is related to an external electronic device and the second area displaying data that is shared with the external electronic device; receiving an input through at least a portion of the first area and the second area; displaying an effect corresponding to the received input; and transmitting data to the external electronic device based on at least a portion of the received input.

The operation of displaying the user interface may include displaying the user interface as at least a partial screen of a touch screen display, and displaying at least a partial area of an area remaining after excluding the first area and the second area to be transparent or semitransparent, or displaying an image stored in the electronic device 400 or an external electronic device after executing a filter processing (e.g., blurring, monochrome).

The operation of transmitting the data may include receiving an input through at least a portion of the first area and the second area; and transmitting, to the external electronic device, the data based on at least a portion of the received input, wherein the data is determined based on an area where the input is received and at least a portion of the received input. The data may include at least one of a type of input, an input occurrence time, an order of occurrence of an input, coordinates of an input, a location of an input, color information, input up/down information, and content information.

As described above, an operation method of the electronic device 400 according to various embodiments of the present disclosure includes displaying a user interface including a first area (e.g., a conversation partner display area) that displays a conversation partner in response to the initiation of communication and a second area (e.g., a common area) that displays content shared with the conversation partner; recognizing an event (e.g., a knock event, a handwriting event, and the like) in response to a user input that is provided based on the first area or the second area; outputting a feedback effect corresponding to the event; transmitting the event to an electronic device of the conversation partner in the first area; receiving a response to the event from the electronic device; and displaying information associated with the response through the first area or the second area.

The operation of transmitting the event may include determining a transmission scheme of the event; transmitting the event in real time based on the determination; and accumulating the event based on the determination, and transmitting the accumulated events.

The operation of transmitting the accumulated event may include accumulating an event corresponding to a user input, as many times as a predetermined condition, and transmitting the accumulated events.

The operation of displaying the information related to the response may include determining a type of response of a response that is received from the electronic device of the conversation partner; executing a process to display an indication of 'read' based on the first area when the type of response is a confirm message; executing a process to display presence information based on the first area when the type of response is a presence message; and executing a process to display an indication of 'unread' based on the first area when the type of response is a non-confirm message.

The operation of displaying the information related to the response may include receiving an event from the electronic device of the conversation partner, and outputting information corresponding to the event through the first area or the second area.

The operation of outputting the information may include displaying a notification of the reception of the event based on the first area, and displaying content of the event based on the second area.

The method may include determining the presence of the user when the event is not checked by the user; determining whether the presence of the user is a set presence state, and transmitting a presence message to the electronic device of the conversation partner when the presence of the user is the set presence state.

The method may include executing a conversion to a presence mode when it is determined that the presence of the user is the set presence state, and blocking an output associated with the event when the reception of the event is detected in the presence mode.

The method may include monitoring the presence of the user in the presence mode state, detecting the release of the set presence state based on a result of monitoring, releasing the presence mode in response to the detection of the release of the set presence state, and outputting the event when an event is received in a state in which the presence mode is released.

The method may further include transmitting a presence release message to the electronic device of the conversation partner in response to the release of the presence mode.

An electronic device and an operation method thereof, according to various embodiments of the present disclosure, may provide an intuitive user interface for supporting the communication between users who use electronic devices, and may provide easy and quick communication through transferring intention signals between the users based on user inputs using the user interface.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
    a memory storing instructions;
    a communication module;
    a touch screen display; and
    a processor configured to execute the stored instructions to:
        receive, using the communication module, a signal indicating a designated event from a counterpart electronic device,
        in response to receiving the signal, display a second user interface (UI), floated on a part of a first UI of a first application being displayed, of a second application distinct from the first application being executed, wherein the second UI is movable through a drag input and comprises a first portion that displays identification information of a user corresponding to the counterpart electronic device,
        identify whether a touch input on at least part of the second UI being displayed is received by the touch screen display within a predetermined period after the second UI is displayed,
        in response to the touch input being identified within the predetermined period, switch the second UI to an extended UI of the second application which is floated on a part of the first UI being displayed, wherein the extended UI includes the first portion that displays identification information of the user corresponding to the counterpart electronic device, a second portion that displays a visual object representing a content shared with the counterpart electronic device, and a third portion that includes at least one executable object for sharing another content with the counterpart electronic device,
        while displaying the extended UI, receive, using the communication module, a message including an image from the counterpart electronic device,
        in response to receiving the message, replace the visual object representing the content with the received image in the second portion, and
        in response to no touch input being identified within the predetermined period, remove the second UI from the touch screen display.

2. The electronic device of claim 1, wherein the processor is further configured to execute the stored instructions to:
    in response to a touch input out of the extended UI, restore the extended UI to the second UI.

3. The electronic device of claim 1, wherein the processor is further configured to execute the stored instructions to:
    receive an input on at least a part of the first portion and the second portion of the extended UI; and
    display, in response to receiving the input, a visual effect corresponding to the input in a state where maintaining to display at least the part of the first portion and the second portion of the extended UI.

4. The electronic device of claim 1, wherein the second portion of the extended UI is used as one of a data display portion, a content playback portion, a camera preview portion, or an emoticon generation portion.

5. The electronic device of claim 1,
    wherein the third portion of the extended UI includes a main interface for executing a function through the second portion, and
    wherein the main interface is, in response to executing the function by the main interface, changed to a sub interface for executing a control related to the function executed in the second portion of the extended UI.

6. The electronic device of claim 1, wherein the processor is further configured to execute the stored instructions to:
    in response to a drag input from at least part of the second UI to a position different from the part of the first UI on which the second UI is floated, move the second UI to a location corresponding to the position.

7. The electronic device of claim 1, wherein the processor is further configured to execute the stored instructions to:
    in response to receiving a content from the counterpart electronic device, display a visual effect corresponding to a type of the received content at least a part of the first portion of the second UI being displayed.

8. The electronic device of claim 1,
wherein the second portion of the extended UI includes a control portion, and
wherein the processor is further configured to execute the stored instructions to:
display, on the second portion of the extended UI, a visual object representing to another content corresponding to a length of a drag input initiating in the control portion.

9. The electronic device of claim 1, wherein the processor is further configured to execute the stored instructions to:
display a member tray including a plurality of third UIs of the second application of which first areas display identification information of users corresponding to other counterpart electronic devices, respectively, and
in response to dragging at least a part of one third UI of the plurality of the third UIs and dropping at least the part of the one third UI in the second portion of the extended UI, transmit, to the counterpart electronic device corresponding to the identification information indicated in the first portion of the extended UI, a profile information of a user of which a first area of the one third UI displays identification information.

10. An electronic device comprising:
a memory storing instructions;
a communication module;
a touch screen display; and
a processor configured to execute the stored instructions to:
receive, using the communication module, a signal indicating a designated event from a counterpart electronic device,
in response to receiving the signal, display, on the touch screen display, a user interface (UI) of an application program,
identify whether a touch input on at least part of the UI being displayed is received by the touch screen display within a predetermined period after the UI is displayed, wherein the UI comprises a first portion that displays identification information of a user corresponding to the counterpart electronic device,
in response to the touch input being identified within the predetermined period, on at least part of the UI, switching the UI to an extended UI of the application program, wherein the extended UI includes the first portion that displays identification information of the user corresponding to the counterpart electronic device, a second portion that displays a visual object representing a content shared with the counterpart electronic device, and a third portion that includes at least one executable object for sharing another content with the counterpart electronic device,
while displaying the extended UI, receive, using the communication module, a message including an image from the counterpart electronic device,
in response to receiving the message, replace the visual object representing the content with the received image in the second portion, and
in response to no touch input being identified within the predetermined period, remove the UI from the touch screen display, wherein the processor is further configured to execute the stored instructions to:
receive at least one touch input through at least a part of the first portion and the second portion of the extended UI,
in response to receiving the input on the first portion of the extended UI, request to the counterpart electronic device to provide a notification in the counterpart electronic device, and
in response to receiving the input on the second portion of the extended UI, transmit data corresponding to a position in which the input on the second portion of the extended UI is received to the counterpart electronic device.

11. The electronic device of claim 10, wherein the processor is further configured to execute the stored instructions to display, in response to receiving the input, a visual effect corresponding to the input in a state where maintaining to display at least the part of the first portion and the second portion of the extended UI.

12. The electronic device of claim 10, wherein the transmitted data includes at least one of a type of input, an input occurrence time, an order of occurrence of an input, coordinates of an input, a location of an input, color information, input up/down information, or content information.

13. An operation method of an electronic device, the method comprising:
receiving, using a communication module of the electronic device, a signal indicating a designated event from a counterpart electronic device;
in response to receiving the signal, displaying a second user interface (UI) floated on a part of a first UI of a first application being displayed, of a second application distinct from the first application being executed, wherein the second UI is movable through a drag input and comprises a first portion that displays identification information of a user corresponding to the counterpart electronic device;
identifying whether a touch input on at least part of the second UI being displayed is received by a touch screen display of the electronic device within a predetermined period after the second UI is displayed;
in response to the touch input on the at least part of the second UI being displayed, switching the second UI to an extended UI of the second application which is floated on a part of the first UI being displayed, wherein the extended UI includes the first portion that displays identification information of the user corresponding to the counterpart electronic device, a second portion that displays a visual object representing a content shared with the counterpart electronic device, and a third portion that includes at least one executable object for sharing another content with the counterpart electronic device;
while displaying the extended UI, receiving, using the communication module, a message including an image from the counterpart electronic device;
in response to receiving the message, replacing the visual object representing the content with the received image in the second portion, and
in response to no touch input being identified within the predetermined period, removing the second UI from the touch screen display.

14. The method of claim 13, further comprising:
in response to a touch input out of the extended UI, restoring the extended UI to the second UI.

15. The method of claim 13, further comprising:
receiving an input on at least a part of the first portion and the second portion of the extended UI; and
displaying, in response to receiving the input, a visual effect corresponding to the input in a state where maintaining to display at least the part of the first portion and the second portion of the extended UI.

16. The method of claim 13,
wherein the third portion of the extended UI includes a main interface for executing a function through the second portion, and
wherein the main interface is, in response to executing the function by the main interface, changed to a sub interface for executing a control related to the function executed in the second portion of the extended UI.

17. The method of claim 13, further comprising:
in response to a drag input from at least part of the second UI to a position different from the part of the first UI on which the second UI is floated, moving the second UI to a location corresponding to the position.

18. The method of claim 13, further comprising:
in response to receiving a content from the counterpart electronic device, displaying a visual effect corresponding to a type of the received content at least a part of the first portion of the second UI being displayed.

19. The method of claim 13,
wherein the second portion of the extended UI includes a control portion, and
wherein the method further comprises:
displaying, on the second portion of the extended UI, a visual object representing to another content corresponding to a length of a drag input initiating in the control portion.

20. The method of claim 13, wherein the method further comprises:
displaying a member tray including a plurality of third UIs of the second application of which first areas display identification information of users corresponding to other counterpart electronic devices, respectively, and
in response to at least a part of one third UI of the plurality of the third UIs and dropping at least the part of the one third UI in the second portion of the extended UI, transmitting, to the counterpart electronic device corresponding to the identification information indicated in the first portion of the extended UI, a profile information of a user of which a first area of the one third UI displays identification information.

* * * * *